(12) United States Patent
Vikas et al.

(10) Patent No.: US 12,384,023 B2
(45) Date of Patent: Aug. 12, 2025

(54) RECONFIGURABLE MODULAR SOFT ROBOTS AND METHODS OF DESIGNING THE SAME

(71) Applicant: The Board of Trustees of The University of Alabama, Tuscaloosa, AL (US)

(72) Inventors: Vishesh Vikas, Tuscaloosa, AL (US); Caitlin Freeman, Memphis, TN (US); Michael Maynard, Birmingham, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 88 days.

(21) Appl. No.: 18/137,265

(22) Filed: Apr. 20, 2023

(65) Prior Publication Data

US 2023/0364777 A1   Nov. 16, 2023

Related U.S. Application Data

(60) Provisional application No. 63/333,063, filed on Apr. 20, 2022.

(51) Int. Cl.
*B25J 18/06* (2006.01)
*B25J 9/10* (2006.01)

(52) U.S. Cl.
CPC ............. *B25J 9/1075* (2013.01); *B25J 18/06* (2013.01)

(58) Field of Classification Search
CPC ................................ B25J 9/1075; B25J 18/06
See application file for complete search history.

(56) References Cited

U.S. PATENT DOCUMENTS

| 4,580,551 A | * | 4/1986 | Siegmund | A61B 1/0055 600/139 |
| 4,911,148 A | * | 3/1990 | Sosnowski | A61B 1/00165 600/164 |
| 5,381,782 A | * | 1/1995 | DeLaRama | A61B 1/0056 604/95.01 |

(Continued)

FOREIGN PATENT DOCUMENTS

| CN | 201204019 Y | 3/2009 |
| CN | 100554067 C | 10/2009 |

(Continued)

OTHER PUBLICATIONS

Stefano Mintchev, et al.; Adaptive Morphology: A Design Principle for Multimodal and Multifunctional Robots; IEEE Robotics & Automation Magazine; pp. 42-54; Sep. 2016.

(Continued)

*Primary Examiner* — William C Joyce
(74) *Attorney, Agent, or Firm* — Meunier Carlin & Curfman LLC

(57) ABSTRACT

Various implementations include a modular soft robot including a base, an arm coupled to the base, and an actuator. The arm includes a first surface and a second surface opposite and spaced apart from the first surface. The first surface defines a plurality of channels, each channel comprising a proximal end at the first surface and a distal end spaced apart from the proximal end. Each channel has a longitudinal axis extending therethrough. The actuator is configured to deform the arm.

17 Claims, 37 Drawing Sheets

(56) References Cited

U.S. PATENT DOCUMENTS

| | | | |
|---|---|---|---|
| 6,012,494 A * | 1/2000 | Balazs | B25J 18/06 |
| | | | 138/119 |
| 6,481,513 B2 | 11/2002 | Buehler et al. | |
| 8,789,630 B2 | 7/2014 | Galloway et al. | |
| 10,080,576 B2 * | 9/2018 | Romo | A61B 17/29 |
| 10,765,487 B2 * | 9/2020 | Ho | A61B 34/71 |
| 11,648,663 B2 * | 5/2023 | Lessing | B25J 15/083 |
| | | | 294/196 |

FOREIGN PATENT DOCUMENTS

| | | | |
|---|---|---|---|
| CN | 111015720 A * | 4/2020 | B25J 15/12 |
| JP | 2012213478 A * | 11/2012 | |
| WO | 2010042094 A1 | 4/2010 | |
| WO | WO-2021244940 A1 * | 12/2021 | B25J 15/0009 |

OTHER PUBLICATIONS

Dimitri A. Schreiber, et al.; ARCSnake: An Archimedes' Screw-Propelled, Reconfigurable Serpentine Robot for Complex Environments; 2020 IEEE International Conference on Robotics and Automation (ICRA); May 2020.

Dylan S. Shah, et al.; Gaining Environments through Shape Change; Nature Machine Intelligence, vol. 2 (2020).

Joran W. Booth, Dylan Shah, Jennifer C. Case, et al. OmniSkins: Robotic skins that turn inanimate objects into multifunctional robots. Science Robotics, 3(22):eaat1853, Sep. 2018. Publisher: American Association for the Advancement of Science.

Kelly Delp and Bill Thurston. Playing With Surfaces: Spheres, Monkey Pants, and Zippergons. In Reza Sarhangi and Carlo H. Séquin, editors, Proceedings of Bridges 2011: Mathematics, Music, Art, Architecture, Culture, pp. 1-8, Phoenix, Arizona, 2011. Tessellations Publishing.

Levi H Dudte, Etienne Vouga, Tomohiro Tachi, and L Mahadevan. Programming curvature using origami tessellations. Nature materials, 15(5):583-588, 2016.

H. Kurokawa, A. Kamimura, E. Yoshida, et al. M-Tran II: metamorphosis from a four-legged walker to a caterpillar. In IEEE/RSJ International Conference on Intelligent Robots and Systems (IROS), vol. 3, pp. 2454-2459 vol.3, Oct. 2003.

Sen W. Kwok, Stephen A. Morin, Bobak Mosadegh, et al. Magnetic Assembly of Soft Robots with Hard Components. Advanced Functional Materials, 24(15):2180-2187, 2014. _eprint:https://onlinelibrary.wiley.com/doi/pdf/10.1002/adfm.201303047.

Cecilia Laschi, Barbara Mazzolai, and Matteo Cianchetti. Soft robotics: Technologies and systems pushing the boundaries of robot abilities. Sci. Robot., 1(1):eaah3690, 2016.

Woo Ho Lee and A. C. Sanderson. Dynamic rolling locomotion and control of modular robots. IEEE Transactions on Robotics and Automation, 18(1):32-41, Feb. 2002.

V. Radhakrishnan. Locomotion: Dealing with friction. Proceedings of the National Academy of Sciences, 95(10):5448-5455, May 1998.

Daniela Rus and Michael T. Tolley. Design, fabrication and control of soft robots. Nature, 521(7553):467-475, May 2015.

M. Sasso, G. Palmieri, G. Chiappini, et al. Characterization of hyperelastic rubber-like materials by biaxial and uniaxial stretching tests based on optical methods. Polymer Testing, 27(8):995-1004, Dec. 2008.

Jimmy Sastra, Sachin Chitta, and Mark Yim. Dynamic Rolling for a Modular Loop Robot. The International Journal of Robotics Research, 28(6):758-773, Jun. 2009.

Robert F. Shepherd, Filip Ilievski,Wonjae Choi, et al. Multigait soft robot. Proceedings of the National Academy of Sciences, 108(51):20400-20403, Dec. 2011.

T. Umedachi, V. Vikas, and B. A. Trimmer. Softworms: the design and control of non-pneumatic, 3D-printed deformable robots. Bioinspiration & Biomimetics, 11(2):025001, 2016.

V. Vikas, E. Cohen, R. Grassi, et al. Design and Locomotion Control of a Soft Robot Using Friction Manipulation and Motor-Tendon Actuation. IEEE Transactions on Robotics, 32(4):949-959, Aug. 2016.

Michael Wehner, Brendan Quinlivan, Patrick M Aubin, et al. A lightweight soft exosuit for gait assistance. In 2013 IEEE International Conference on Robotics and Automation, pp. 3362-3369, May 2013. ISSN: 1050-4729.

Matheus S. Xavier, Andrew J. Fleming, and Yuen K. Yong. Finite Element Modeling of Soft Fluidic Actuators: Overview and Recent Developments. Advanced Intelligent Systems, n/a(n/a):2000187. _ eprint: https://onlinelibrary.wiley.com/doi/pdf/10.1002/aisy.202000187.

Jane Yen and Carlo Séquin. Escher sphere construction kit. In Proceedings of the 2001 symposium on Interactive 3D graphics, I3D '01, pp. 95-98, New York, NY, USA, Mar. 2001. Association for Computing Machinery.

Mark Yim, Wei-Min Shen, Behnam Salemi, et al. Modular self-reconfigurable robot systems [grand challenges of robotics]. IEEE Robotics & Automation Magazine, 14(1):43-52, 2007.

Mark Yim, Paul White, Michael Park, et al. Modular self-reconfigurable robots. In Encyclopedia of complexity and systems science, pp. 5618-5631. Springer, 2009.

Jun Zou, Yangqiao Lin, Chen Ji, et al. A Reconfigurable Omnidirectional Soft Robot Based on Caterpillar Locomotion. Soft Robotics, 5(2):164-174, Apr. 2018. Publisher: Mary Ann Liebert, Inc., publishers.

* cited by examiner

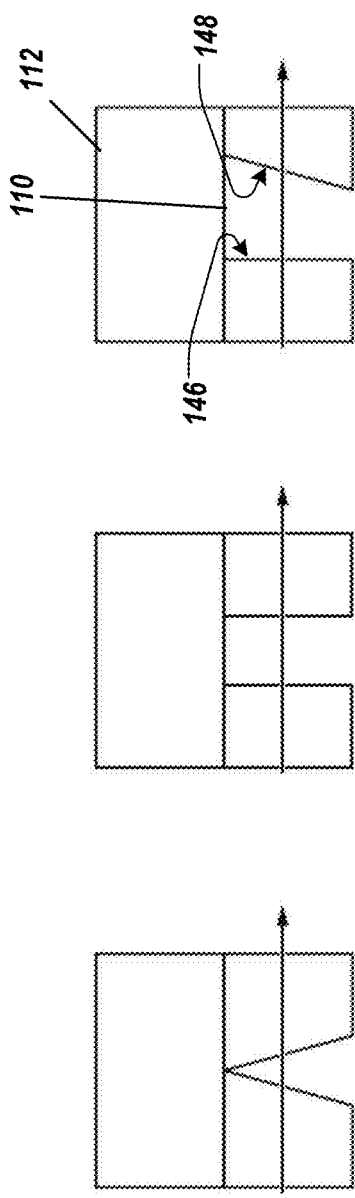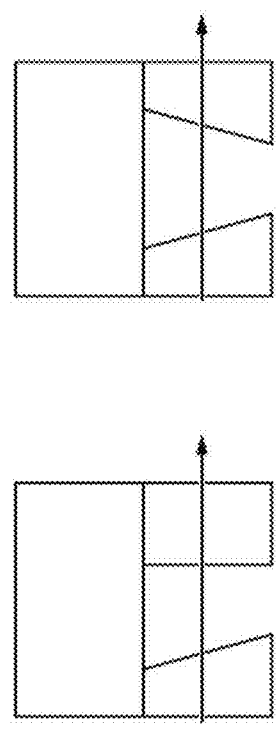

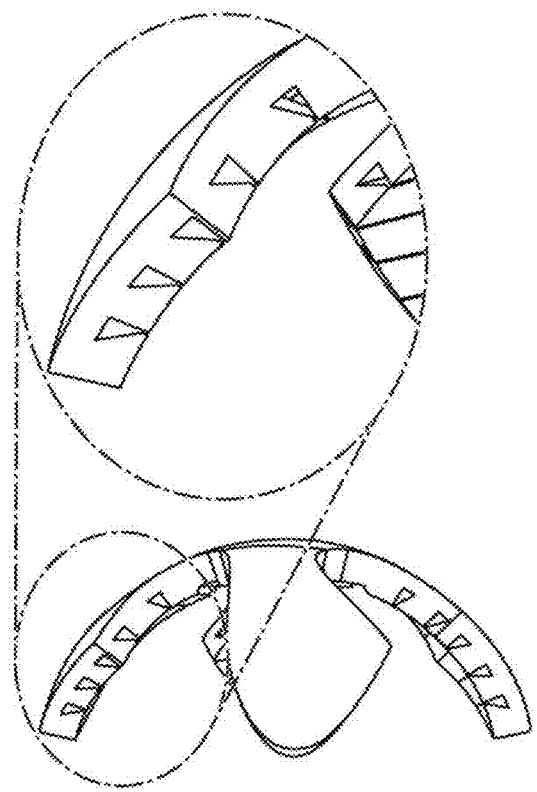
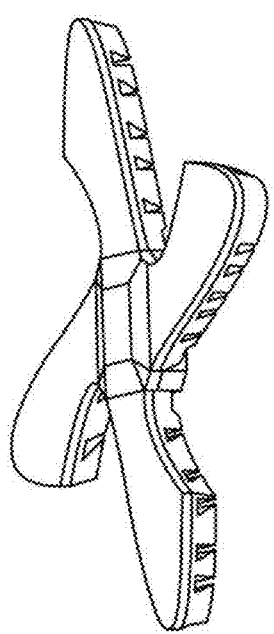
FIG. 4

| Platonic Solid | Tetrahedron | Cube | Octahedron | Dodecahedron | Icosahedron |
|---|---|---|---|---|---|
| Spherical Polyhedron | | | | | |
| $F$: Faces | 4 | 6 | 8 | 12 | 20 |
| $p$: Edges/face | 3 | 4 | 3 | 5 | 3 |
| $q$: Edges/vertex | 3 | 3 | 4 | 3 | 5 |
| $\theta$: Dihedral Angle | $\arccos\left(\frac{1}{3}\right)$ | $\frac{\pi}{2}$ | $\pi - \arccos\left(\frac{1}{3}\right)$ | $\pi - \arctan(2)$ | $\pi - \arccos\left(\frac{\sqrt{5}}{3}\right)$ |
| $R/a$: Circumradius /edge length | $\frac{1}{2}\sqrt{\frac{3}{2}}$ | $\frac{\sqrt{3}}{2}$ | $\frac{1}{\sqrt{2}}$ | $\frac{(\sqrt{15}+\sqrt{3})}{4}$ | $\frac{\sqrt{10+2\sqrt{5}}}{2}$ |

*FIG. 13*

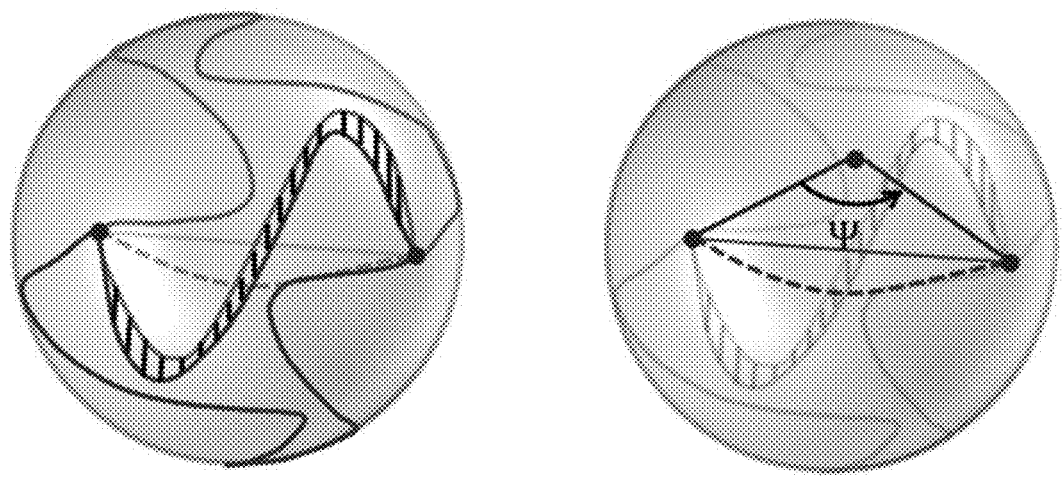
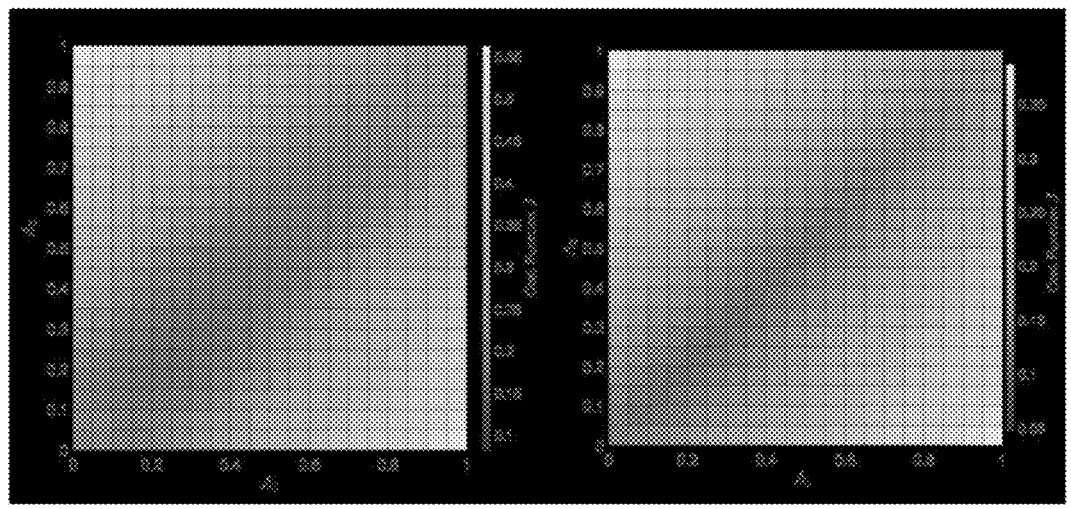
*FIG. 21*

RECONFIGURABLE MODULAR SOFT ROBOTS AND METHODS OF DESIGNING THE SAME

CROSS REFERENCE TO RELATED APPLICATION

This application claims priority to, and the benefit of, U.S. Provisional Patent Application No. 63/333,063, filed Apr. 20, 2022, entitled "RECONFIGURABLE MODULAR SOFT ROBOTS AND METHODS OF DESIGNING THE SAME," which is hereby incorporated by reference herein in its entirety.

STATEMENT REGARDING FEDERALLY SPONSORED RESEARCH OR DEVELOPMENT

This invention was made with government support under Grant No. 1830432 awarded by the National Science Foundation. The government has certain rights in the invention.

BACKGROUND

Exploratory robots may be used to explore environments unsafe for humans or perform monitoring tasks. Such robots often take the form of wheeled or aerial vehicles controlled remotely. Often, these exploratory robots are made up of standard manufacturing materials (e.g., metal or hard plastic structural elements) which may increase the overall robot's size and increase the risk of damage from impacts or falls. Due to their size and sensitivity, a limit exists to the number and size of the spaces a robot can explore.

Separately, as is known from cartography, projection of a sphere onto a flat plane is impossible without any distortions. This has been mathematically proven by Gauss and has resulted in multiple map projections of the Earth, e.g., Mercator projection. Any flat component to be formed into a sphere must, therefore, experience a level of distortion. For example, a spherical exploratory robot cannot flatten out, nor can a flat robot expand to create a sphere, due to the materials used and the mathematical properties.

Therefore, there is a need in the art for soft robotic devices which can explore a variety of environments and adapt to a variety of shapes.

SUMMARY

Various implementations include a modular soft robot including a base, an arm coupled to the base, and an actuator. The arm includes a first surface and a second surface opposite and spaced apart from the first surface. The first surface defines a plurality of channels, each channel comprising a proximal end at the first surface and a distal end spaced apart from the proximal end. Each channel has a longitudinal axis extending therethrough. The actuator is configured to deform the arm.

In some implementations, the actuator is a motor tendon actuator at least partially disposed within the arm adjacent the base. In other implementations, the actuator is a spring or a memory alloy.

In some implementations, the actuator deforms the arm between a flat configuration and a curved configuration. In the flat configuration, each channel has a first width at the distal end of the channel, and in the curved configuration, each channel has a second width at the distal end of the channel. The first width is greater than the second width.

In some implementations, the arm comprises a plurality of arms. In some implementations, a central plane extends through and bisects the base and the arm. In some implementations, each arm is coupled to the base such that each arm is longitudinally bisected by the central plane.

In some implementations, a shape of the arm as viewed in a plane parallel to the central plane is defined by a module-topology curve, the module-topology curve being an odd function with constraints at edges of a platonic solid.

In some implementations, each of the plurality of channels is defined by two adjacent protrusions that extend from the first surface, the protrusions having an end surface separated apart from the first surface. In some implementations, the protrusions are integrally formed with the first surface.

In some implementations, each protrusion has a first edge and a second edge, wherein the first edge of each protrusion lies within a first plane that intersects the first surface at a first angle that is greater than 0° to 90°, and the second edge of each protrusion lies within a second plane that intersects the first surface at a second angle that is greater than 0° to 90°, and wherein the first angle and the second angle are different.

In some implementations, each channel has a right trapezoidal cross-sectional shape as viewed through a plane that is perpendicular to the longitudinal axis of the respective channel.

Various other implementations include a system of modular soft robots including a plurality of modular soft robots. Each robot includes a base, an arm coupled to the base, and an actuator. The arm includes a first surface and a second surface opposite and spaced apart from the first surface. The first surface defines a plurality of channels, each channel comprising a proximal end at the first surface and a distal end spaced apart from the proximal end, wherein each channel has a longitudinal axis extending therethrough. The actuator is at least partially disposed within the arm adjacent the base. The actuator is configured to deform the arm between a flat configuration and a curved configuration, wherein, in the flat configuration, each channel has a first width at the distal end of the channel, and in the curved configuration, each channel has a second width at the distal end of the channel, wherein the first width is greater than the second width. Each of the plurality of modular soft robots are rotationally symmetric relative to each other. The plurality of modular soft robots in the curved configuration are reconfigurable to create a three-dimensional shape different from the shape of each robot alone.

In some implementations, the plurality of modular soft robots in the flat configuration are reconfigurable relative to each other to create a two-dimensional shape different from the shape of each robot alone.

In some implementations, each of the plurality of modular soft robots are reconfigurable relative to each other in a three-dimensional shape. In some implementations, the three-dimensional shape is a sphere.

In some implementations, each of the plurality of modular soft robots correspond to a platonic solid, the platonic solid having a number of faces and a number of edges per face, wherein the number of faces of the platonic solid correlates to the number of modular robots that are arrangeable relative to each other to form the sphere, and wherein the number of edges per face of the platonic solid correlates to a number of arms of each of the modular soft robots.

In some implementations, the platonic solid is a tetrahedron, a cube, an octahedron, a dodecahedron, or an icosahedron.

In some implementations, a topology curve plane is the plane passing through the edges of the platonic solid and normal to the plane along a vector joining a center of the edge and a center of a circumscribing sphere. In some implementations, a module topology curve is drawn on the topology curve planes of all the edges of the face of the platonic solid.

In some implementations, a curved configuration topology is obtained through orthographic projection of the module topology curves drawn on the topology curve planes onto the circumscribing sphere.

In some implementations, a tangent plane is a plane tangent to the sphere with the normal to the plane along the vector joining the center of the circumscribing sphere and a center of the face of the platonic solid.

In some implementations, a planar configuration topology is obtained by projecting the curved configuration topology onto a tangent plane.

In some implementations, each of the plurality of modular soft robots corresponds to an Archimedean solid. In some implementations, the plurality of modular soft robots comprises a first plurality of modular soft robots having a first number of arms and a second plurality of modular soft robots having a second number of arms, the second number of arms being different from the first number of arms.

In some implementations, in the flat configuration, each of the first plurality of modular soft robots and the second plurality of modular soft robots are reconfigurable relative to each other to create a two-dimensional shape different from the shape of each robot alone.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

FIGS. 2A, 2B, 2C, 2D, and 2E are partial detail views of channels of the arm of a soft modular robot, according to various implementations.

FIG. 4 shows a flat configuration and a curved configuration of a soft modular robot, according to one implementation.

FIG. 13 provides details on the platonic solids and their attributes, according to various implementations.

FIG. 21 illustrates the spherical inter-modular area, according to one implementation.

DETAILED DESCRIPTION

The devices, systems, and methods disclosed herein provide for a modular soft robot capable of locomotion. The devices, systems, and methods disclosed herein also provide a system of multiple modular soft robots capable of engaging with each other in a 2D or 3D structure (e.g., a sphere) capable of locomotion. Each modular soft robot is movable between a flat and a curved configuration.

In some implementations, the shape of each modular soft robot minimizes the distortion and imperfections when transforming the robots between the flat configuration and the curved configuration. For example, in certain implementations, the shape of the robot is derived from a platonic solid (a convex, regular polyhedron in three-dimensional Euclidean space, having congruent, regular polygons for each face) in a homogeneous system or an Archimedean solid (made up of at least two types of regular polygon faces) in a heterogeneous system. Briefly, a topology curve (e.g., a sinusoidal curve) is projected out from the base solid to a circumscribing sphere. The resulting shape on the circumscribing sphere approximates the shape of the modular soft robot in the curved configuration. However, to produce the flat configuration, that same shape on the circumscribed sphere is orthogonally projected onto a plane tangent to the circumscribed sphere. The contoured shape resulting from the orthogonal projection is the shape of the soft modular robot, which minimizes the distortions between robots when formed into a sphere.

Example System #1

Figure 1A:
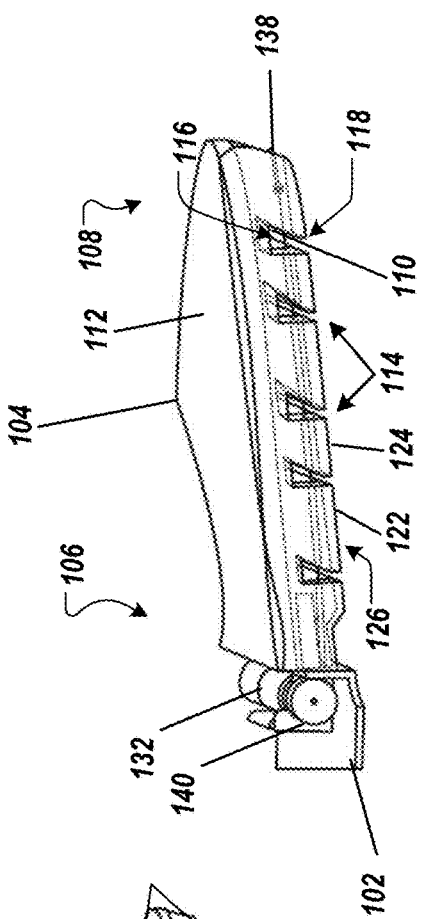
FIG. 1A is a perspective view of a soft modular robot, according to one implementation.
Figure 1C:
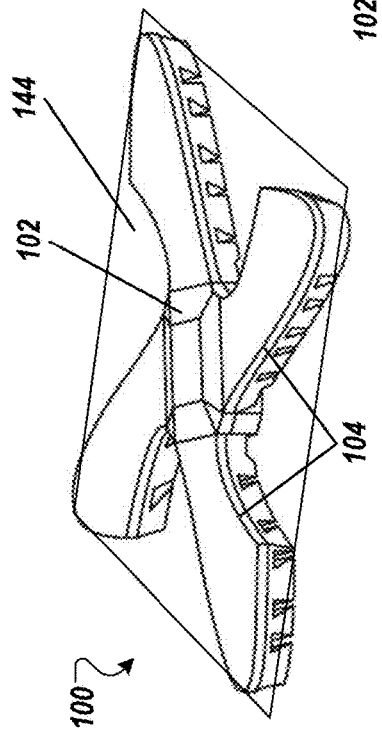
FIGS. 1B, 1C, and 1D show various components of the soft modular robot of FIG. 1A.

FIG. 1A shows a modular soft robot 100 including a base 102, at least one arm 104, and at least one actuator 130, according to one implementation. FIGS. 1B-1E show various elements of the modular soft robot 100 in further detail.

Each arm 104 includes a first arm end 106 coupled to the base 102 and a second arm end 108 separated from the first arm end 106 in a direction away from the base 102. A central plane 144 extends through the robot 100 and bisects the base 102 and the arm(s) 104. In other words, each arm 104 is coupled to the base 102 such that each arm 104 is longitudinally bisected by the central plane 144.

The robot 100 includes four arms 104 coupled to the base 102. A central axis of each arm extends between the first arm end 106 and the second arm end 108. Each arm 104, and the corresponding axis of each arm 104, equally spaced around the base 102. For example, robot 100 of FIG. 1A having 4 arms 104 are each spaced apart 90° from each other. However, in some implementations, the arms are not spaced equally apart from each other (e.g., 3 arms may be placed close to each other, separated by 60°, while one arm may be further apart, separated by 120° from two of the arms).

Figure 1B:
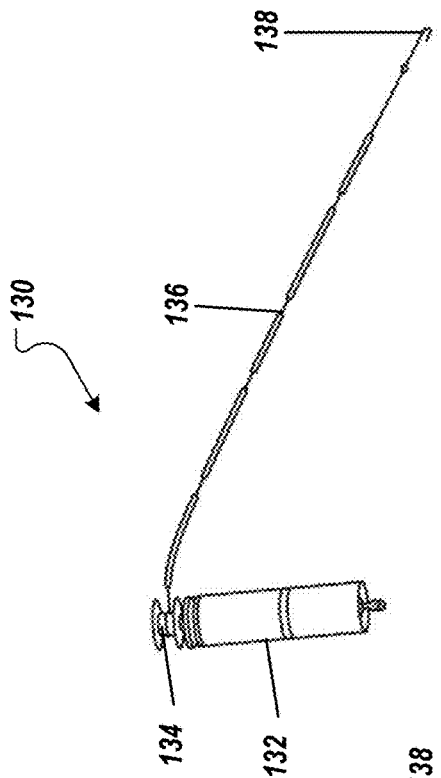
Figure 1D:
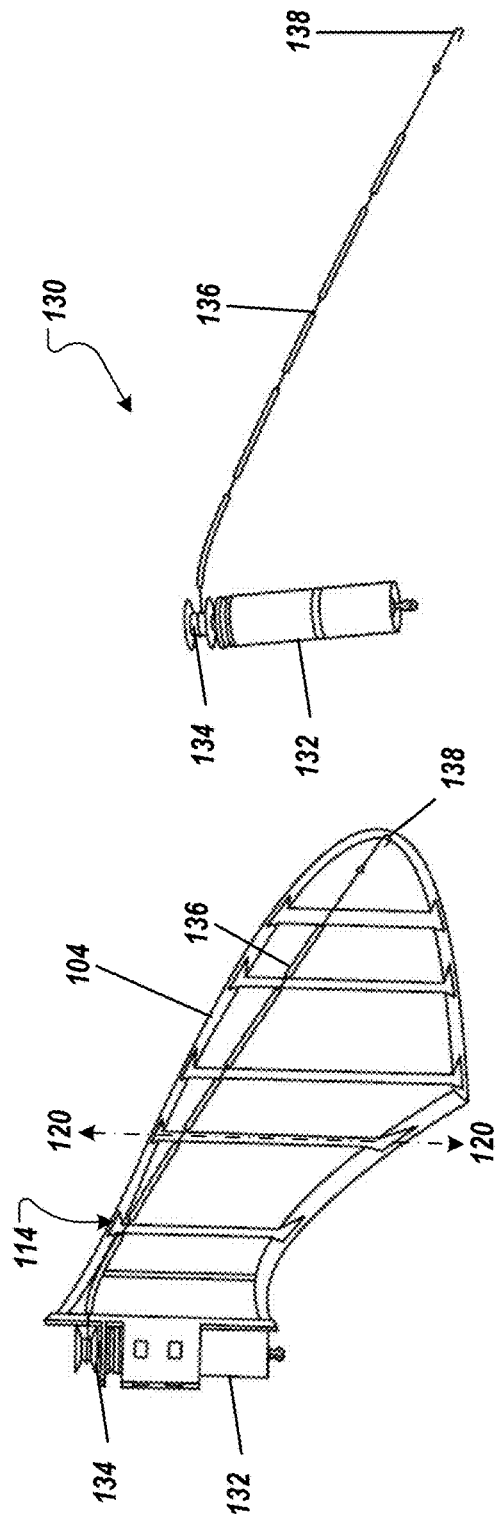

Each arm 104 of the robot 100 includes a first surface 110 and a second surface 112 opposite and spaced apart from the first surface 110, as shown in FIG. 1B. The first surface 110 defines a plurality of channels 114. Each channel 114 includes a proximal end 116 at the first surface 110 and a distal end 118 spaced apart from the proximal end 116. Each channel 114 has a longitudinal axis 120 extending therethrough.

Each of the channels 114 is further defined by two adjacent protrusions. For example, in FIG. 1B, two of the protrusions are labeled 122 and 124. The first protrusion 122 and the second protrusion 124 extend from the first surface 110 of the arm 104. The protrusions 122, 124 each have an end surface 126 separated and spaced apart from the first surface 110. In some implementations, the protrusions are integrally formed with the first surface of the arm.

Each protrusion 122, 124 has a first edge 146 and a second edge 148 opposite and spaced apart from the first edge 146. As shown in more detail in FIG. 2C, a channel 114 is defined between two adjacent protrusions 122 and 124. As shown, the channel 114 is defined by the first edge 146 of the first protrusion 122 and the second edge 148 of the second protrusion 124. The first edge 146 of the first protrusion 122 lies within a first plane that intersects the first surface 110 at a first angle that is about 90°. The second edge 148 of the second protrusion 124 lies within a second plane that intersects the first surface 110 at a second angle that is about 70°.

While the first angle and the second angle are different, in other implementations, the first and second angle are the same. In other implementations, the first edge lies within a first plane that intersects the first surface at a first angle that is angle that is greater than 0° to 90°, and the second edge of each protrusion lies within a second plane that intersects the first surface at a second angle that is greater than 0° to 90°. In other implementations, one or more of the edges of the protrusions lies in a plane that intersects the first surface at an angle that is greater than 90°.

As shown in more detail in FIG. 2C, the angles of the first edge 146 and second edge 148 of the protrusions 122, 124 with respect to the first surface 110 result in the channels 114 of the robot 100 in FIG. 1A having an "inward trapezoid shape". That is, each channel 114 has a right trapezoidal cross-sectional shape as viewed through a plane that is perpendicular to the longitudinal axis 120 of the respective channel 114. Alternative implementations for the shape of the channel 114, along with experimental evaluation, are described below with reference to FIGS. 2A, 2B, 2D, and 2E.

The base 102 of the robot 100 is made from 3D printed thermoplastic polyurethane. In other implementations, the base is made from a different plastic or thermoplastic elastomer.

The actuator 130 includes a motor 132 coupled to a spool 134. A mount 140 of the base 102 removably couples the motor 132 and the spool 134 to the interior of the base 102. The spool 134 is coupled to a tendon 136 having an anchor point 138 on a distal end of the tendon 136. The anchor point 138 includes a hooked portion couplable to the second arm end 108 of the arm 104. The robot 100 includes four actuators 130 corresponding to the four arms 104. The tendon 136 of each actuator 130 extends through the base 102 and into the corresponding arm 104. The tendon 136 extends through several channels 114 of the arm 104 with the anchor point 138 being secured to the second arm end 108. In the implementations shown, the tendon is a wire. In other implementations, the actuator is a spring, a shape memory alloy, or any other mechanism for extending and retracting a member.

Figure 3A:
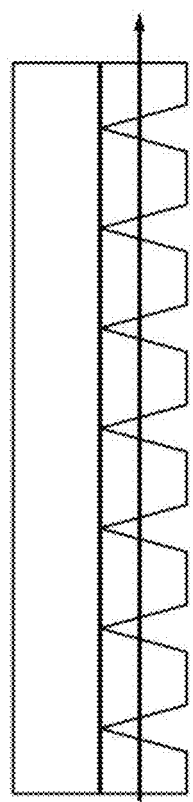
FIG. 3A shows a side view of an arm of a soft modular robot in a flat configuration.
Figure 3B:
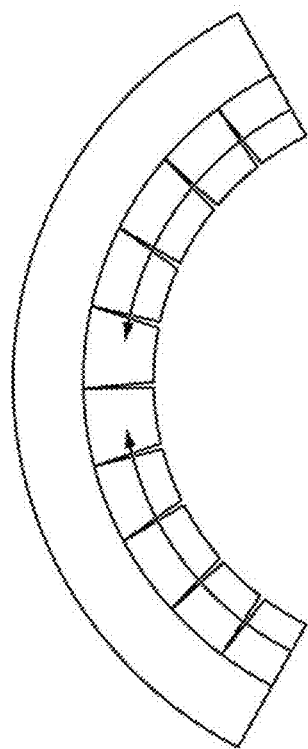
FIG. 3B shows a side view of an arm of a soft modular robot in a curved configuration, according to one implementation.

In use, the actuator 130 is configured to deform the arm 104 between a flat configuration (shown in FIG. 1A, FIG. 3A and the left side of FIG. 4) and a curved configuration (shown in FIG. 3B and the right side of FIG. 4). In the flat configuration, the tendon 136 is in a neutral or extended position. In the flat configuration, each channel 114 has a first width at the distal end 118 of the channel 114.

The soft materials of the arm 104 allow for the change in width of the distal end 118 of the channel 114 and generally allow for the curved orientation of the arm 104 in the curved configuration. Each arm 104 is composed of silicon rubber. In other implementations, the arms are made from a different soft, deformation silicon or plastic material enabling the described deformation.

Figure 1E:
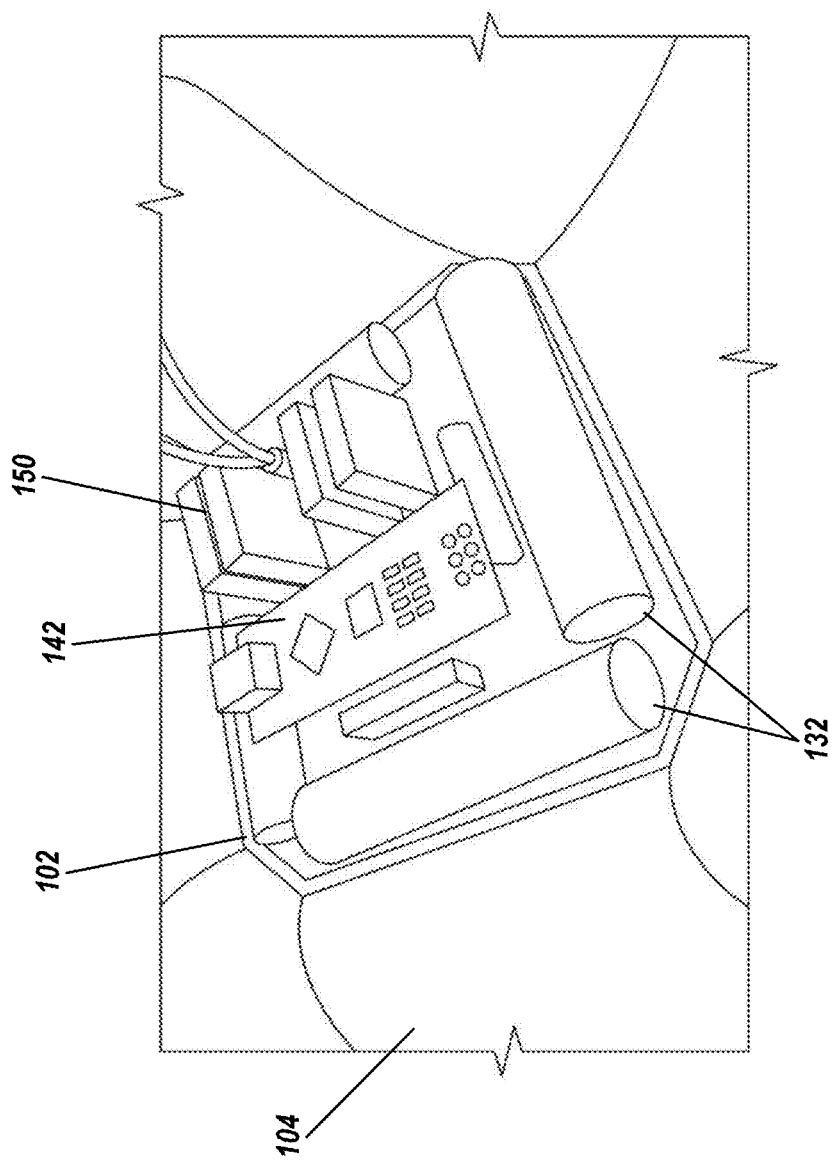
FIG. 1E is a partial view of the interior of the base of the soft modular robot of FIG. 1A.

As shown in FIG. 1E and FIG. 2S, a circuit board 142 is disposed within the base 102, and the circuit board 142 is in electrical communication with the motor 132 via I/O interfaces 440 available on the circuit board 142. A battery 150 is in electrical communication to one or both of the circuit board 142 and the motor(s) 132 to provide power. A power and battery interface 418 may be included on the circuit board 142 for power control circuitry. To move the robot 100 into the curved configuration, the circuit board 142 may include memory 410 storing robot movement software 425, that upon execution, directs the motor 132 to turn the spool 134, which transforms the rotational motion into linear motion by retracting a portion of the tendon 136. The tendon 136 facilitates transmission of force across the arm 104. In the curved configuration, each channel 114 has a second width at the distal end 118 of the channel 114, wherein the first width is greater than the second width. Thus, the soft material (e.g., silicon rubber) of the arm 104 deforms into a contoured or curved shape (as opposed to the flat shape of the flat configuration). Said another way, the flat configuration of the robot 100 and arm 104 has zero curvature while the curved configuration has positive curvature.

The actuator(s) 130 and the corresponding arm(s) 104 of the robot 100 may be selectively and sequentially activated, extended, and/or retracted. The robot 100 is configured such that a specific order of activation among the four arms 104 provides for locomotion (e.g., planar translation and/or rotation) of the robot 100. In some implementations, the circuit board 142 comprises a volatile and non-volatile memory 410 that stores locomotion instructions in robot movement software 425, and a processor 405 that executes the locomotion instructions to activate the actuators 130 in a specific, repeatable sequence. The execution of the locomotion instructions allows for the arms 104 to move between the flat and curved configurations in a manner that moves the robot along a planar surface and/or around an obstacle. In addition to the processors and memory described, circuit board 142 can include telecommunications equipment, such as wireless network interfaces and hardware 430 (e.g., a Bluetooth antenna).

The robot 100 shown includes a circuit board 142 that includes a processor and a memory. The processor can be a general-purpose processor, an ASIC, one or more FPGAs, a group of processing components, or other suitable electronic processing structures. In some embodiments, the processor is configured to execute program code stored on memory to cause the robot to perform one or more operations. The robot 100 may include a display feature that is controlled by graphical processing units or other robot display interfaces 435 controlled by the processor 405 on the circuit board 142. Numerous other accessories may interact with the robot 100 via I/O interfaces 440 also available on a circuit board 142 in the robot 100.

The memory can include one or more devices (e.g., memory units, memory devices, storage devices, etc.) for storing data and/or computer code for completing and/or facilitating the various processes described in the present disclosure. In some embodiments, the memory includes tangible (e.g., non-transitory), computer-readable media that stores code or instructions executable by the processor. Tangible, computer-readable media refers to any physical media that is capable of providing data that causes the robot to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, the memory can include RAM, ROM, hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor, such as via a processing circuit, and can include computer code for executing (e.g., by the processor) one or more processes described herein.

While shown as individual components, it will be appreciated that the processor and/or the memory can be implemented using a variety of different types and quantities of processors and memory. For example, the processor may represent a single processing device or multiple processing devices. Similarly, the memory may represent a single memory device or multiple memory devices.

Figure 5:
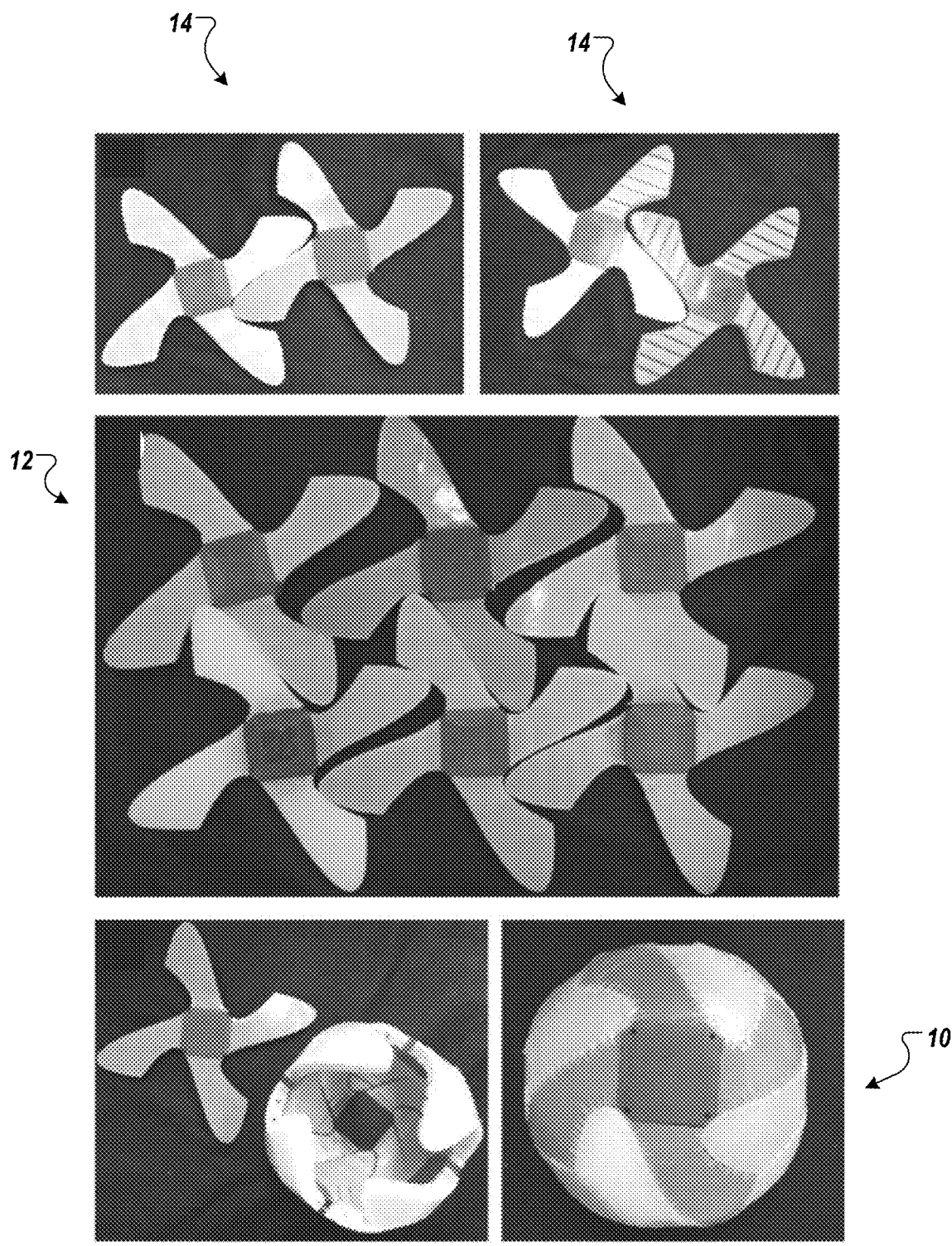
FIG. 5 shows various configurations and arrangements of a plurality of modular soft robots.

While locomotion of a single robot 100 is advantageous, each robot 100 is configured to couple to and/or interact with a second robot 100 having substantially similar or identical structure. For example, a plurality of robots 100 can interlock to form a 2D array 12 (as shown in FIG. 5) or a caterpillar-like chain 14 (FIG. 5). The multi-robot configurations, assemblies, or systems allow for different dynamics compared to the individual robots. The multi-robot system can perform tasks, including locomotion, on variable terrain (e.g., locomotion on a uniform hard surface, climbing on a vertical surface, or generally maximizing the area of contact). The robots 100 of the multi-robot configuration (e.g., array 12 or chain 14) can also communicate with each other via their corresponding circuit boards and/or processors to accomplish coordinated actuation resulting in a desired locomotion. The robots 100 may include telecommunications hardware, such as antennas and receivers, in electronic communication with the processors and the memory of the circuit board 142. The antennas and receivers (e.g., Bluetooth antennas) in each of the robots 100 of the multi-robot configuration (e.g., array 12 or chain 14) can facilitate communication and/or data transmission between the robots 100. In some implementations, the movements and/or the configurations of the robots 100 are coordinated to allow the robots 100 to move or orient themselves together. For example, the movements and/or configurations may be coordinated by a central processor that sends instructions to the processor of each robot 100 or among the processors of the robots 100 communicating directly with each other.

While locomotion of a multi-robot 2D array is advantageous, each robot 100 is configured to couple to and/or interact with other robots to form a 3D structure. For example, the robots 100 are configured to couple to and/or interact with each other to form a sphere 10 shown in FIG. 4. The sphere 10 takes advantage of the soft material of the arms 104 of each robot 100, interlocking and stretching the arms 104 until a near uniform outer surface is formed. In the sphere 10, each of the robots 100 are rotationally symmetric relative to each other such that the curvatures can form the surface of the sphere 10.

The sphere 10 can navigate unstructured terrain more effectively and faster than a single robot 100 or the 2D array 12 or chain 14 of robots. For example, the sphere 10 minimizes surface area contact with a surface, allowing for efficient locomotion. In some implementations, each of the processors on each of the robots 100 can cause actuation of the actuators 130 to curl the arms 104 in a specific, repeatable sequence such that the sphere 10 can roll effectively. As with the 2D array 12, the processors of each of the robots 100 of the sphere 10 can communicate with each other or with a central processor to accomplish coordinated actuation resulting in a desired locomotion.

In some implementations, the sphere 10 is formed from a number of modular soft robots 100 corresponding to the number of faces of a platonic solid (e.g., a cube having 6 faces) and the number of arms 104 on each robot 100 corresponds to the number of edges per face of the platonic solid (e.g., a cube having 4 edges per face). Therefore, in one example, a modular soft robot 100 has four arms 104, each arm having a specific geometry derived from a cube. Six of the four-armed robots 100 interlock and deform together to form a sphere 10. In other implementations, the platonic solid is a tetrahedron, an octahedron, a dodecahedron, or an icosahedron.

Based on the geometry of a selected platonic solid, the shape of the arm 104, when viewed from a top or bottom plan view, is defined by a module-topology curve. The module topology curve is an odd function with constraints at the edges of the platonic solid, such that for edge length of a, the module-topology curve f(x) is:

$$f(x) = f(-x), x \in \left[-\frac{a}{2}, \frac{a}{2}\right] \text{ s.t. } f\left(\frac{a}{2}\right) = f\left(-\frac{a}{2}\right).$$

Figure 6:
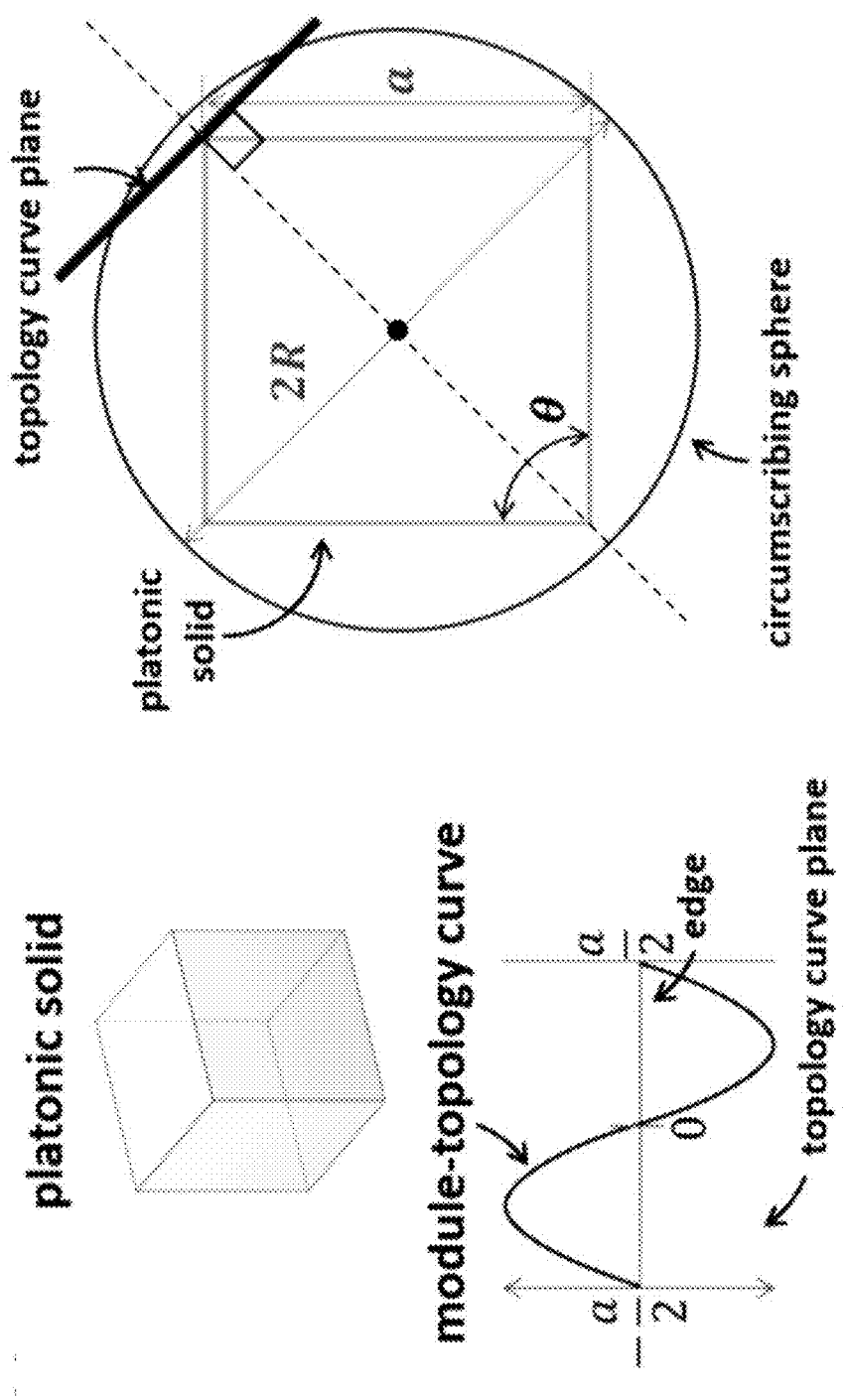
FIG. 6 and FIG. 7 illustrate the design process for a soft modular robot, according to one implementation.
Figure 7:
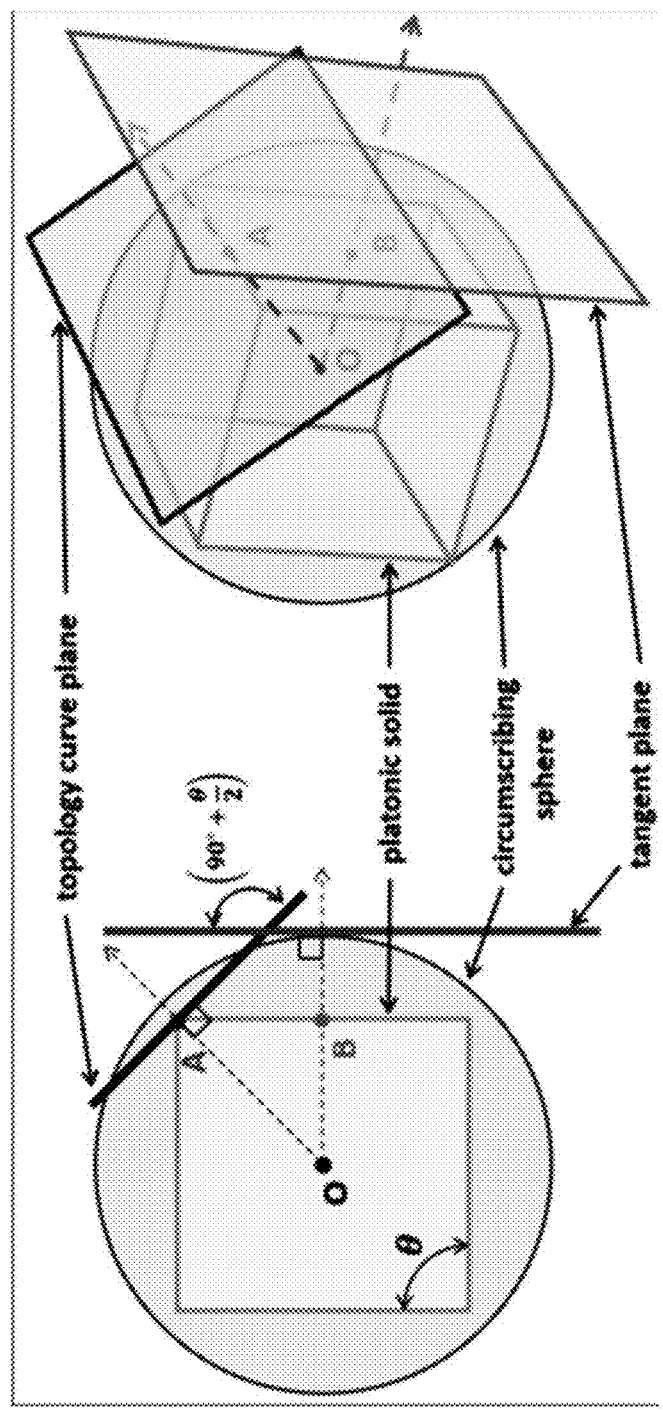
Figure 8:
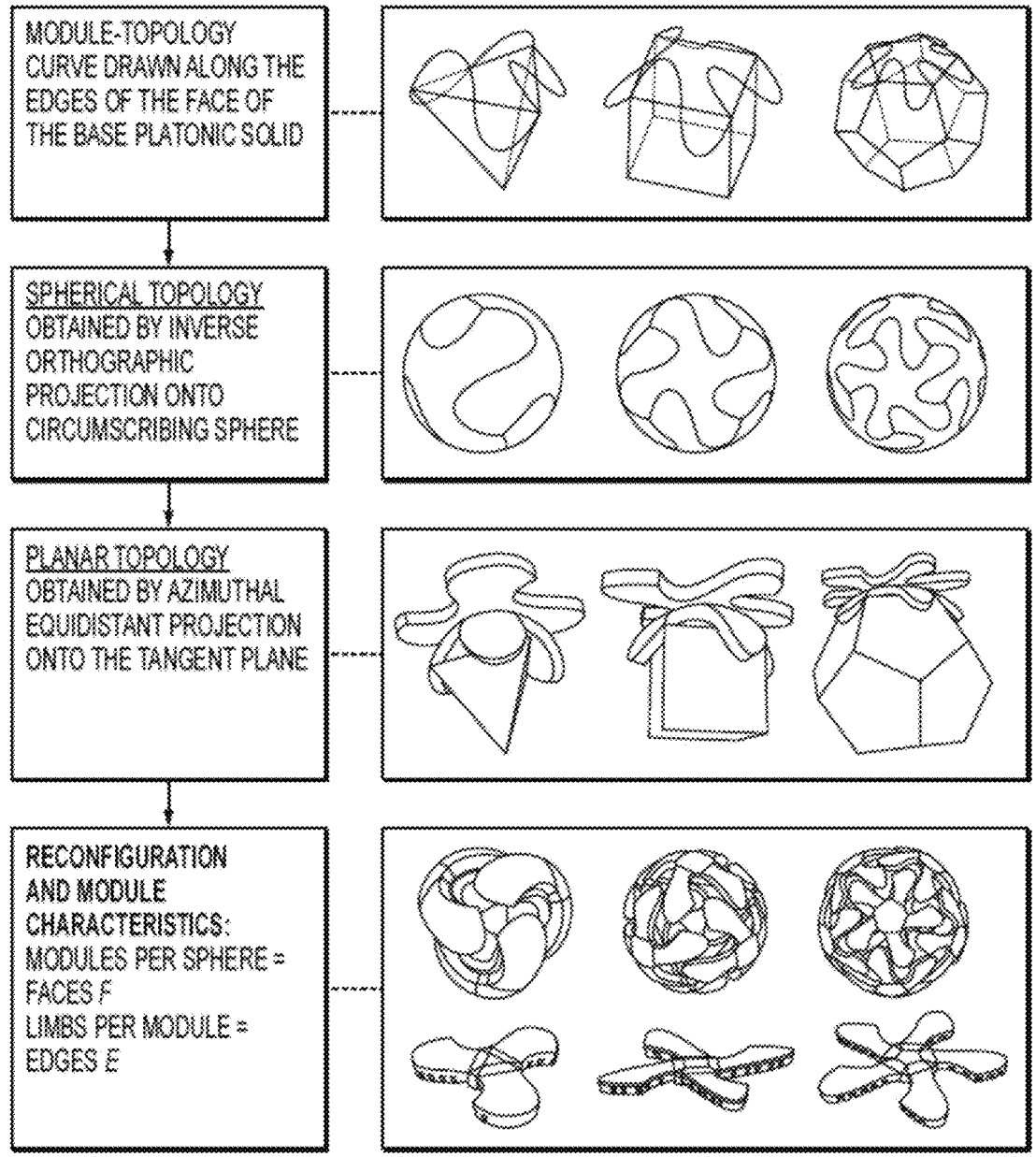
FIG. 8 sequentially articulates the methodology of modular soft robot design, according to one implementation.

Herein described is a method of obtaining the module-topology curve for a given arm 104 of the robot 100, as shown in FIGS. 6-8. A topology curve plane is defined as the plane passing through the edges of the platonic solid and normal to the plane along a vector joining a center of the edge and a center of a circumscribing sphere. The topology curve plane is shown in FIGS. 6 and 7, wherein the example platonic solid is a cube. The module topology curve is drawn on the topology curve planes of all the edges of the face of the platonic solid.

A curved configuration topology is obtained through an orthographic projection of the module topology curves drawn on the topology curve planes onto the circumscribing sphere. This orthographic projection is shown in FIG. 8, wherein spherical topology of the module topology curves is obtained. Here, one can observe a shape similar to that of the arm 104 when formed in the second or curved configuration.

Next, a tangent plane is defined as a plane tangent to the sphere with the normal to the plane along the vector joining the center of the circumscribing sphere and the center of the face of the platonic solid. The tangent plane is shown in FIG. 7. A planar configuration topology is obtained by projecting the curved configuration topology onto the tangent plane, as shown in FIG. 8. The resulting planar configuration topology represents the flat configuration shape of each robot 100 with arms 104 for a given platonic solid. The number of arms 104 per robot 100 is equal to the number of edges of a face of the platonic solid, while the number of robots 100 per sphere 10 is equal to the number of faces of the platonic solid.

Further details on the derivation of this curve and on the process of obtaining the specific shape are provided in methodological and experimental sections below. A description of the module-topology curve, including its derivation and application to the shape of the arms of the robot, is provided in the following experimental and methodology sections.

Figure 9:
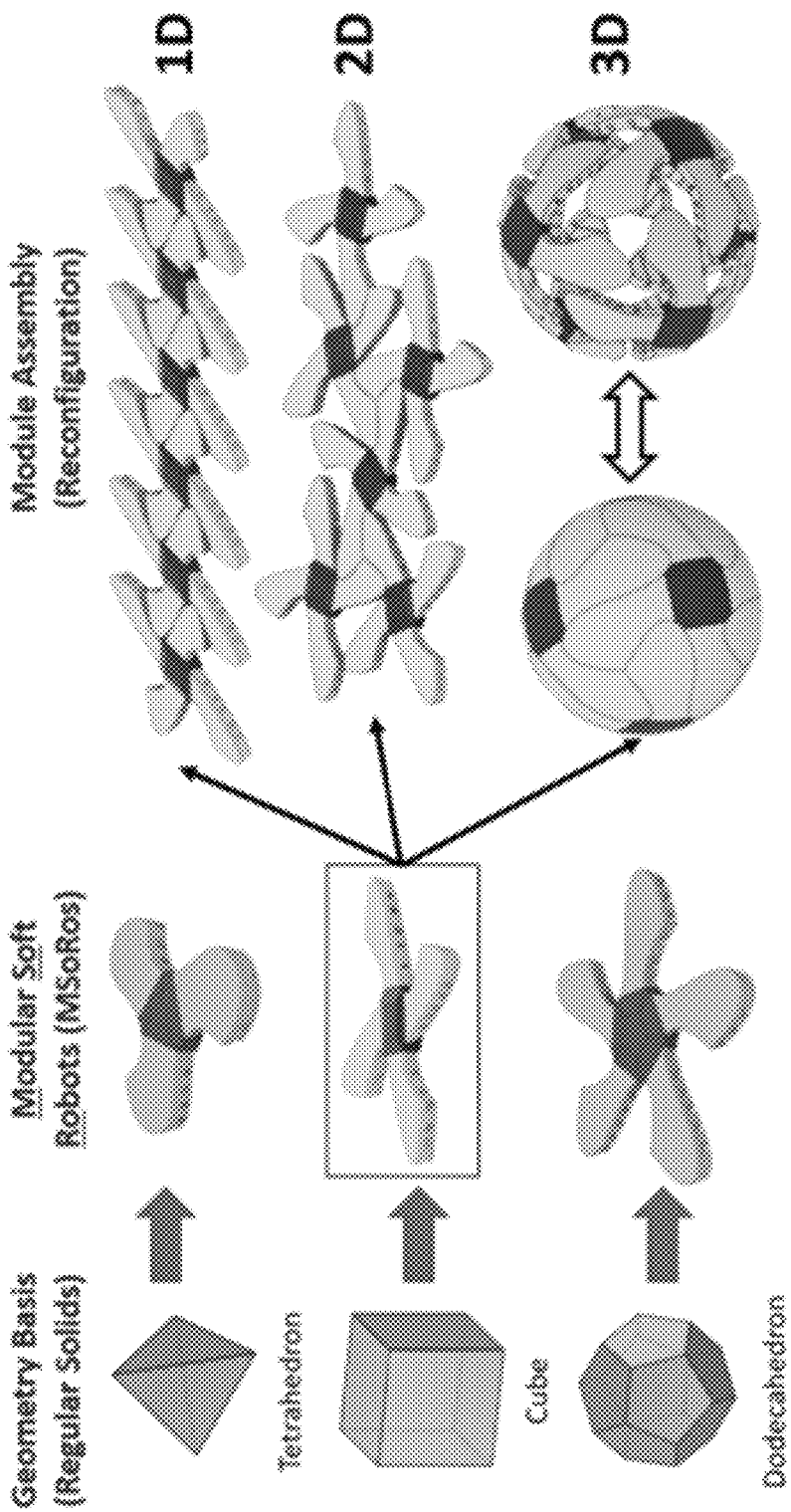
FIG. 9 shows a 3-arm soft robot and a 5-arm soft robot as well as a 3D configuration of a plurality of robots, according to various implementations.

In other implementations, the robot includes less than four arms (e.g., 1, 2, or 3 arms) or more than four arms (e.g., 5, 6, 7, 8, 9, 10, 12, 15, 20 or more arms). For example, FIG. 9 shows a 3-arm and a 5-arm configuration. In a 3-arm configuration, the arms may be spaced equally apart from each other (i.e., 120° from each other). In addition, in implementations that include a greater or fewer number of arms than shown in FIG. 1A, more (e.g., 4, 5, 6, 7, 8, 9, 10, 12, 15, 20, or more) actuators or fewer (e.g., 1, 2, or 3) are included. In some implementations, the number of actuators is fewer than the number of arms (e.g., one actuator coupled to two or more arms).

Example System #2

Figure 10:
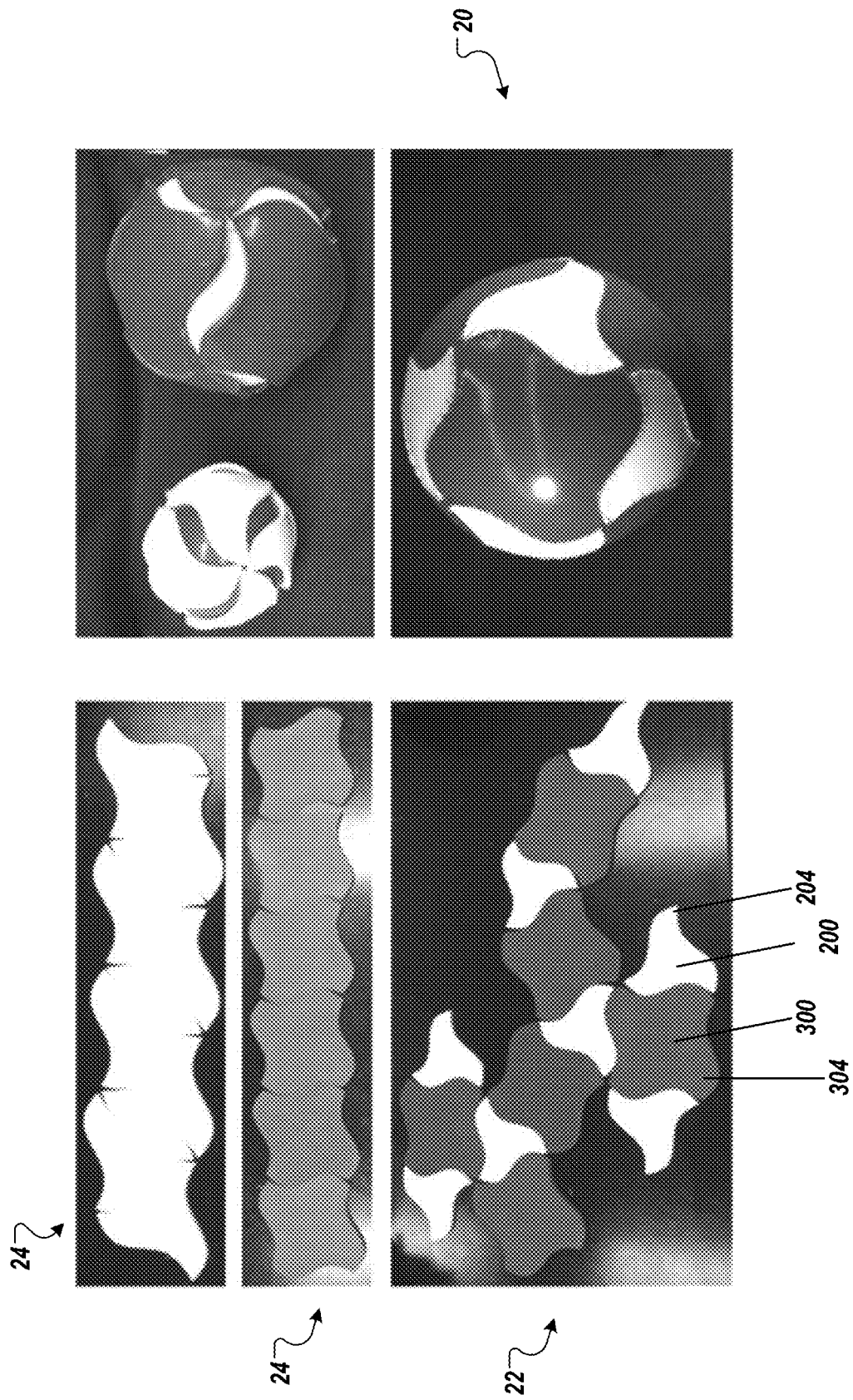
FIG. 10 shows a second system of modular soft robots based on Archimedean geometry in 2D and 3D configurations, according to various implementations.

FIG. 10 shows a sphere 20 made up of a plurality of robots 200, 300, according to one implementation. The sphere 20 of FIG. 10 is similar to the sphere 10 of FIG. 5. However, while the sphere 10 shown in FIG. 5 is homogeneous (i.e., formed from identical robots 100), the sphere 20 shown in FIG. 10 is heterogeneous (i.e., formed from robots 200, 300 different from each other). The heterogeneous configuration of FIG. 10 includes 3-armed robots 200 and 4-armed robots 300. Additionally, while sphere 10 shown in FIG. 5 and corresponding geometry of the robots 100 are based on platonic solids, the sphere 20 shown in FIG. 10 and the corresponding geometry of the robots 200, 300 are based on Archimedean polyhedrons.

A plurality of robots 200, 300 can form a homogenous 2D, caterpillar-like chain 24, as shown in FIG. 10, similar to the chain 14 shown in FIG. 5, and/or a homogenous 2D array 22, similar to the array 12 shown in FIG. 5. A plurality of the robots 200 can form into a homogenous sphere, shown in FIG. 10, and a plurality of the robots 300 can form into a homogenous sphere, shown in FIG. 10. Additionally, a plurality of robots 200, 300 can together form the heterogenous sphere 20 of FIG. 10. The robots 200, 300 are an experimental example of the heterogenous system verifying the topology ability to form the sphere 20. Therefore, all of the active components are not specifically shown in FIG. 10. However, robots 200, 300 described herein are capable of similar operation and movement as robots 100. The operation, including the movement between flat and curved configurations as well as the overall locomotion, is the same for the implementations shown in FIG. 10 as in the implementations shown in FIG. 5. That is, each robot 200, 300 includes the same actuator and corresponding motor and tendon. Each robot 200, 300 includes at least one arm 204, 304 with channels having the same shape as the channels 114. Each robot 200, 300 can deform between a flat configuration and a curved configuration, just as in FIG. 4 and FIGS. 3A-3B. The arms 204, 304 have different shapes than the arms 104.

Figure 11A:
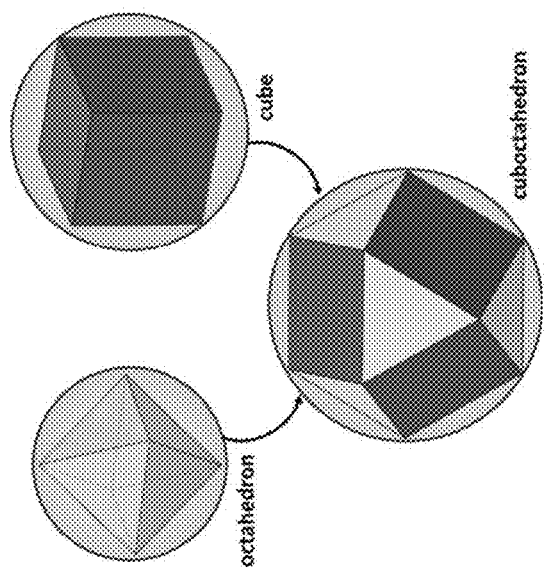
FIG. 11A shows the process of developing an Archimedean solid.

In contrast with platonic solids, Archimedean solids are made up of at least two types of regular polygon faces, as shown in FIG. 11A. Using Archimedean solids as the geometrical basis for the robots 200, 300 allows for a higher number of modular reconfigurations resulting in increased locomotive versatility and robustness of the set.

Figure 11B:
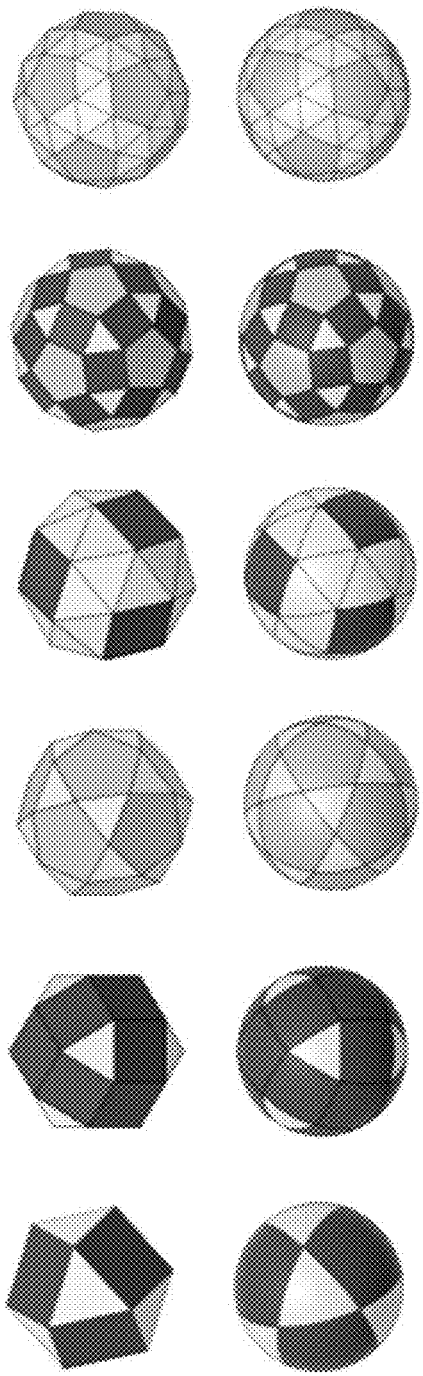
FIG. 11B shows a selection of Archimedean solids, according to one implementation.

While thirteen Archimedean solids exist, only six of them contain faces that are present in platonic solids. Therefore, as shown in FIG. 11B, those six Archimedean solids are shown and described below in the methodological and experimental section. However, in other implementations, any of the Archimedean solids may form the base geometry for robots of this disclosure.

Channel Geometry and Experimental Results

FIGS. 2A, 2B, 2D, and 2E provide alternative implementations for the shape of the channels of the arms 104, 204, 304. For example, in FIG. 2A the channel is a triangular shape wherein each of the first angle and the second angle are greater than 90°. FIG. 2B illustrates a rectangular shaped channel wherein each of the first angle and the second angle are equal to 90°. FIG. 2D illustrates an outward trapezoid shape which is similar to the channel shape of FIG. 2C, except that the first angle is about 70° and the second angle is about 90°. Finally, FIG. 2E illustrates an isosceles trapezoid shape wherein each of the first angle and the second angle are less than 90°.

These variations on the channel result in varied "stiffness" and "curling ability" of the arm 104, 204, 304 upon actuation such that the curvature in the curved configuration may be more or less than that shown in FIG. 4 and FIG. 3B.

Figure 12A:
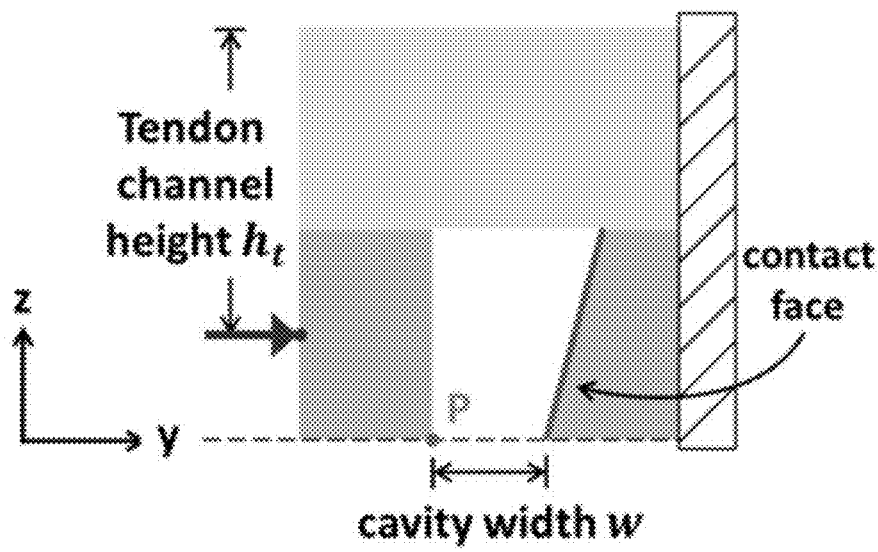
FIG. 12A shows the geometry of a simulated arm section and channel, according to one implementation.
Figure 12B:
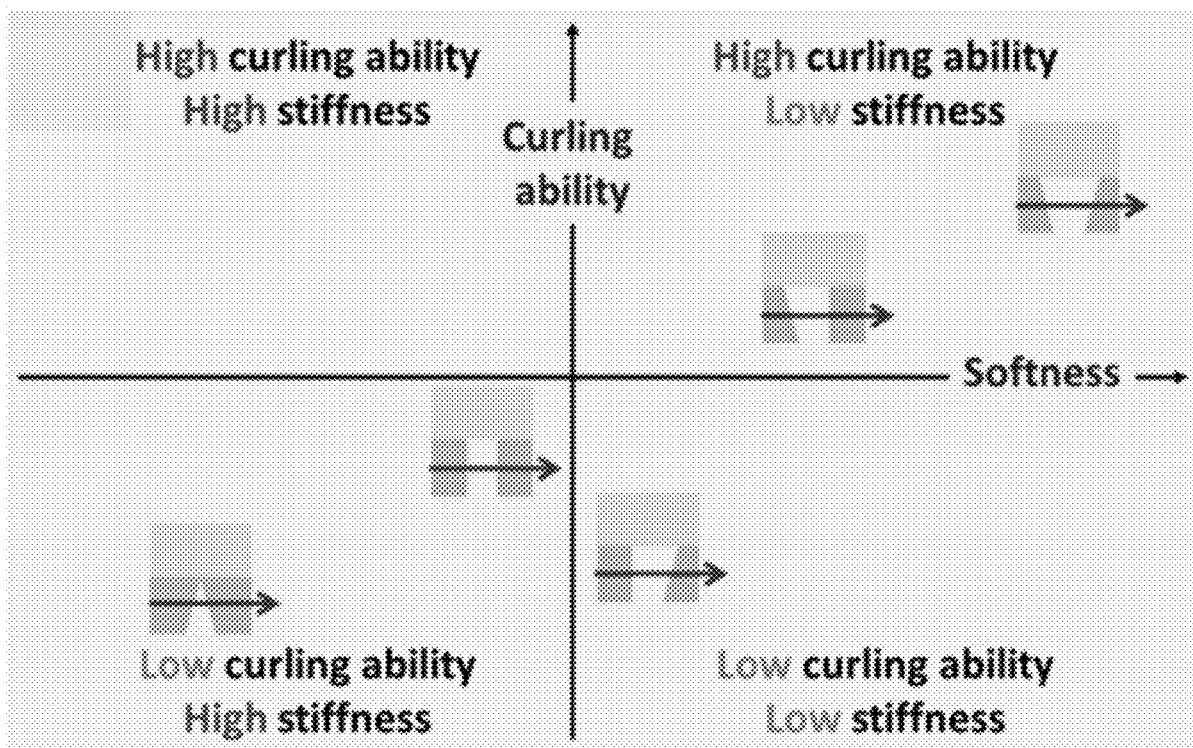
FIG. 12B shows a graph of channel variations, as shown in FIGS. 2A-2E, showing the effects of the channel geometry on the curling ability and stiffness of the arm, according to one implementation.
Figure 12C:
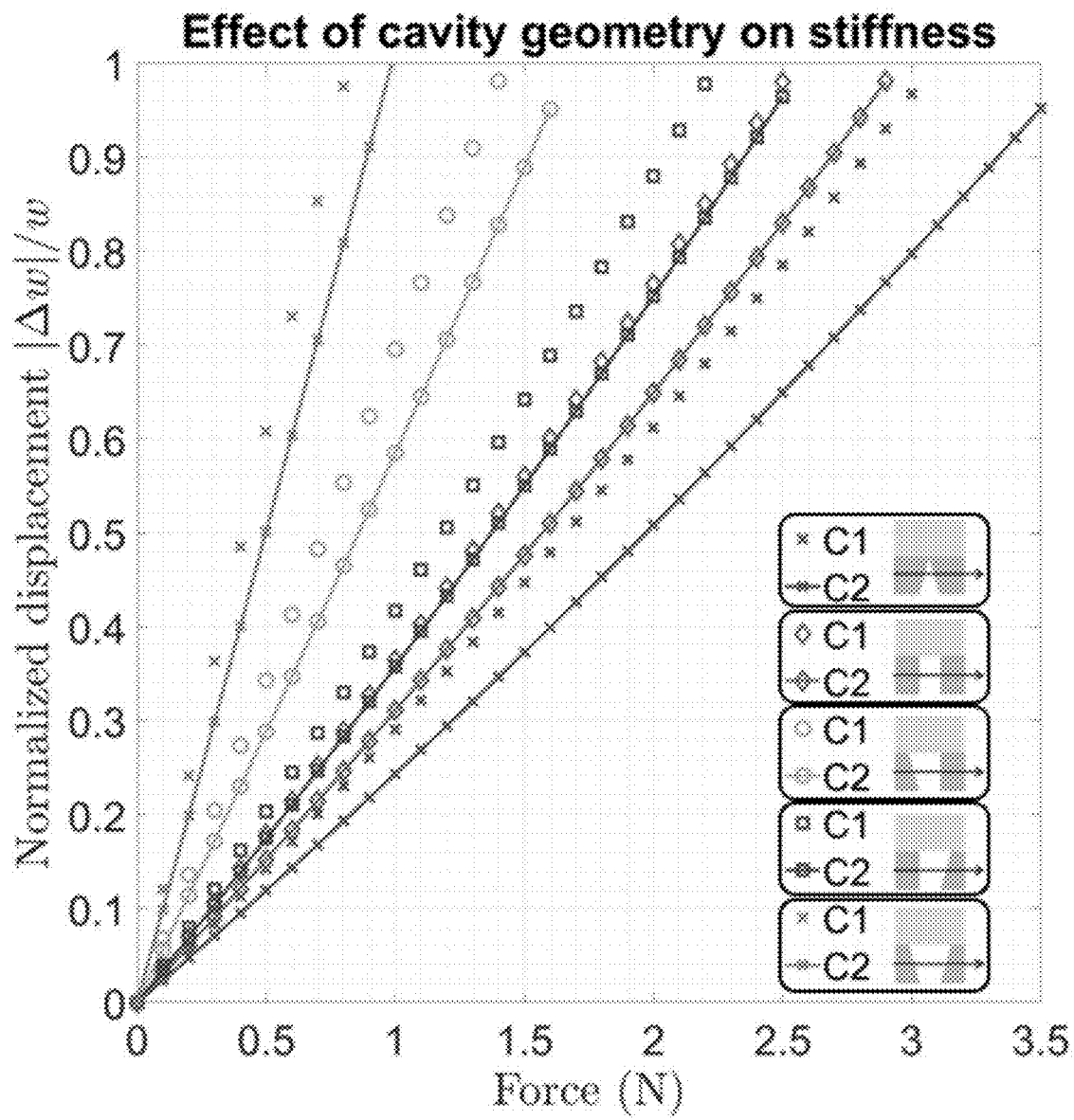
FIG. 12C is a graph of experimental results illustrating the effect of the channel variations on stiffness by simulating an arm section and subjecting it to a force, according to one implementation.
Figure 12D:
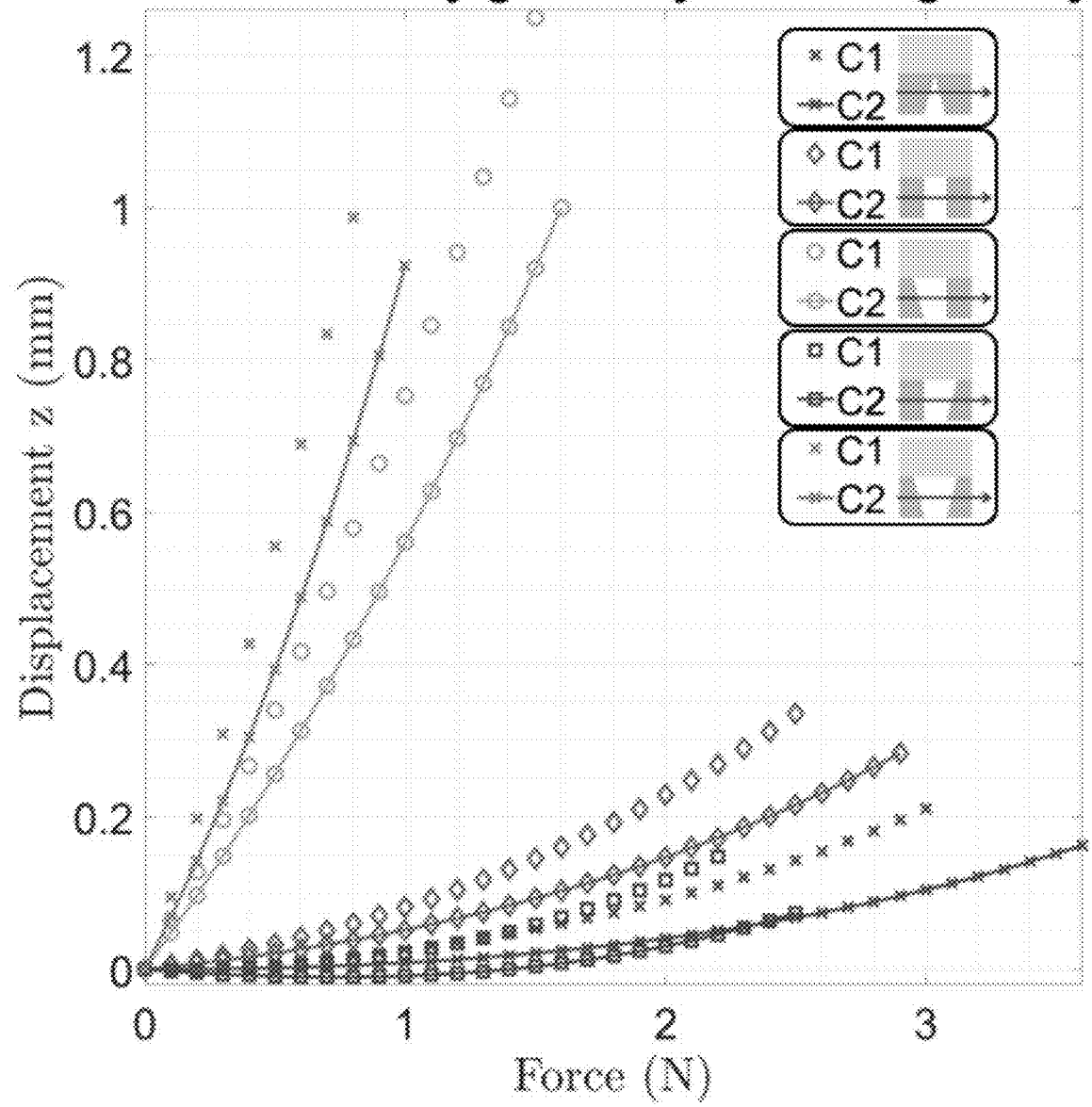
FIG. 12D is a graph of experimental results illustrating the effect of the channel variations on curling ability by simulating an arm section and subjecting it to a force, according to one implementation.

FIGS. 12A-12D show the effect of the FIGS. 2A-2E channel variations by simulating an arm section with a cavity width w and a point force acting at a height $h_r$ at the center of a surface. In the graphs of FIGS. 12C and 12D, steeper slopes imply more softness and higher curling ability.

In the experiments related to FIGS. 12A-12D, two cases were investigated: C1 where $h_r$=15 mm—center of limb; and (C2) $h_r$=16:45 mm—below limb center. The movement of point P is probed in the y, z direction. The 'stiffness' and the 'curling ability' are quantified as the relationships between normalized displacement and applied force, and the z-displacement and applied force, respectively. Steeper slopes imply more softness and higher curling ability. The curling ability to softness plot illustrates the various regions including that of high curling ability and low stiffness—outward and isosceles trapezoid cavity geometry.

Method of Designing the Structure for Example System #1

Presented herein are the results of a study into the topology and morphology design of example Modular Soft Robots capable of reconfiguring between spherical and planar configurations. The approach was based in geometry, where a platonic solid determines the number of modules required for plane-to-sphere reconfiguration and the radius of the resulting sphere, (e.g., four 'tetrahedron-based' or six 'cube-based' Modular Soft Robots are utilized for spherical reconfiguration). The methodology involves: (1) inverse orthographic projection of a 'module-topology curve' onto the circumscribing sphere to generate the spherical topology, (2) azimuthal projection of the spherical topology onto a tangent plane at the center of the module resulting in the planar topology, and (3) adjusting the limb stiffness and curling ability by manipulating the geometry of cavities to realize a physical finite-width, Motor-Tendon Actuated Module Soft Robot that can actuate between the sphere-plane configurations. The topology design is shown to be scale invariant, i.e., scaling of base platonic solid is reflected linearly in spherical and planar topologies. The module-topology curve is optimized for the reconfiguration and locomotion ability using intramodular distortion metric that quantifies sphere-to-plane distortion. The geometry of the cavity optimizes for the limb stiffness and curling ability without compromising the actuator's structural integrity.

Carl Friedrich Gauss' Theorema Egregium states that the Gaussian curvature of a surface does not change if one bends the surface without stretching it, e.g., a cylindrical tube can be unrolled into a plane as they both have curvature of zero. However, a sphere of radius R having positive curvature of $1/R^2$ cannot be flattened into a plane without distorting distances. As an example, in cartography, there is no perfect planar map of Earth, and every projection distorts distances. The deformable nature of soft materials makes them appealing as design materials for robots that need to accommodate for the distortions from such transformations. For example, the ability of soft silicone rubber to stretch and shrink, rather than exclusively bend like paper, makes soft materials ideal for designing robots that can compensate for distortions. Investigation into tiling of spheres by mathematicians and computer graphics community provide insight for developing techniques to topologically design multi-limb Modular Soft Robots. Similarly, the distortion between sphere and plane projections have been quantified using multiple metrics, e.g., Tissot's Indicatrix. The Modular Soft Robots can conform seamlessly between planar and spherical configurations where the resulting distortions are mitigated by the soft material properties.

Scale-Invariant Spherical and Planar Topology Design

Tessellation of a sphere refers to tiling of a sphere without any overlaps and gaps. Spherical polyhedrons provide natural inspiration for tessellating a sphere with identically shaped tiles. They are spherical equivalent of platonic solids where the projections preserve solid angles and vertices (point of intersection between the polyhedron and the circumscribing sphere). This projection of the polyhedron onto the sphere does not preserve the circumference, the surface area or the volume. In three-dimensional space, polyhedrons are solids that are composed of flat surfaces with straight edges and sharp corners (vertices). Platonic solids are convex regular polyhedron having regular faces and solid angles (vertex figures), i.e., all faces are same regular polygon with identical sides and angles. Only five solids meet this criterion—tetrahedron (four faces), cube (six faces), octahedron (eight faces), dodecahedron (twelve faces) and icosahedron (twenty faces). The relationship between the edge length of the platonic solid a, the dihedral angle θ (the angle between the adjacent faces) and the circumradius R can be summarized by the following equation:

$$\theta = 2\arcsin\left(\frac{\cos\left(\frac{\pi}{q}\right)}{\sin\left(\frac{\pi}{p}\right)}\right) \quad \frac{R}{a} = \frac{\sin\left(\frac{\pi}{q}\right)}{2\sin\left(\frac{\pi}{p}\right)}\sec\left(\frac{\theta}{2}\right) \quad (1)$$

where p, q are the number of edges in a face and number of edges meeting at a vertex respectively. Further details on the platonic solids and their attributes are described, along with corresponding images of the solids, in FIG. 13. For example, FIG. 13 provides a projection of all the five platonic solids of edge length a onto a circumscribing sphere of radius R. The number of faces F, edges per face q, and the dihedral angle θ correlate to the number of modules required for spherical reconfiguration, the number of limbs per module and the topology curve plane respectively.

Platonic solids are central to design spherical and planar topologies of rotationally symmetric, homogeneous Modular Soft Robots. More complex module combinations may be derived using convex regular-faced polyhedron as the base solid. This alteration of the base solid is capable of producing rotationally symmetric heterogeneous and asymmetric homogeneous modules. For rotationally symmetric, homogenous Modular Soft Robots, the base platonic solid and the module-topology curve determine the characteristics of the multi-module assembly.

The number of faces of the platonic solid determines the number of modules that will reconfigure to form a sphere. For example, four and six homogeneous Modular Soft Robots based on a tetrahedron and cube respectively, is required for spherical reconfiguration. The module topology curve is drawn on a plane that is normal to the line joining the centers of the circumscribing sphere and the edge of the platonic solid. This plane passes through the edge and is equally inclined at $$\left(90° - \frac{\theta}{2}\right)$$

from the face of the polyhedron where θ, the dihedral angle, is the angle between adjacent faces.

For example, FIG. 6 illustrates the design process based on geometry where the designer has a choice of a platonic solid (cube as a visual example) and module-topology curve. The module-topology curve is drawn along the polyhedron edge on a topology curve plane. The normal to the plane (dotted line) is the vector joining the centers of the circumscribing sphere and the edge of the platonic solid. The dihedral angle θ is the angle between adjacent faces.

Mathematical Equivalent in Isohedral Tilting

The mathematical equivalent of designing homogenous, rotationally symmetric modules is isohedral tiling. Simply put, isohedral spherical tiling implies covering a sphere with identical modules without any gaps or overlaps, only by performing translations and rotations on a single tile. The constraint of rotational symmetry implies that the module-topology curve drawn along each edge and face is the same. Let this curve be denoted by $f(x)$ s.t. $x \in [-a/2, a/2]$. Imagine adjacent faces such that the curves corresponding to each module along the common edge are $f(x)$ and $f(y)$ respectively. The condition of no gaps or overlaps is only satisfied when the curve is invariant under 180 deg rotation about the center of the edge while being continuous at the edges. Equivalently, constraining the module-topology curve to be an odd-function with constraints at the edges.

$$\begin{bmatrix} x \\ f(x) \end{bmatrix} = \begin{bmatrix} \cos\pi & -\sin\pi \\ \sin\pi & \cos\pi \end{bmatrix} \begin{bmatrix} y \\ f(y) \end{bmatrix} \quad (2)$$

$$f(-x) = -f(x) \quad x \in \left[-\frac{a}{2}, \frac{a}{2}\right]$$

$$\text{s.t. } f\left(\frac{a}{2}\right) = f\left(-\frac{a}{2}\right) = 0$$

This provides the design with a multitude of choices. However, the remainder of the discussion focuses on the sinusoidal family of functions:

$$f(x) = A\frac{a}{2}\sin\left(\frac{2\pi}{a}x\right) \quad (3)$$

where $A \in [-1,1]$. For this family of curves with one maxima and minima, the number of limbs per module is equal to the number of edges E of the face polygon.

Spherical Topology

The spherical topology is obtained by inverse orthographic projection, $g_0: \mathbb{R}^2 \to S^2$, of the module topology curve $f(x)$ onto the circumscribing sphere. Given radius of the sphere R, and $(\phi_0, \lambda_0)$ as the latitude and longitude of the origin of the projection, the latitude and longitude of the projection $(\phi_s, \lambda_s)$ are:

$$\phi_s = \arcsin\left[\cos c \sin\phi_0 + \frac{f(x)\sin c \cos\phi_0}{\rho}\right] \quad (4)$$

$$\lambda_e = \lambda_0 + \arctan\left(\frac{x\sin c}{\rho\cos c\cos\phi_0 - f(x)\sin c\sin\phi_0}\right)$$

$$\begin{bmatrix} \phi_s \\ \lambda_s \end{bmatrix} = \begin{bmatrix} \arcsin\left[\cos c\sin\phi_0 + \frac{f(x)\sin c\cos\phi_0}{\rho}\right] \\ \lambda_0 + \arctan\left(\frac{x\sin c}{\rho\cos c\cos\phi_0 - f(x)\sin c\sin\phi_0}\right) \end{bmatrix} \quad (5)$$

$$= g_0(x, f(x), \phi_0, \lambda_0)$$

where $\rho = \sqrt{x^2 + f(x)^2}$, $c = \arcsin(\rho/R)$.

For the example edge shown in FIG. 7 with the base solid as a cube, $\lambda_0 = 45°$, $\phi_0 = 0$. Most CAD software is capable of such orthographic projection and repetition of this process about each edge results in monohedral tiling of the sphere, as shown in FIG. 8.

Planar Topology

The projection of the spherical tile onto a planar surface is necessary for robot fabrication, especially, with finite width that can allow actuators to be incorporated. The azimuthal equidistant projection is chosen as it preserves distance and direction from the center of the projection. Hence, minimal distortion occurs close to the center, where, as is evident later, the least flexible materials (e.g., rigid-flexible motor-tendon actuators) are situated. The deformability of the soft material (silicone rubber in this case) accounts for the area distortions as we move away from the center.

Consequently, as illustrated in FIG. 7, the plane of projection is the tangent plane to the circumscribing sphere with the normal passing through the centers of the sphere and the polyhedron face (dotted line from O to B). Geometrically, the rectangular coordinates for Azimuthal Equidistant projection, $g_0: \mathbb{R}^2 \to S^2$, given sphere radius R and center of projection $\lambda_1, \phi_1$ are:

$$\begin{bmatrix} x_p \\ y_p \end{bmatrix} = Rk'\begin{bmatrix} \cos\phi\sin(\lambda - \lambda_1) \\ \cos\phi_1\sin\phi - \sin\phi_1\cos\phi\cos(\lambda - \lambda_1) \end{bmatrix} \quad (6)$$

$$= g_1(g_0(\phi_0, \lambda_0), \phi_1, \lambda_1)$$

$$= h(x, f(x), \phi_0 \cdot \lambda_0 \cdot \phi_1, \lambda_1)$$

where

-continued $$k' = \frac{c}{\sin c}$$

is the scale factor and $\cos c = \sin \phi_1 \sin \phi + \cos \phi_1 \cos \phi \cos(\lambda-\lambda_1)$. For the example tangent plane in FIG. 7, $\lambda_1 = \phi_1 = 0$.

Scale invariance refers to characteristic of the system's structural properties to remain unchanged (invariant) at different scales. For this case, the planar and spherical topologies are scale invariant—the linear scaling of the planar topology implies linear scaling of the reconfiguring sphere. Practically, from the perspective of a designer, fabrication of a linearly scaled Modular Soft Robot will result in scaling of the reconfigured sphere by the same factor.

Proposition:

For a linearly scaling modular topology curve, the scaling of the base platonic solid is reflected linearly in the spherical and planar topologies.

$$h(\mu x, f(\mu x)) = \mu h(x, f(x)),$$

$$g_0(\mu x, f(\mu x)) = g_0(x, f(x))$$

$$\forall f(\mu x) = \mu f(x) \text{ s.t. } \mu \in \mathbb{R} \quad (7)$$

Proof:

Linear scaling $\mu x$ implies scaling of the base platonic solid edge and the circumscribing sphere radius by the same factor, i.e., $a(\mu x) = \mu a(x), R(\mu a) = \mu R(a)$. Considering spherical topology, $$\rho(\mu x) = \sqrt{(\mu x)^2 + f(\mu x)^2} = \mu \rho(x), \frac{f(\mu x)}{\rho(\mu x)} = \frac{f(x)}{\rho(x)}$$

$$c(\mu x) = \arcsin\left(\rho(\mu x)/R(\mu x)\right) = c(x)$$

$$\Rightarrow g_0(\mu x, f(\mu x)) = g_0(x, f(x))$$

Similarly, for the planar topology, $$k'(\mu x) = k'(x) \Rightarrow h(\mu x, f(\mu x)) = \mu h(x, f(x))$$

The regular faces of the five platonic solids are either a triangle, square or a pentagon (as shown in FIG. 13). Consequently, tetrahedron, cube and dodecahedron will be considered as base platonic solids for designing three, four and five limb robots. The methodology can easily be extended to design homogenous, symmetrical three limb Modular Soft Robots using octahedron and icosahedron. Here, eight and twenty modules, respectively, will be required to reconfigure into a sphere.

FIG. 8 sequentially articulates the methodology of Modular Soft Robots design from design choice of platonic solid and the module-topology curve for the three polyhedrons.

Optimal Module Topology for Locomotion and Reconfiguration Ability

Figure 14:
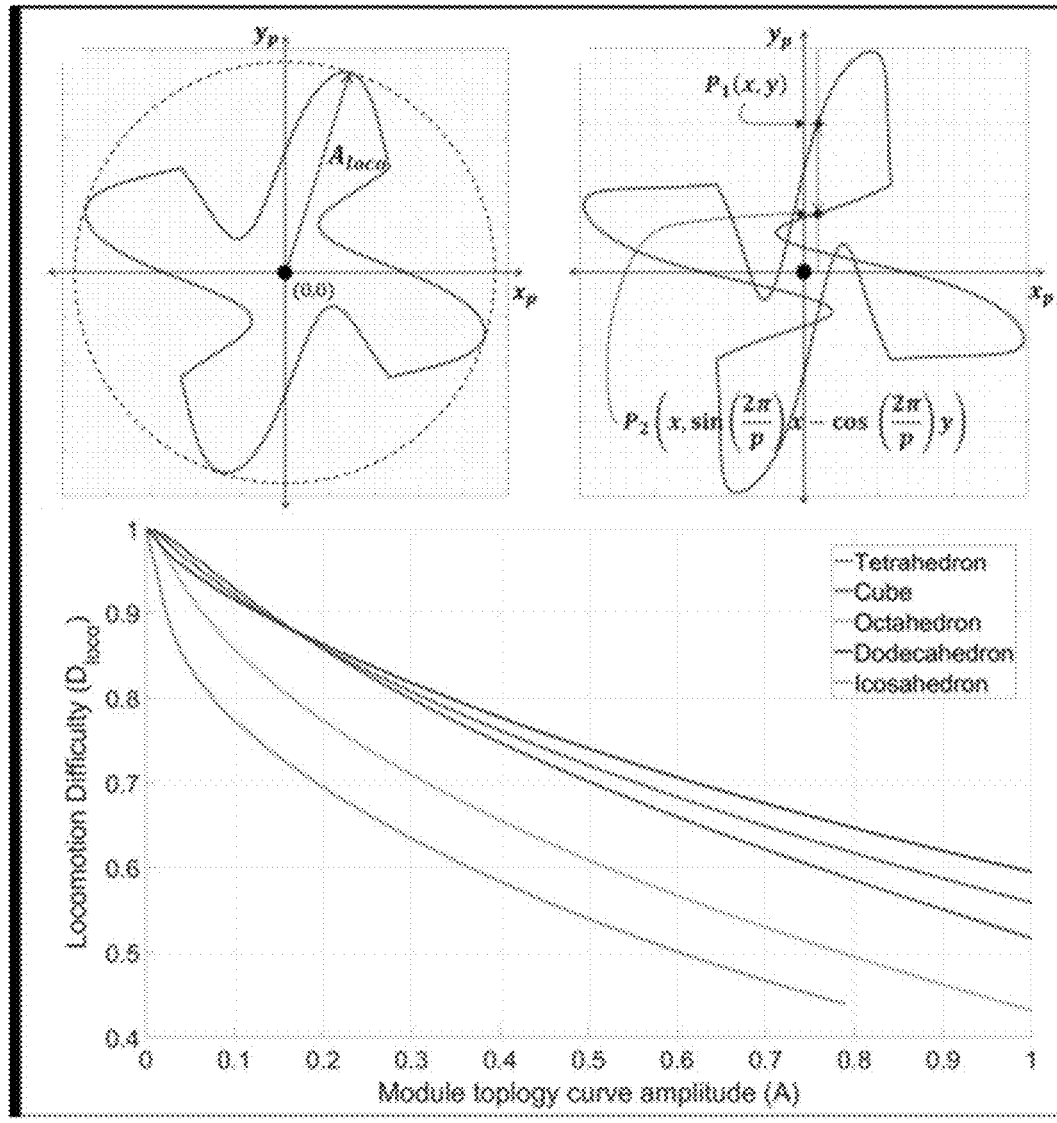
FIG. 14 provides graphs describing the ease of locomotion of arm shapes, according to one implementation.

The topology curve has influence on the locomotion and reconfiguration abilities of the Modular Soft Robots. Conceptually, locomotion results from optimizing forces at different parts of the body. For a soft module, the length of the limb enhances its ability to interact with the environment. Introduced in this section is concept of locomotion ability that quantifies the versatility of the robot module for a variety of locomotion modes under unknown environmental conditions, e.g., maneuvering obstacles using planar and spherical configurations in 1D, 2D or 3D mode. Here, the locomotion ability is assumed to be proportional to the limb length $A_{loco}$, (See FIG. 14). The locomotion difficulty is defined as the inverse of the normalized $A_{loco}$ $$A_{loco} = \max(x_p^2 + y_p^2)$$

$$\text{s.t.} |y_p - \sin(2\pi/p)x_p - \cos(2\pi/p)y_p| > c_{slack}$$

$$x_p \in [-b/2, b/2] \quad (8)$$

where the curve amplitude is constrained such that the planar topology is feasible, i.e., the distance between the curve and the rotated curve, FIG. 14, is always greater than a specified minimum $c_{slack}$. The difficulty of locomotion $D_{loco}$ as the inverse of the normalized limb length:

$$D_{loco}(A) = \frac{\left(\frac{1}{A_{loco}(A)}\right)}{\max_{A \in [0,1]}\left(\frac{1}{A_{loco}(A)}\right)} \quad (9)$$

FIG. 14 shows, for a sinusoidal curve amplitude A, the limb (arm) length $A_{loco}$ is proportional to ease of locomotion. The existence of planar topology is ensured only when the curves do not intersect and the distance between the points $P_1$ and $P_2$ is more than $c_{slack}$. For example, one of the shown graphs is unfeasible as the curves intersect. FIG. 14 plots the difficulty of locomotion as a function of A for all the platonic solids as the module topology amplitude is varied (i.e., a longer arm). Due to infeasible planar topology, $D_{loco}$ and $A_{loco}$ are not defined for $A > 0.79$ with icosahedron as the based platonic solid.

Figure 15:
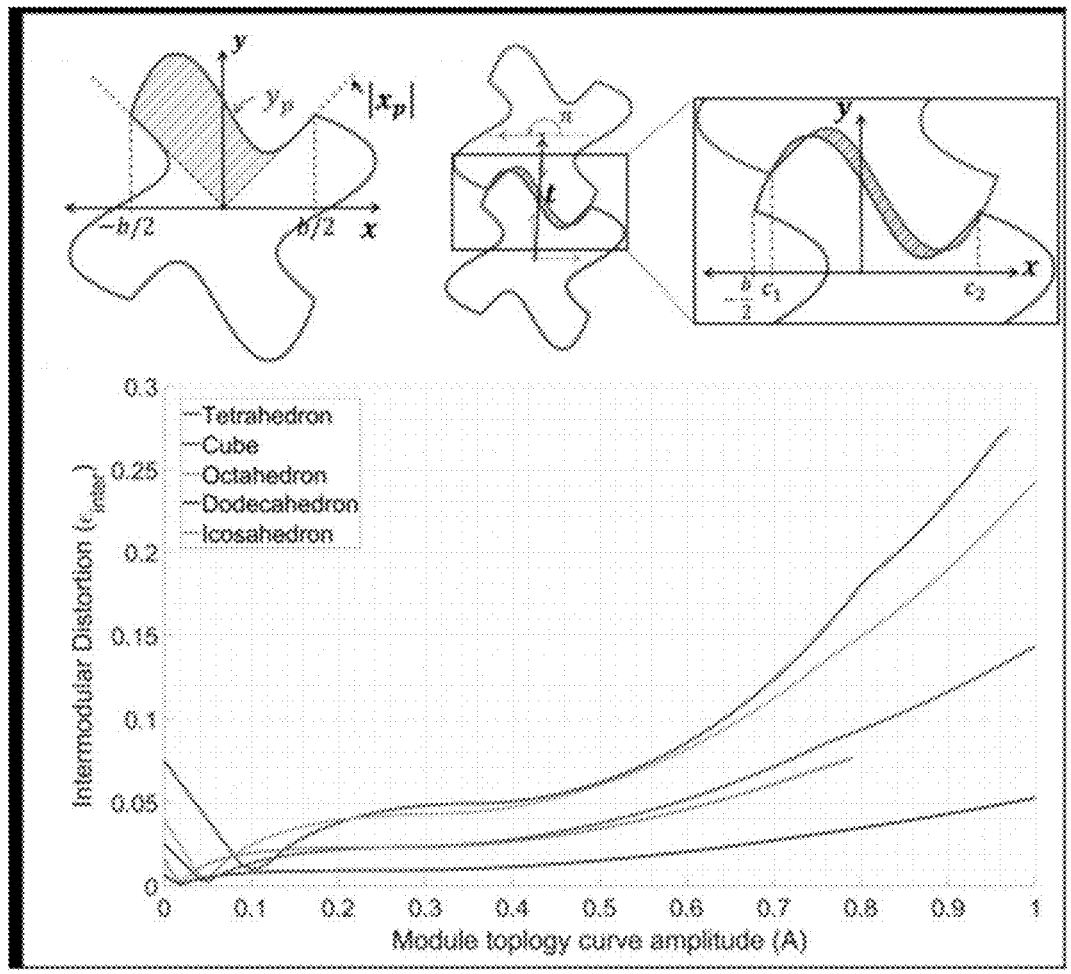
FIG. 15 provides graphs describing intermodular distortion, according to various implementations.

The metrics of quantifying distortions provide insight about the capability of the robot module to reconfigure. Multiple distortion metrics have been proposed to quantify sphere-plane distortions, e.g., Tissot's Indicatrix.1 The reconfiguration ability of Modular Soft Robots leads to quantifying distortions between sphere-and-plane configurations of a single module and those between two adjacent modules (in planar configuration). These dimensionless parameters are referred to as intramodular and intermodular distortions respectively. Intramodular distortion, $E_{intra}$, is the ratio of the surface areas of the top of a single Modular Soft Robot module in planar $A_E$ and spherical configurations $A_S$. The former is calculated as the number of edges multiplied by the limb sector area—the area between the curve of the projected module-topology curve $y_p$ and the limb sector line $$\left|\cot\left(\frac{\pi}{p}\right)x_p\right|,$$

as in FIG. 15. The latter can be obtained by observing that the homogenous spherical monohedral tiling divides the area of the sphere equally among each of the modules.

$$\varepsilon_{intra} = \frac{A_E - A_S}{A_E} \quad (10)$$

where $$A_S = \frac{4\pi R^2}{n}$$

$$A_E = n \int_{-\frac{b}{2}}^{\frac{b}{2}} \left(y_p - \left|\cot\left(\frac{\pi}{p}\right)x_p\right|\right) dx_p$$

-continued where $[x_p, y_p]^T = h(x, f(x), \phi_0, \lambda_0, \phi_1, \lambda_1)$ and $\frac{b}{2} = x_p\left(\frac{a}{2}, 0, \phi_0, \lambda_0, \phi_1, \lambda_1\right)$ for a where $[x_p, y_p]^T = h(x, f(x), \phi_0, \lambda_0, \phi_1, \lambda_1)$ and $\frac{b}{2} = x_p\left(\frac{a}{2}, 0, \phi_0, \lambda_0, \phi_1, \lambda_1\right)$ for a given edge and face (Eqn. 7). This parameter quantifies the necessary surface deformation required for transitioning between planar and spherical configurations. This metric can be used as a design guide to optimize for factors directly affecting the surface deformation, e.g., actuation, material and morphology selection.

The intermodular area $G_E$ is defined as the least possible overlapping surface area between two adjacent modules in planar configuration. Unlike for spherical configuration, the non-zero area is dependent on the distance between the centers of the two modules $t=[t_1, t_2]^T$, FIG. 15. Considering the rotational symmetry and assuming that the modules are placed such that the module curves are rotated by 180 deg, the rotated curve $(x'_p, y'_p)$ and the infinitesimal area between the curves $dA$ is $$\begin{bmatrix} x'_p \\ y'_p \end{bmatrix} = \begin{bmatrix} t_1 \\ t_2 \end{bmatrix} + \begin{bmatrix} \cos(\pi) & -\sin(\pi) \\ \sin(\pi) & \cos(\pi) \end{bmatrix} \begin{bmatrix} x_p \\ y_p \end{bmatrix}$$

$$dA = y_p(x_p)dx_p - y'_p(x_p)dx'_p = (y_p(x_p) + y_p(-x_p + t_1) - t_2)dx_p$$

And the intermodular area is calculated as $$G_E = \min_t \int_{o_1}^{o_2} (y_p(x_p) + y_p(-x_p + t_1) - t_2)^2 dx_p \tag{11}$$

where the interval $$[c_1, c_2] = \left[-\frac{b}{2} + t_1, \frac{b}{2} + t_1\right] \cap \left[-\frac{b}{2}, \frac{b}{2}\right],$$

FIG. 15. Subsequently, the intermodular distortion $\varepsilon_{enter}$ is defined as $$\epsilon_{inter}(A) = \frac{G_E}{A_E} \tag{12}$$

The objective function is defined as the weighted sum of locomotion difficulty cost and intermodular distortion (reconfiguration difficulty). Consequently, the optimal curve amplitude A* is obtained by minimizing this objective function $$J(A) = \alpha \epsilon_{inter} + (1-\alpha)D_{loco}, \alpha \in [0, 1] \tag{13}$$

$$A^* = \min_A J(A)$$

Figure 16:
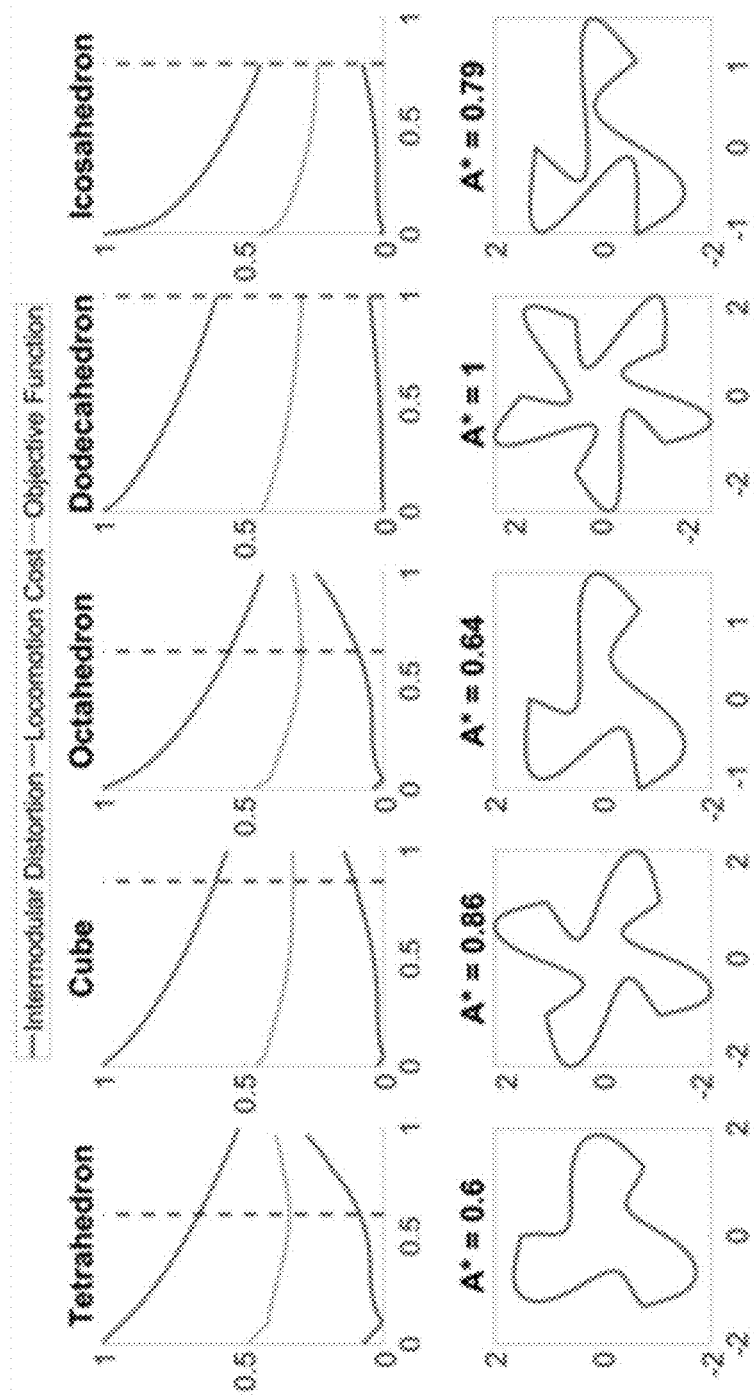
FIG. 16 describes the intermodular distortion and locomotion cost for different planar module configurations for the five platonic solids, according to one implementation.

Numerical optimization was performed on the objective functions in MATLAB® for weight $\alpha$=0.56 to obtain A* and corresponding planar module configuration for the five platonic solids (shown in FIG. 16). The three limb modules resulting from tetrahedron, octahedron and icosahedron provide more insight. As the number of modules required for spherical reconfiguration increases, the amount of required distortion also decreases, hence, allowing for longer module limb, i.e., A*.

Optimizing Cavity Geometry for Limb Stiffness and Curling Ability

Terrestrial soft robots have been actuated by pneumatic actuators, shape memory alloys, dielectric elastomers and motor-tendon combination. Electro-mechanical actuators have the advantage of being more precise, high bandwidth and less electronic payload. Motor Tendon Actuators (MTAs), also known as cable motor actuators, have shown promise in soft robotics, manipulators, and wearable exo-suits applications. They use an integrated tendon motor drive to elastically deform the actuator's soft body. By embedding them inside the soft body, the material properties can be manipulated to design lighter, robust, and efficient soft actuators. Additionally, tendon drives are uniquely suited for soft robotics application because of their simplicity, flexibility, and ability to transmit the motor torque as a directional force to remote locations. These attributes result from the four fundamental components of motor, spool, tendon, and anchor points, (See FIG. 1A). The motor simultaneously supplies the actuation torque and acts as one of the required anchor points. The spool interfaces the motor and tendon by converting the rotational into linear motion to regulate the speed, tension, and alignment of the attached tendon. The tendon facilitates transmission of force across the body to other (or final) anchor points. The anchor point refers to location or points where the tendon is fixed to the body, component, or any other arbitrarily assigned fixture. The MTA incorporated inside the Modular Soft Robot limb is referred to as an MTA limb, FIG. 1C A flexible material central hub holds the control payload and motors for MTA limbs, FIG. 1D.

The morphology of the limb plays a critical role in the design of a finite-width Modular Soft Robot that can actuate between configurations with zero and positive curvatures. The topology designs obtained thus far are insightful, however, do not consider complexities of fabrication, e.g., material properties, weight of the electronic payload and actuation constraints. For this discussion, reference is made to curling and uncurling as the motions that transition the limb from planar to spherical configuration and vice versa. For Modular Soft Robots, an MTA limb must be soft enough to curl to a desired Gaussian curvature and simultaneously lift the weight of the potential payload. At the same time, it should have enough elastic energy in the spherical configuration to uncurl back to the planar configuration without any actuation. These traits are referred to as the limb 'stiffness' and 'curling ability'. As a designer, controlled curling can be geometrically achieved by introducing cavities along the thickness of the MTA limb, broadly referred to as morphological computation. Here the manipulation of stiffness and curling ability can be achieved by altering the cavity geometry.

Imagine uncurling of a MTA limb where an infinitesimal rectangular cavity in spherical configuration will result in a triangular shaped cavity in the planar configuration, FIGS. 3A-3B. Considering the limb as a planar beam, the cavity width w determines the bending curvature beyond which the MTA limb will experience high stiffness. Geometrically, the desired cavity width w desired is $$w(b, r) = \frac{r\psi - (r-h)\psi}{m} = \frac{2h}{m}\sin^{-1}\left(\frac{b}{2r}\right) \quad (14)$$

$$w_{desired} = \frac{2h}{m}\sin^{-1}\left(\frac{a}{2R}\right)$$

where m, h are number of cavities and their height respectively. For the desired spherical configuration, b, r are a, R respectively (given the base platonic solid). However, these calculations are purely geometric, and the material properties are not considered. Interestingly, the manipulation of the cavity geometry can directly influence the limb stiffness without compromising the actuator's structural integrity. Five profiles are considered (increasing order of polygon area)—triangle, rectangle, inward (right) trapezoid, outward (right) trapezoid and isosceles (inward-outward) trapezoid, FIG. 2A-E. The increase in shape polygon area implies removal of soft material. The 'outward' and 'inward' labels correspond to how the right-angle side of the trapezoids is aligned with the direction of actuation (direction of maroon arrow). The right-angled side is 'pulled' toward the non-right-angle side for the inward trapezoid shape, and vice versa for the outward.

The limb stiffness and curling ability is analyzed by simulating the deformation of the limb section with single cavity for different geometries. The simulations are performed in Autodesk Fusion 360® using non-linear static studies with customizable material properties for elastomers. Empirically determined Mooney-Rivlin constants are used for hyperelastic Smooth-on Dragon Skin™ 10A.12, 19 The response to motor-tendon actuation is estimated by simulating a single cross-section of the limb where the tendon force is assumed to be a point force acting normal to the surface at a distance $h_t$ from the top surface at the middle of the face while the other side of the limb section is constrained not to move, FIG. 12A. The movement of the point P at the tip of the cavity was probed for displacements in y and z directions. The simulation model considers limb height to be l=30 mm, h=20 mm, w=2.35 mm and trapezoid obtuse angle to be 70 deg, and two cases: (C1) $h_t$=15 mm, (C2) $h_t$=16.45 mm.

The stiffness of the limb section is quantified as the relationship between the normalized displacement in y direction, w/w, and the applied force. Similarly, the relationship between the z displacement and the force is defined as the curling ability of the section, FIGS. 12A-12D. The results re-affirm the intuitive hypothesis that increase in the cavity polygon area will decrease stiffness and the material will feel softer. However, the effect of geometry on the curling ability is not intuitive due to the directional nature of the force. The behavior of inward and outward trapezoid geometries is starkly visible in their curling ability, where the former is outperformed by the latter. The isosceles trapezoid geometry is seen to be the softest with highest curling ability. The simulation results present the outward and isosceles trapezoid geometries to be most suitable for Modular Soft Robots that reconfigure between a planar and spherical configuration, FIGS. 12A-12D. Experimentally, for the chosen MTA, it is observed that outward trapezoid geometry provides the optimal stiffness and curling ability to lift the weight of the electronic payload and transform between the two configurations. Additionally, the experiments highlight the uncurling ability of inward and isosceles trapezoid geometries is hindered due to the frictional interactions when the point P moves along the contact face. The Modular Soft Robots are fabricated using the outward trapezoid cavity geometry, FIG. 4. The curling-uncurling is achieved through actuation of the MTA. However, the Gaussian curvature of the curled limb surface (product of the principal curvatures) depends upon the routing path of the tendon inside the limb.

Fabrication and Spherical Reconfiguration

A four limb spherically reconfigurable Modular Soft Robot capable of planar locomotion was designed by using a cube of a=11 cm edge (four edges and six faces) as the base platonic solid and module topology curve of sinusoidal family with A=0.86. The Module Soft Robot comprises four MTA limbs and a central hub. The central hub is 3D printed using NinjaFlex® thermoplastic polyurethane and houses the control and actuation payload (motor and electronics), FIG. 1E. Each limb of height l=30 mm is cast in planar configuration using Smooth-On Dragon Skin™ silicone rubber (mixing liquid silicone components and degassing in vacuo) with m=5 outward trapezoidal geometry cavities (h=20 mm, trapezoid obtuse angle 70 deg) that allow them to curl between the planar and spherical configuration with curvature radius of R=19 cm. Rapid curling and uncurling of the soft limbs is achieved using MTA that comprises of a back drivable motor, pulley, fishing line tendon (ht=16.45 mm) and treble hook for anchoring. The azimuthal projection between the two configurations implies an increase of distortion with the radial distance from the center of projection. This informs the fabrication and limb design decisions in a three-fold manner. Firstly, the central hub experiences minimal distortion during reconfiguration, permitting encapsulation of the stiffest robot components at this position. Secondly, the stiffness theoretically decreases with the radial distance, facilitating realization of equal Gaussian curvatures along the principal axes (sphere) when multiple modules dock in the spherical configuration. This will be possible due to the intermodular interaction forces that arise during docking. Finally, the Modular Soft Robot can be cast in a planar configuration which allows for passive uncurling of the limb that is assisted by the elastic energy stored during curling.

FIG. 5 illustrates the four-limb Modular Soft Robots on a planar surface and the gaps (distortion) between them when projected on flat surface. Collectively, the six fabricated Modular Soft Robots can be reconfigured into a sphere which has different dynamics in comparison to the planar configuration. These modules do not have docking mechanisms and are mechanically connected for experimental validation. The multimedia attachment illustrates four-limb Modular Soft Robots reconfigured into a sphere and performing locomotion (translation and rotation) in the planar configuration. The supplemental video illustrates four-limb Modular Soft Robots reconfigured into a sphere and performing locomotion (translation and rotation) in the planar configuration. The fabrication and actuation of the Modular Soft Robots serve as experimental validation for the topology and morphology design concepts presented in this paper. The fabricated Modular Soft Robots integrate multiple components for different stiffness—rigid motors and electrical components, flexible hub and the soft body.

Empirical adjustments to the design (e.g., cavity spacing) have been made to compensate for the material non-uniformity.

Method of Designing the Structure of Example System #2

Introduction

Roboticists have long looked to nature for inspiration to make robots that are more versatile, adaptable, and resilient. Many robotic systems incorporate biological features, simulating swarm behavior or shape-morphing ability. For example, armadillos and pangolins perform legged locomotion, but can roll into a ball for self-defense. This reconfiguration ability inspires modular robots that are capable of group behavior (e.g., rolling) entirely distinct from any individual capability (e.g., walking). This increased versatility has motivated a large field of research, typically constrained to rigid robots and conventional joints [6-8]. The advent of soft materials in the field of robotics allows for change in the shape of the robot modules that has potential to further exploit the dynamics of the reconfigured system. As an example, the locomotion dynamics of a planar robot (2D) are different from that of a series of them connected in a caterpillar-like configuration (1D) or a spherical ball (3D), FIG. 9. This is due in part to the changing amount of area of contact with the environment. The research into topology and morphology design of modular soft robots is very recent, with the primary focus on the modular nature of the robotic system. However, mathematically, soft materials afford topological advantages. One may observe the example of spherical reconfiguration, i.e., reconfiguration of a set of Modular Soft Robots into a sphere configuration, where their default state is the planar configuration. The cartography analogy of this process is that of flattening a sphere onto a planar map. This cannot be achieved without distortions, as per Gauss' Theorema Egregium. It states that the Gaussian curvature of a surface does not change if one bends the surface without stretching it; a cylindrical tube can be unrolled onto a plane as they both have curvature of zero. However, a sphere of radius R having positive curvature of $1/R^2$ cannot be flattened onto a plane without distorting distances and/or shapes.

The design of spherical 'modules' is the equivalent of spherical tessellation widely explored in art by M. C. Escher. To make this process possible using materials with approximately zero curvature, Delp et al. describe a process, inspired by clothing design, of smoothing an octahedron to form a round sphere. These concepts can be borrowed and adapted to perform analytical parametric design optimization of the Modular Soft Robot topology. This is contrasted with the more popular but costly finite element method (FEM)-based design optimization of soft robots. Recently, Freeman et al. have investigated the topology design of homogeneous three, four or five-limb Modular Soft Robots that can reconfigure into a sphere. This design methodology is based on the five Platonic solids (which have identical polygonal faces) where the number of faces and edges per face correspond to the number of required modules for reconfiguration and module limbs, respectively. For example, a robot designed with the cube as the base Platonic solid results in a four-limb (equal to the number of square edges) Modular Soft Robot where six (the number of cube faces) modules are required for reconfiguration into a sphere. The work experimentally validates the ability of a Modular Soft Robot to (1) achieve locomotion using Motor-Tendon Actuators (MTAs) in a single module, and (2) compensate for topological distortion to realize linear (1D), planar (2D), and spherical (3D) configurations. However, this reconfiguration is limited to homogeneous (identical face) modules and to a spherical reconfiguration of only one set radius.

System #2 and the related research extends the topology design and optimization to heterogeneous Modular Soft Robots, e.g., three-limb and four-limb, which can reconfigure collectively into a heterogeneous sphere. Furthermore, they possess the capability of homogeneous spherical homogeneous reconfiguration, e.g., reconfiguration into one sphere of exclusively three-limb Modular Soft Robots and another of exclusively four-limb Modular Soft Robots. This is done by exploring the topology design and optimization of Modular Soft Robots using one of six possible Archimedean solids as the base polyhedron. Archimedean solids are made up of at least two types of regular polygonal faces and can therefore be used as a geometrical basis for a set of heterogeneous Modular Soft Robots (i.e., Modular Soft Robots with at least two different module shapes). This allows for a higher number of modular reconfigurations resulting in increased locomotive versatility and robustness of the set. The summary of the design methodology is visualized in FIG. 17. The topology is determined by the selection of one Archimedean solid and two or more Platonic solids, as well as an odd-function module topology curve (MT-curve); the use of an odd function for the M-T curve drawn tangent to a polyhedral edge ensures isohedral spherical tiling. Each Archimedean solid presents a unique multi-module assembly, enabling Modular Soft Robot systems of varying spherical radii and number of modules. This methodology is divided into the forward design (to construct the planar module topologies by modeling and subsequently projecting spherical configuration(s)) and the inverse design (to model the additional spherical configuration(s) from the planar configurations). The forward design generalizes to heterogeneous Modular Soft Robots. The final spherical topology is then obtained via an inverse azimuthal equidistant projection onto the tangent plane of the new sphere.

As the robot is expected to deform to achieve change in curvature between spherical and planar configurations, planar and spherical distortion metrics are defined to quantify reconfiguration difficulty. These distortions metrics model the gaps and overlapping area between adjacent modules in heterogeneous and homogeneous configurations normalized to the areas of the modules. The weighted cost function incorporating both distortion metrics is then minimized to find the optimal topologies. As the design processes is nonlinear, the selection of a Platonic solid as the starting polyhedron (i.e., the decision to use a Platonic solid for homogeneous forward design as opposed to an Archimedean solid for heterogeneous forward design) is significant and motivated by the results shown in the paper. The optimal M-T curves are found for a Modular Soft Robot system based on the hexahedron (cube) and octahedron as the Platonic solids and the cuboctahedron as the Archimedean solid. The results are validated in both MATLAB simulations and experiments (silicone casting of the modules). To find the best possible set of heterogeneous reconfigurable Modular Soft Robots, a set with homogeneous forward design based on Platonic solids and inverse design based on an Archimedean solid is compared to a set with heterogeneous forward design based on an Archimedean solid and inverse design based on Platonic solids.

Forward Module Topology Design

The overall module topology design methodology is a sequential process that involves (1) selection of the base polyhedral (one Archimedean solid and two or more Platonic solids), (2) selection of the module-topology curve (MT-curve) drawn on the topology plane, (3) generation of the spherical module topology through inverse orthographic projection of the MTcurve onto the circumscribing sphere, (4) construction of the planar module topology using azimuthal equidistant projection of the spherical topology onto the tangent plane, and (5) the generation of an additional spherical module topology via inverse azimuthal equidistant projection and polyhedral vertex alignment. Steps 1-4 in this process collectively comprise the forward design, FIG. 17 while step 5 refers to the inverse design. Forward design is the process of designing the spherical (S) topology of a module for a given MT-curve (design space PD) and using it to generate the module's planar topology (P). Conversely, inverse design is the process of obtaining the spherical configuration (S) from the planar configuration (P), FIG. 17.

Figure 17:
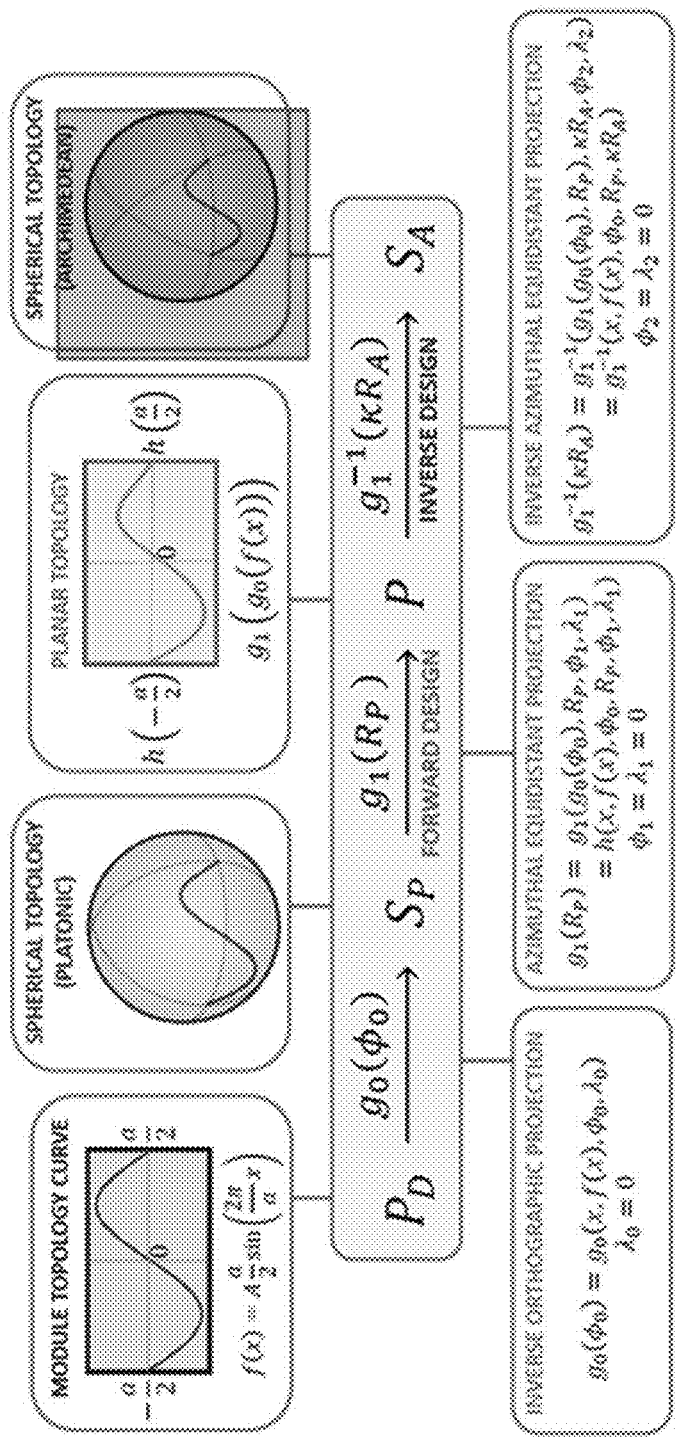
FIG. 17 summarizes the design methodology for a soft modular robot, according to one implementation.

For both of these processes, the base polyhedra determine the projection details. The forward design can either model homogeneous (based on Platonic solids) or heterogeneous reconfiguration (based on an Archimedean solid). FIG. 17 presents homogeneous forward design; the flowchart for heterogeneous forward design would be identical, except for the swapping of the positions of the Platonic (SP) and Archimedean (SA) solids. While both methodology flows result in multiple planar modules capable of both heterogeneous and homogeneous planar and spherical reconfiguration, the resulting configurations are different due to the nonlinearity of the design process. The presented framework is generic in which both homogeneous and heterogeneous forward design are defined, analyzed, and later compared (Section 5). Homogeneous forward design essentially consists of multiple applications of the Platonic solid-based methodology. Presented herein is the generalization of this method for both homogeneous and heterogeneous forward design.

Selection of Base Polyhedra

While there exist thirteen Archimedean solids, only six exclusively contain faces that are present in Platonic solids. Therefore, this example methodology is limited to these six Archimedean solids presented in FIG. 11B. For this discussion, the example of a set of heterogeneous Modular Soft Robots is considered based on a cuboctahedron which has fourteen faces: six squares and eight triangles. The corresponding Platonic solids are then defined to be a cube and an octahedron, FIG. 11A. Consequently, this Modular Soft Robot design will result in fourteen modules: eight three-limb modules based on the triangular faces and six four-limb modules based on the square faces. Individually, the six four-limb Modular Soft Robots and eight three-limb Modular Soft Robots can reconfigure into two different spheres. The resulting Modular Soft Robot system will therefore be capable of both heterogeneous and homogeneous planar and spherical configurations. Moreover, the two radii, $\{R'_1, R'_2\}$, of the homogeneous spherical configurations (cube, octahedron-based) will differ from the radius of the heterogeneous spherical reconfiguration (cuboctahedron-based), R.

While the cuboctahedron is chosen as an example in this paper to elucidate the principles, any of the six Archimedean solids presented here may be chosen. The characteristics of the Modular Soft Robot system are then determined by the characteristics of the selected Archimedean solid, shown in Table 2 and its corresponding Platonic solids, shown in FIG. 13. For both homogeneous and heterogeneous spherical configurations, the number of faces F of the base polyhedron is equal to the number of modules comprising the sphere and the circumradius R is equal to the radius of the sphere. The number of edges per module p is proportional to the number of limbs on each module and is determined by the number of zero-crossings of the MT-curve. However, in this work we limit the MT-curve to having only three zero-crossings for simplicity. Therefore, the number of edges per module p is equal to the number of limbs on each module. The selection of the Archimedean solid automatically determines the Platonic solids, as the number of edges per face must correspond. Finally, Archimedean solids with more than one unique edge type are expected to present more difficult reconfiguration.

TABLE 1

Shows the Characteristics of Platonic Solids.

| Solid | F | E | p | q | R/a | $\phi_0$ | $\beta$ |
|---|---|---|---|---|---|---|---|
| tetrahedron | 4 | 6 | 3 | 3 | $\dfrac{\sqrt{6}}{4}$ | $\dfrac{\cos^{-1}\left(\dfrac{-1}{3}\right)}{2}$ | $\cos^{-1}\dfrac{1}{3}$ |
| cube | 6 | 12 | 4 | 3 | $\dfrac{\sqrt{3}}{2}$ | $\dfrac{\pi}{4}$ | $\cos^{-1}\dfrac{1}{\sqrt{3}}$ |
| octahedron | 8 | 12 | 3 | 4 | $\dfrac{\sqrt{2}}{2}$ | $\dfrac{\cos^{-1}\left(\dfrac{1}{3}\right)}{2}$ | $\cos - 1\dfrac{\sqrt{6}}{3}$ |
| dodecahedron | 12 | 30 | 5 | 3 | $\dfrac{\sqrt{15}+\sqrt{3}}{4}$ | $\dfrac{\cos^{-1}\left(\dfrac{-\sqrt{5}}{3}\right)}{2}$ | $\cos^{-1}\sqrt{\dfrac{5+2\sqrt{5}}{15}}$ |
| icosahedron | 20 | 30 | 3 | 5 | $\dfrac{\sqrt{10+2\sqrt{5}}}{4}$ | $\dfrac{\cos^{-1}\left(\dfrac{-\sqrt{5}}{5}\right)}{2}$ | $\cos^{-1}\sqrt{\dfrac{74+60\sqrt{2}}{30+6\sqrt{5}}}$ |

F is the number of faces, E is the number of edges, p is the number of edges per face, q is the number of faces that meet at a vertex, R/a is the ratio of the circumradius R to the edge length a, $\phi_0$ is the face-center-edge angle, $\beta$ is the face center to vertex angle.

TABLE 2

Characteristics of Archimedean solids made up of exclusively faces that also occur in Platonic solids.

| Solid | F | E | p | q | $R_0/a$ | i |
|---|---|---|---|---|---|---|
| cuboctahedron | {8, 6} | 14 | {3, 4} | 4 | 1 | 1 |
| small rhombicuboctahedron | {8, 18} | 48 | (3, 4) | 4 | $\dfrac{\sqrt{5+2\sqrt{2}}}{2}$ | 2 |
| icosidodecahedron | {20, 12} | 60 | {3, 5} | 4 | $\dfrac{1+\sqrt{5}}{2}$ | 1 |
| snub cube | {32, 6} | 60 | {3, 4} | 5 | 1.3437 | 2 |
| small rhombicosidodecahedron | {20, 30, 12} | 120 | (3, 4 5} | 4 | $\dfrac{\sqrt{11+4\sqrt{5}}}{2}$ | 2 |
| snub dodecahedron | {80, 12} | 150 | {3, 5} | 5 | 2.1558 | 2 |

F is the number of faces, E is the number of edges, p is the number of edges per face, q is the number of faces that meet at a vertex, R/a is the ratio of the circumradius R to the edge length a, i is the number of unique edges types.

Module Topology Curve

The module topology curve (MT-curve) f(x) determines the module shape. This curve is a function of a polyhedral edge of length a and must be an odd function coinciding with the edge vertices at the ends:

$$f(x) = f(-x), \text{ s.t. } f\left(\frac{a}{2}\right) = f\left(-\frac{a}{2}\right) = 0 \qquad (1)$$

There are infinite choices that satisfy these constraints. However, for this discussion we consider the family of sinusoidal functions, i.e., $$f(x) = A\frac{a}{2}\sin\left(\frac{2\pi}{a}x\right) \qquad (2)$$

for a given MT-curve amplitude $A \in [-1,1]$. This family of curves is chosen because it is smooth, mathematically simple, and contains one maxima and one minima on along its domain $x \in [-a/2, a/2]$. Thus, each module will have the same number of legs as the number of edges of the base polyhedron face p. This curve lies on the topology curve plane, FIG. 18.

Geometry of Projection Planes

Figure 18:
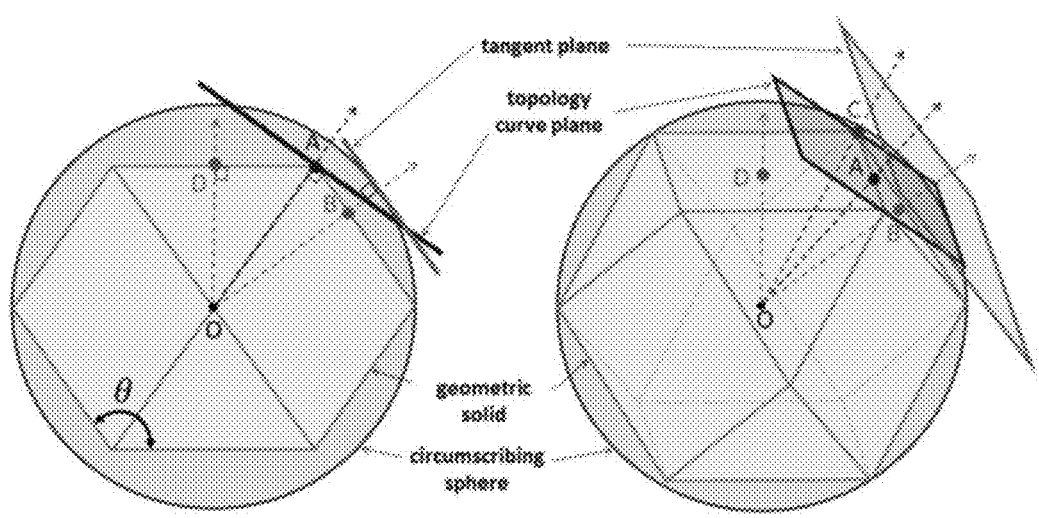
FIG. 18 illustrates the design process for a soft modular robot, according to one implementation.

Forward design consists of a series of projections that are made with respect to two projection planes: the topology curve plane and the tangent plane, as shown on a cuboctahedron in FIG. 18. The topology curve plane lies coincident to the polyhedral edge and tangent to the vector joining the solid's center and the polyhedral edge midpoint. The tangent plane lies tangent to the solid's circumscribing sphere and parallel to a polyhedral face. These two planes are related by a constant angle $\varphi_0$ determined by the base solid (e.g., octahedron, cube, or octahedron); this constant angle is subsequently incorporated into the projections. This angle $\varphi_0$ is equal to the face-center-edge angle of the solid, the central angle whose sides intersect the center of a polyhedral face and its adjacent edge midpoint. Note that Archimedean solids will have multiple face-center-edge angles as each solid will have a unique angle $\varphi_0$ for every unique face. Another significant angle is the face-center-vertex angle $\beta$, the central angle whose sides intersect the center of a polyhedral face and its adjacent vertex. The great-circle distance of $\beta$ equals the preserved azimuthal distance in the second projection in the forward design. The angles $\varphi_0$ and $\beta$ are used to ensure proper tessellation of the spherical topology in the forward design and vertex alignment in the inverse design, respectively.

Platonic solids have perfect symmetry in their faces, edges, and vertices and therefore have common radii and angles at every edge. The angles $\varphi_0$ and $\beta$ for Platonic solids are listed in FIG. 13. Archimedean solids, however, possess only vertex symmetry. Thus, each unique Archimedean face with p edges has unique angles $\varphi_{0,p}$ and $\beta_p$. These can be found via trigonometric equations in terms of the circumradius R, the edge length a, and the apothem $e_p$ for a given p-gon face:

$$\phi_{0,p} = \cos^{-1}\left(\frac{\sqrt{R^2 - (a/2)^2 - e_p^2}}{\sqrt{R^2 - (a/2)^2}}\right), \qquad (3)$$

$$\beta_p = \cos^{-1}\left(\frac{\sqrt{R^2 - (a/2)^2 - e_p^2}}{R}\right)$$

Apothem lengths for face shapes that occur in Platonic solids are listed in Table 3.

Forward Spherical Topology

Figure 19A:
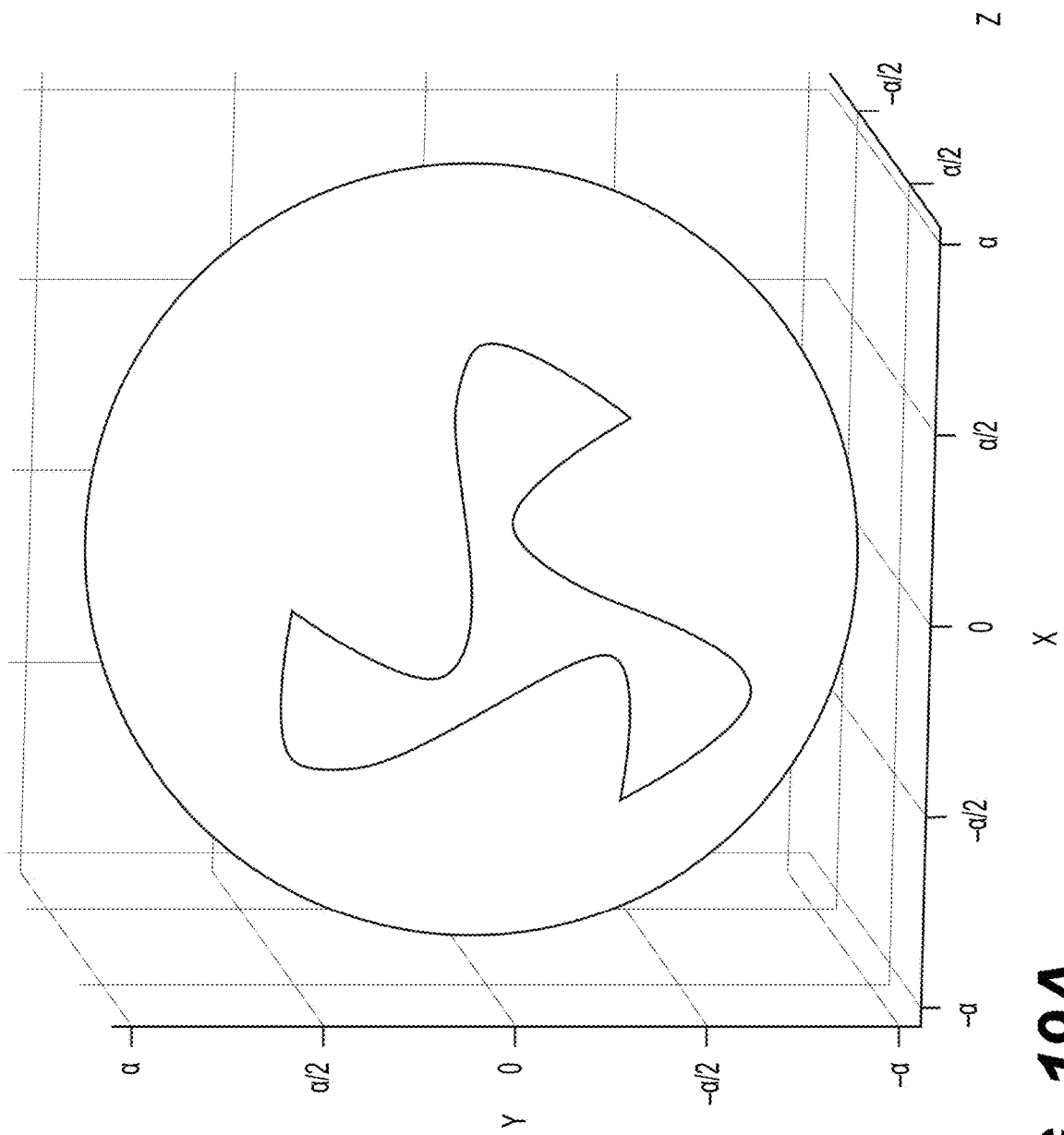
FIG. 19A shows a three-limb module with spherical topology, according to one implementation.
Figure 19B:
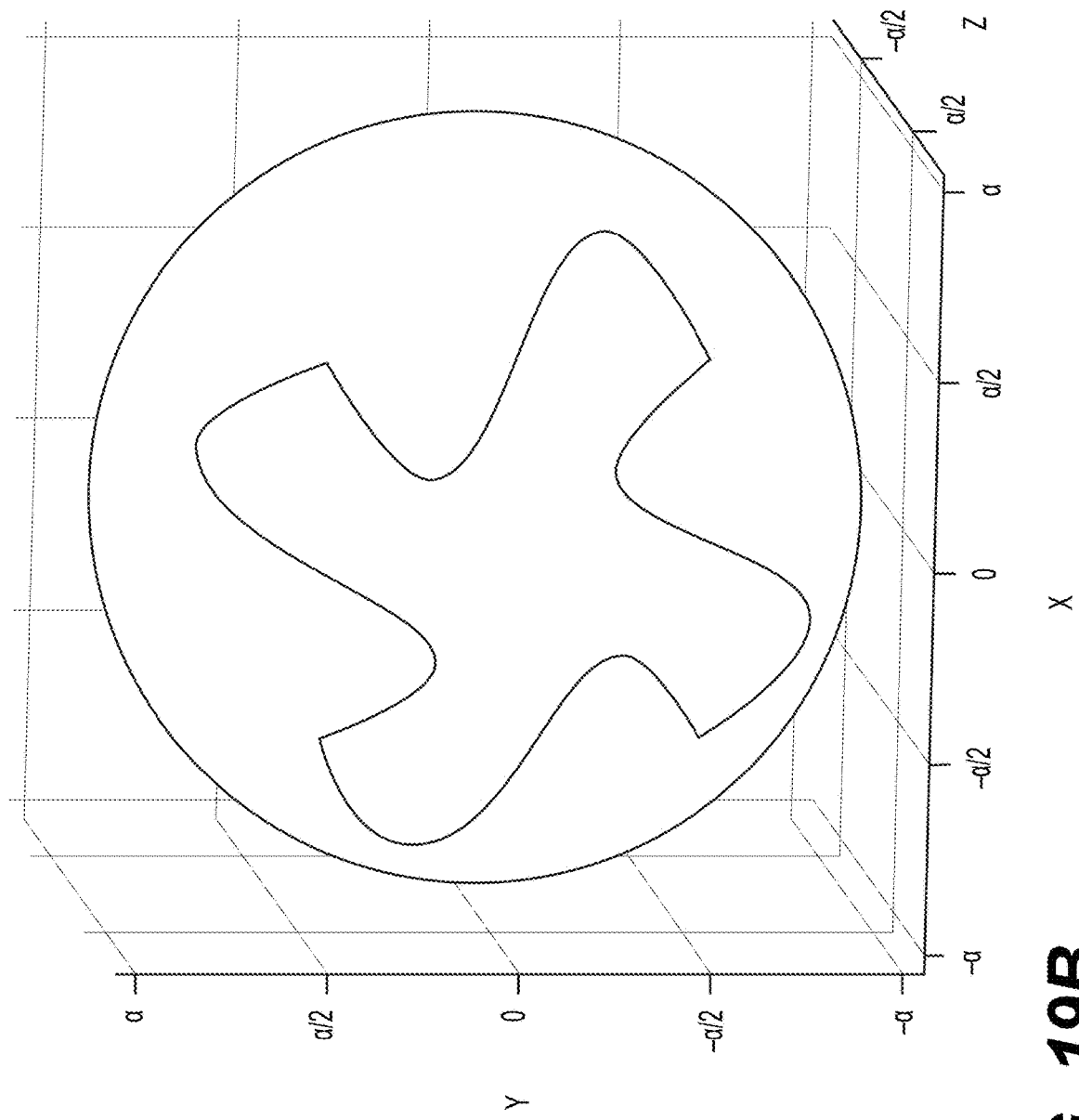
FIG. 19B shows a four-limb module with spherical topology, according to one implementation.
Figure 19C:
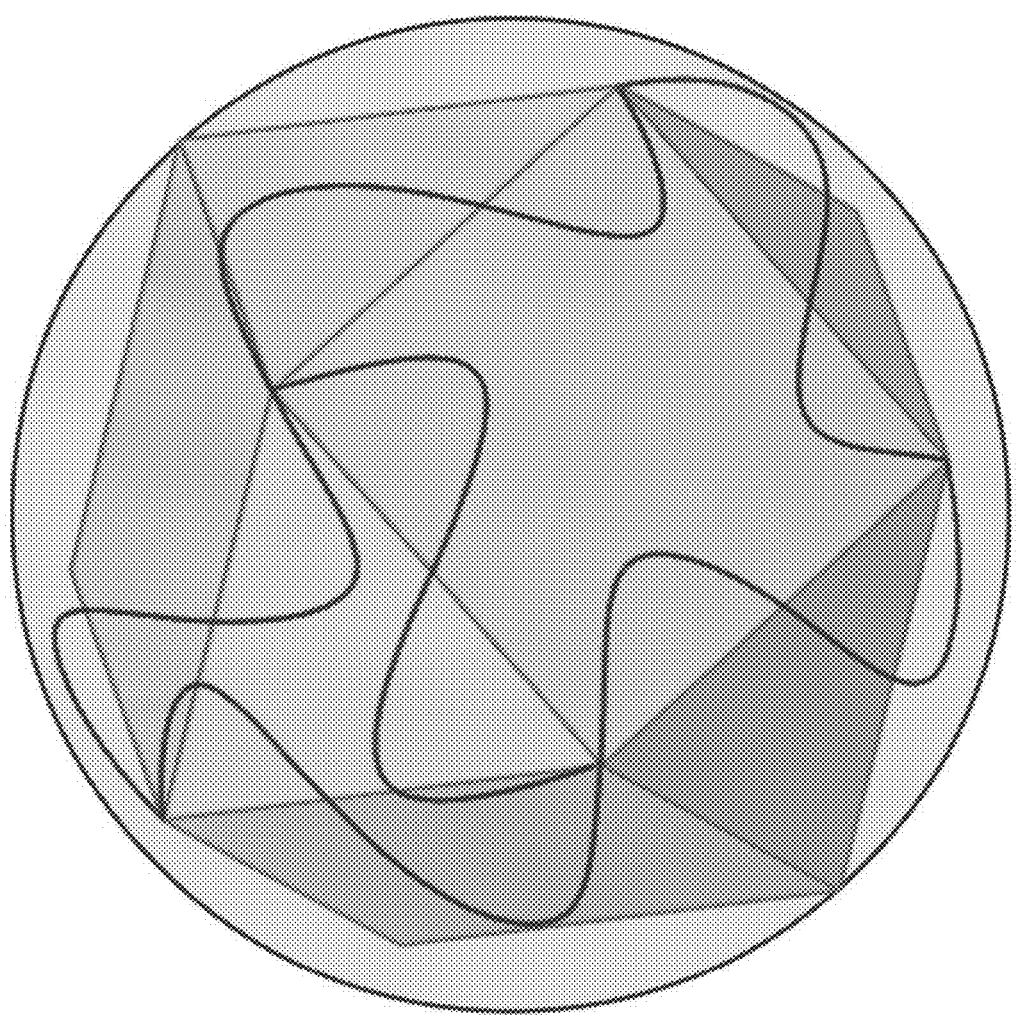
FIG. 19C shows the spherical tiling of a cuboctahedron achieved via heterogeneous forward design using the three- and four-limbed modules of FIGS. 19A and 19B, according to one implementation.

The forward spherical topology is obtained through an inverse orthographic projection of the MT-curve f(x) drawn on the topology curve plane onto the circumscribing sphere of radius R. The latitude and longitude of the projection $(\phi,\lambda)$ originating from $(\phi_0,\lambda_0)$ are generically defined as $$\begin{bmatrix}\phi\\\lambda\end{bmatrix} = \begin{bmatrix}\sin^{-1}\left(\left(\cos(c)\sin(\phi_0) + \frac{f(x)\sin(c)\cos(\phi_0)}{\rho}\right)\right)\\\lambda_0 + \tan^{-1}\left(\frac{x\sin(c)}{\rho\cos(c)\cos(\phi_0) - f(x)\sin(c)\sin(\phi_0)}\right)\end{bmatrix} = \qquad (4)$$

$$g_0(x, f(x), \phi_0, \lambda_0)$$

where $\rho = \sqrt{x^2 + f(x)^2}$ and $c = \sin^{-1}(\rho/R)$. The projection origin is then defined as the midpoint of a given p-gon edge as $(\phi_0,\lambda_0)$. The resulting projection can then be successively rotated (p–1) times about (0,0) by $2\pi/p$ to achieve a spherical module. For a homogeneous forward design, this process will be repeated for each Platonic solid and will result in homogeneous spherical tilings of two different spheres. For a heterogeneous forward design, this process is repeated for each unique Archimedean face p-gon and will result in heterogeneous tiling of a single sphere. FIGS. 19A-19C show the spherical tiling of a cuboctahedron achieved via heterogeneous forward design. While this example shows a tiling where both modules are based on the same MT-curve to achieve perfect spherical tiling, note that both heterogeneous and homogeneous design can use two different MT-curves for the different modules of respective amplitudes A1 and A2.

Planar Topology

Figure 19D:
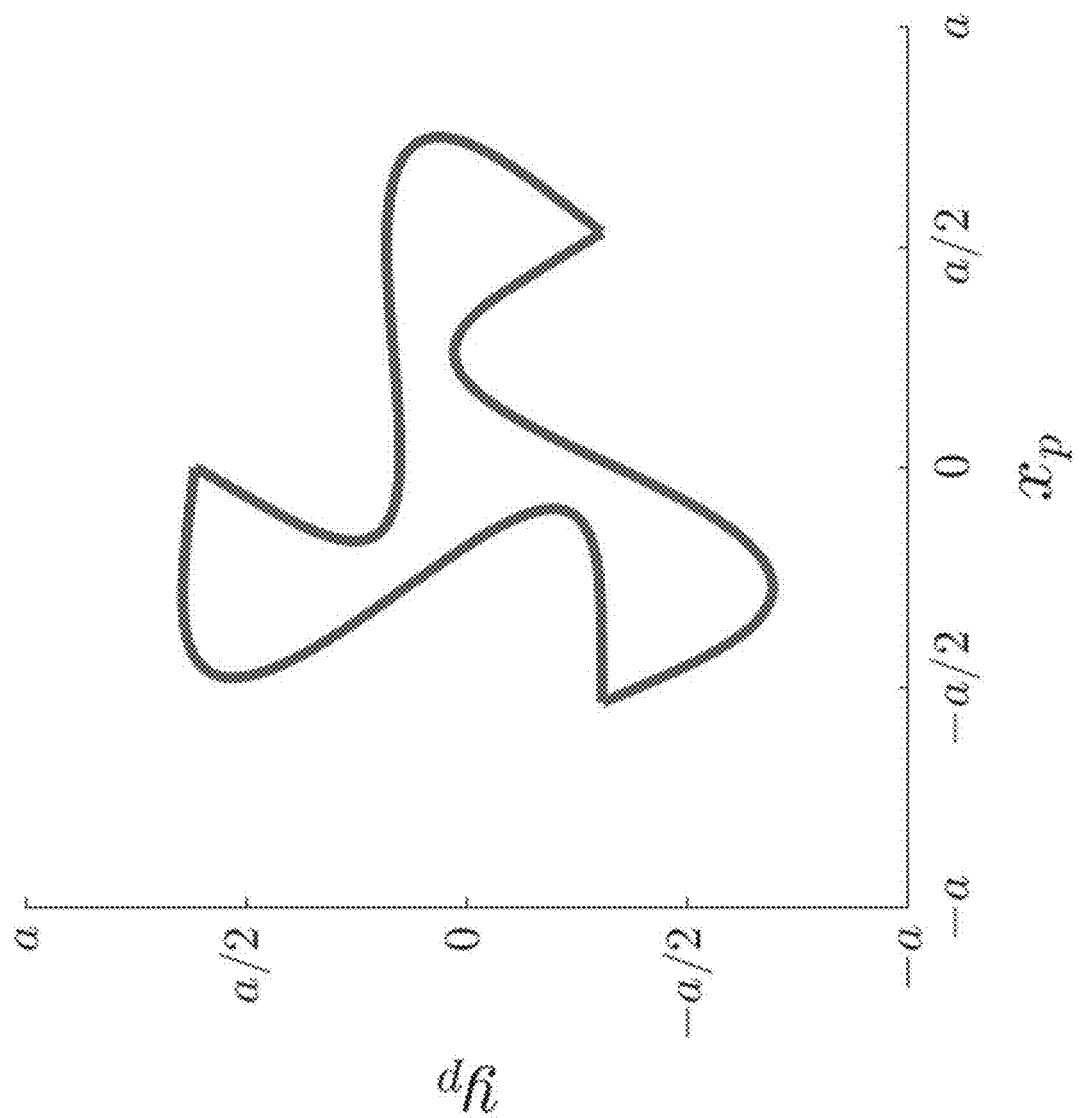
FIG. 19D shows a three-limb module with planar topology, according to one implementation.
Figure 19E:
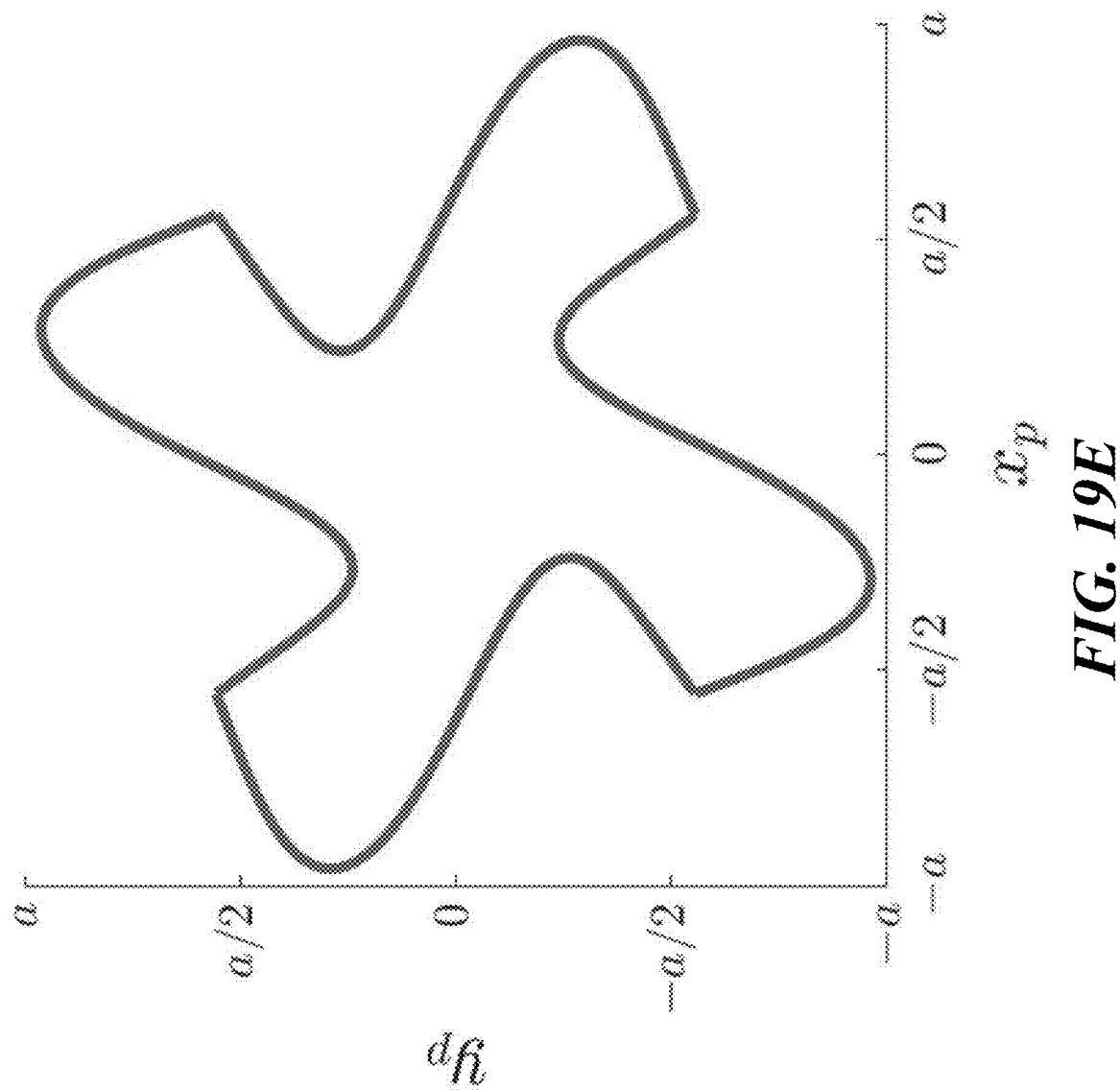
FIG. 19E shows a four-limb module with planar topology, according to one implementation.
Figure 19F:
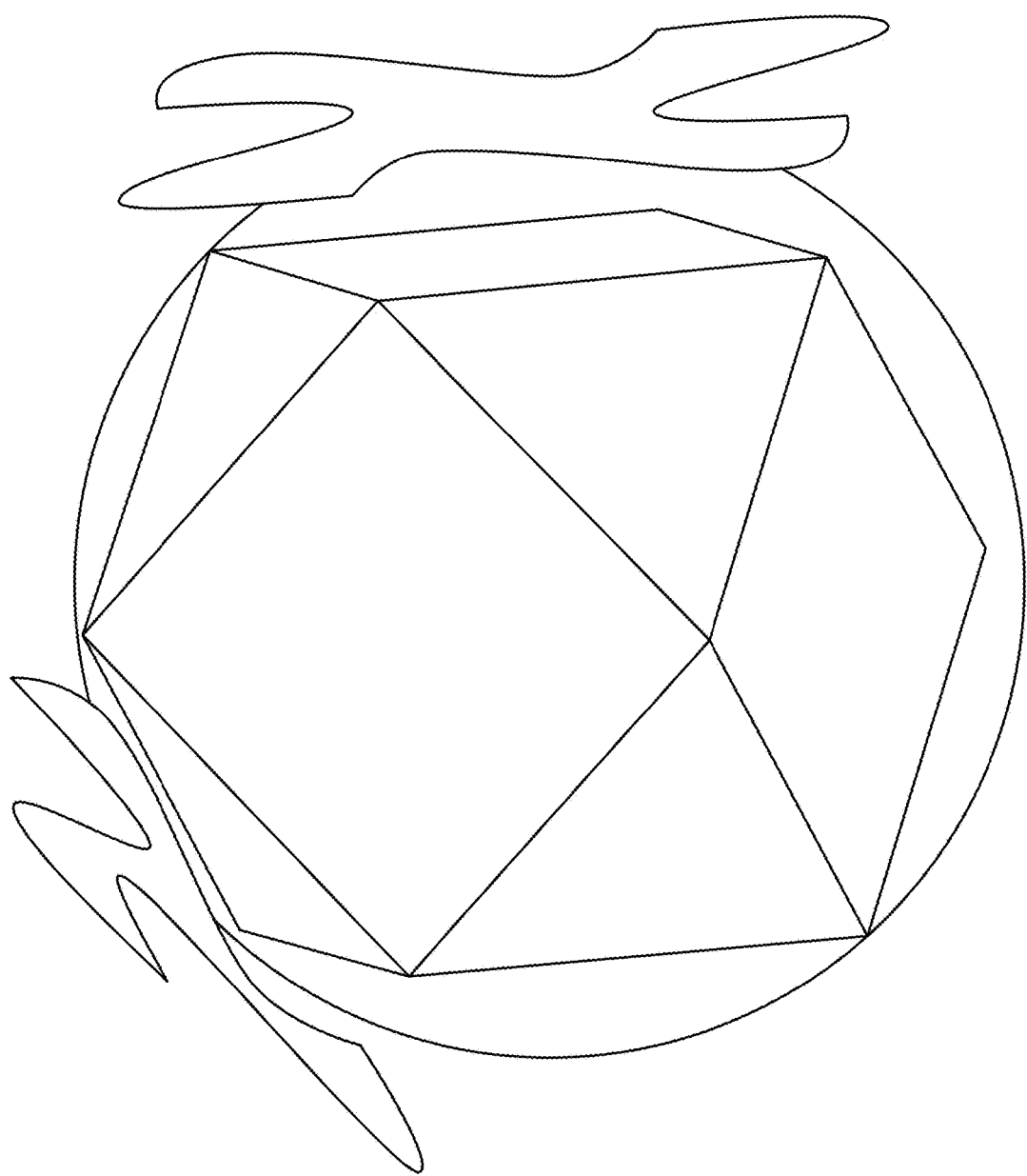
FIG. 19F shows the tiling of the three- and four-limbed planar topologies of FIGS. 19D and 19E tangent to a circumscribing sphere for a cuboctahedron, according to one implementation.

The spherical tiles are then projected via azimuthal equidistant projection onto the tangent plane. Generically, the resulting planar coordinates $(x_p, y_p)$ for the projection with origin $(\phi_1, \lambda_1)$ are given as $$\begin{bmatrix}x_p\\y_p\end{bmatrix} = Rk'\begin{bmatrix}\cos(\phi_s)\sin(\lambda_s - \lambda_1)\\\cos(\phi_1)\sin(\phi_s) - \\\sin(\phi_1)\cos(\phi_s)\cos(\lambda_s - \lambda_1)\end{bmatrix} = g_1(x, f(x), \phi_0, \lambda_0, \phi_1, \lambda_1) \qquad (5)$$

$$\text{where } k' = \frac{c}{\sin(c)}$$

is the scale factor and $\cos(c) = \sin(\phi_1)\sin(\phi) + \cos(\phi_1)\cos(\phi)\cos(\lambda - \lambda_1)$. Because the projection center is defined as the center of the p-gon face, $\phi_1 = \lambda_1 = 0$. FIG. 7 displays the planar topology for cuboctahedron-based modules via heterogeneous forward design.

where $k' = c/\sin(c)$ is the scale factor and $\cos(c) = \sin(\phi_1)\sin(\phi) + \cos(\phi_1)\cos(\phi)\cos(\lambda - \lambda_1)$. Because the projection center is defined as the center of the p-gon face, $\phi_1 = \lambda_1 = 0$. FIGS. 19D-19F.

Inverse Design for Spherical Reconfiguration

The inverse design process creates new spherical topology based on the planar topology of the forward design. In the case of heterogeneous forward design (based on an Archimedean solid) the inverse design nets multiple unique homogeneous spherical topologies. Inverse design of modules with homogeneous forward design (based on Platonic solids) will result in a single heterogeneous spherical topology. The inverse consists of the projection with respect to a polyhedron vertex alignment scaling factor to ensure proper construction. In this section, any variable denoted as prime (') refers to the inverse topology.

Inverse Spherical Topology

The inverse spherical topology is obtained through an inverse azimuthal equidistant projection of the planar topology to a sphere of radius $\kappa R'$ determined by the solid type, edge length, and scaling factor $\kappa$. The new longitude and latitude coordinates for projection origin $(\varphi'_0, \lambda'_0)$ are $$\begin{bmatrix} \phi' \\ \lambda' \end{bmatrix} = \begin{bmatrix} \sin^{-1}\left(\cos(c)\sin(\phi'_0) + \frac{y_p \sin(c)\cos(\phi'_0)}{\rho}\right) \\ \lambda_0 + \tan^{-1}\left(\frac{x_p \sin(c)}{\rho \cos(c)\cos(\phi'_0) - y_p \sin(c)\sin(\phi'_0)}\right) \end{bmatrix} \quad (6)$$

where $\rho = \sqrt{x_p^2 + y_p^2}$, $c = \frac{\rho}{R'}$, $\phi'_0 = \phi_{0,p}$ for a p-gon modules face, and $\lambda 0=0$ (for projection centered at the polyhedral edge midpoint.

Polyhedron Vertex Alignment

Figure 20:
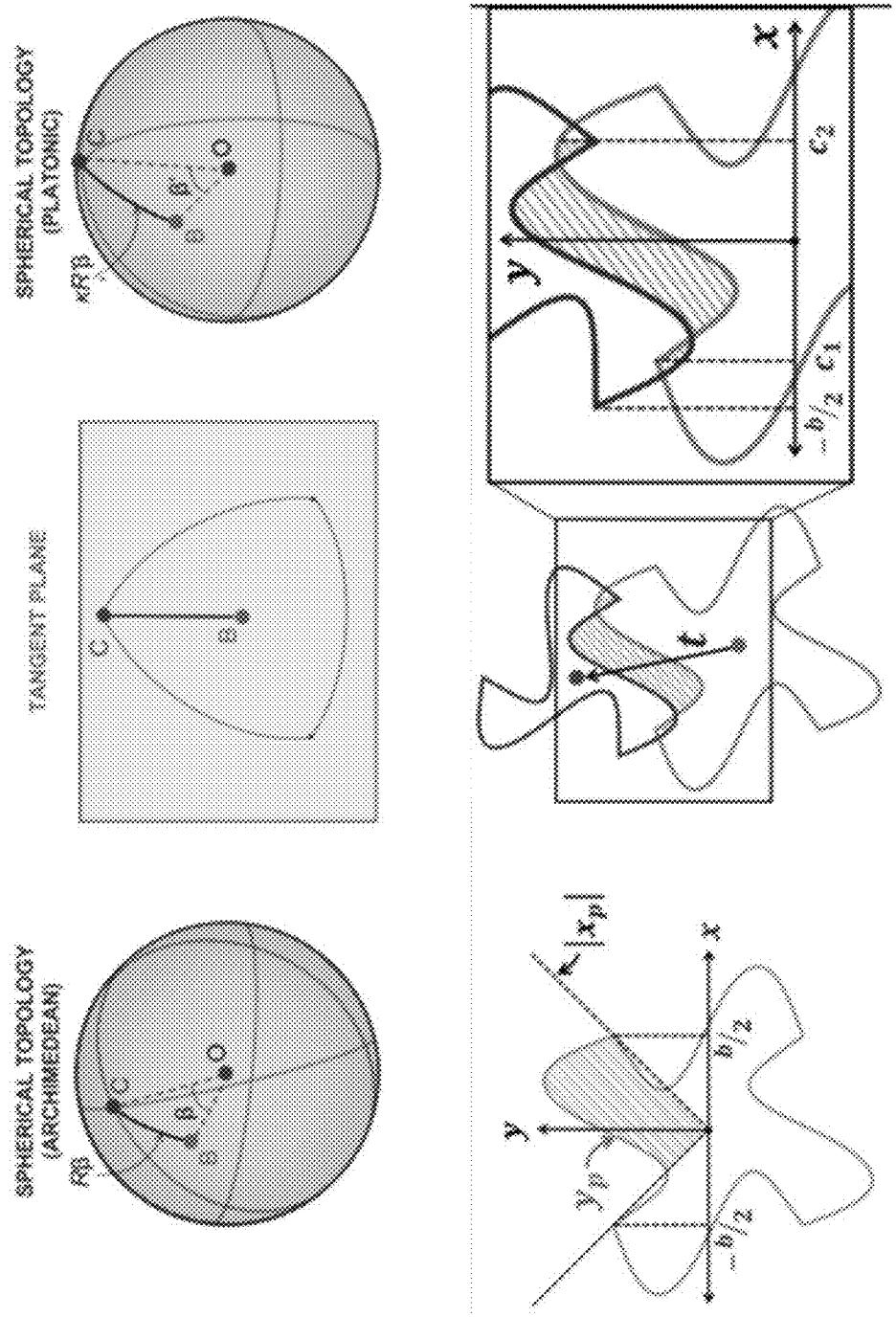
FIG. 20 provides details on polyhedron vertex alignment, according to one implementation.
Figure 22A:
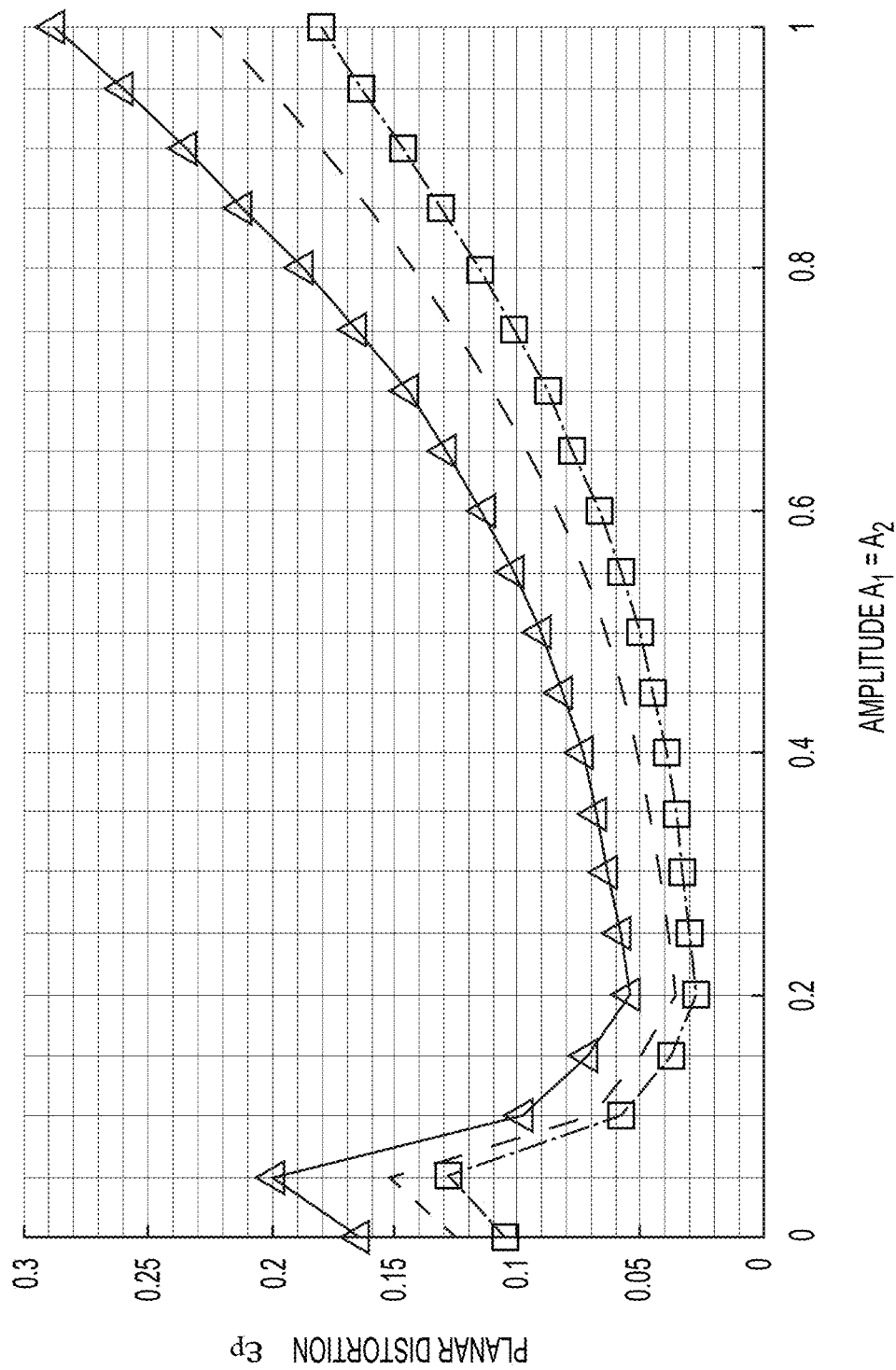
FIG. 22A plots the individual planar distortion metrics for cuboctahedron-based modules verses the MT-curve amplitudes for homogenous modules, according to one implementation.
Figure 22B:
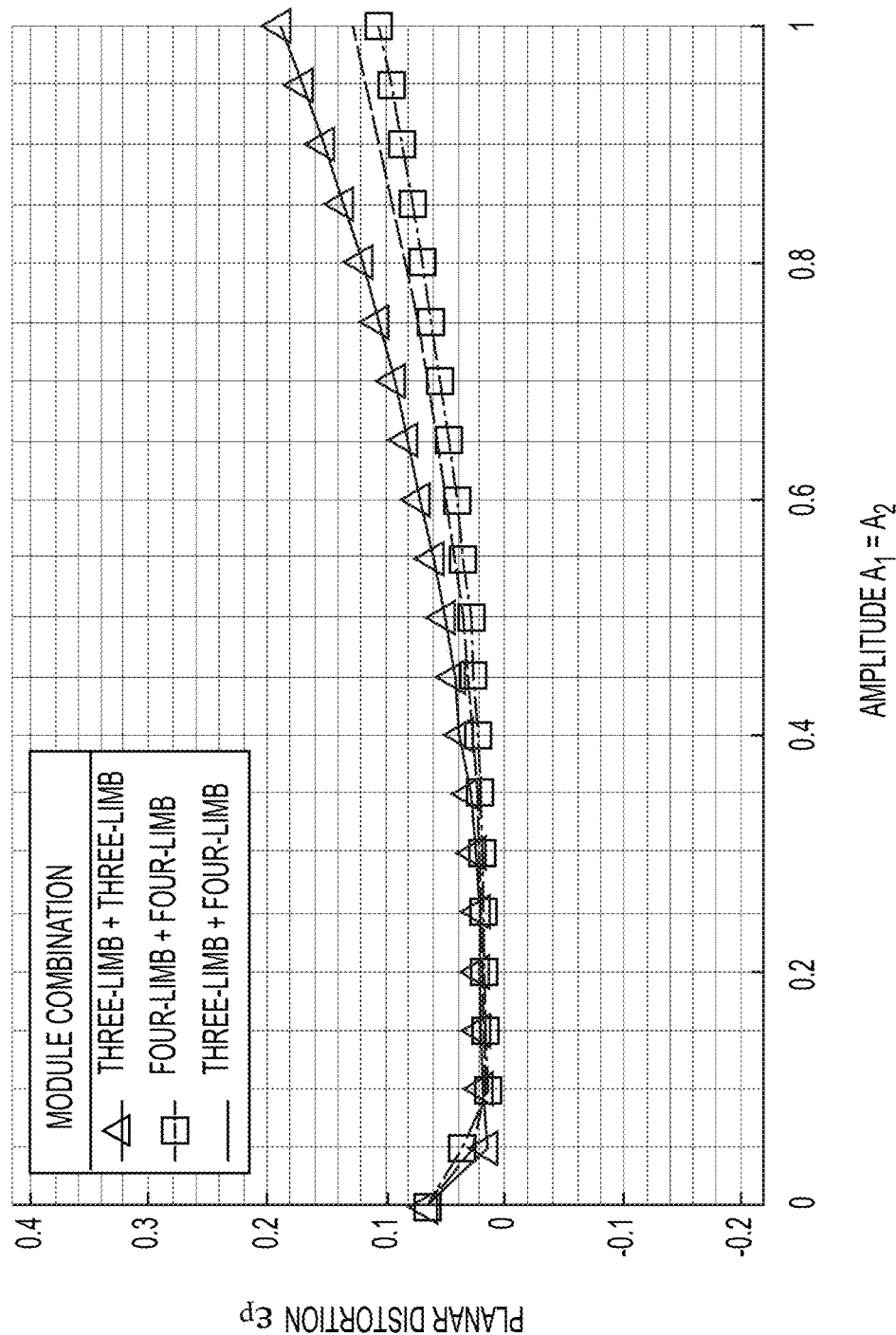
FIG. 22B plots the individual planar distortion metrics for cuboctahedron-based modules verses the MT-curve amplitudes for heterogenous forward design modules, according to one implementation.
Figure 22C:
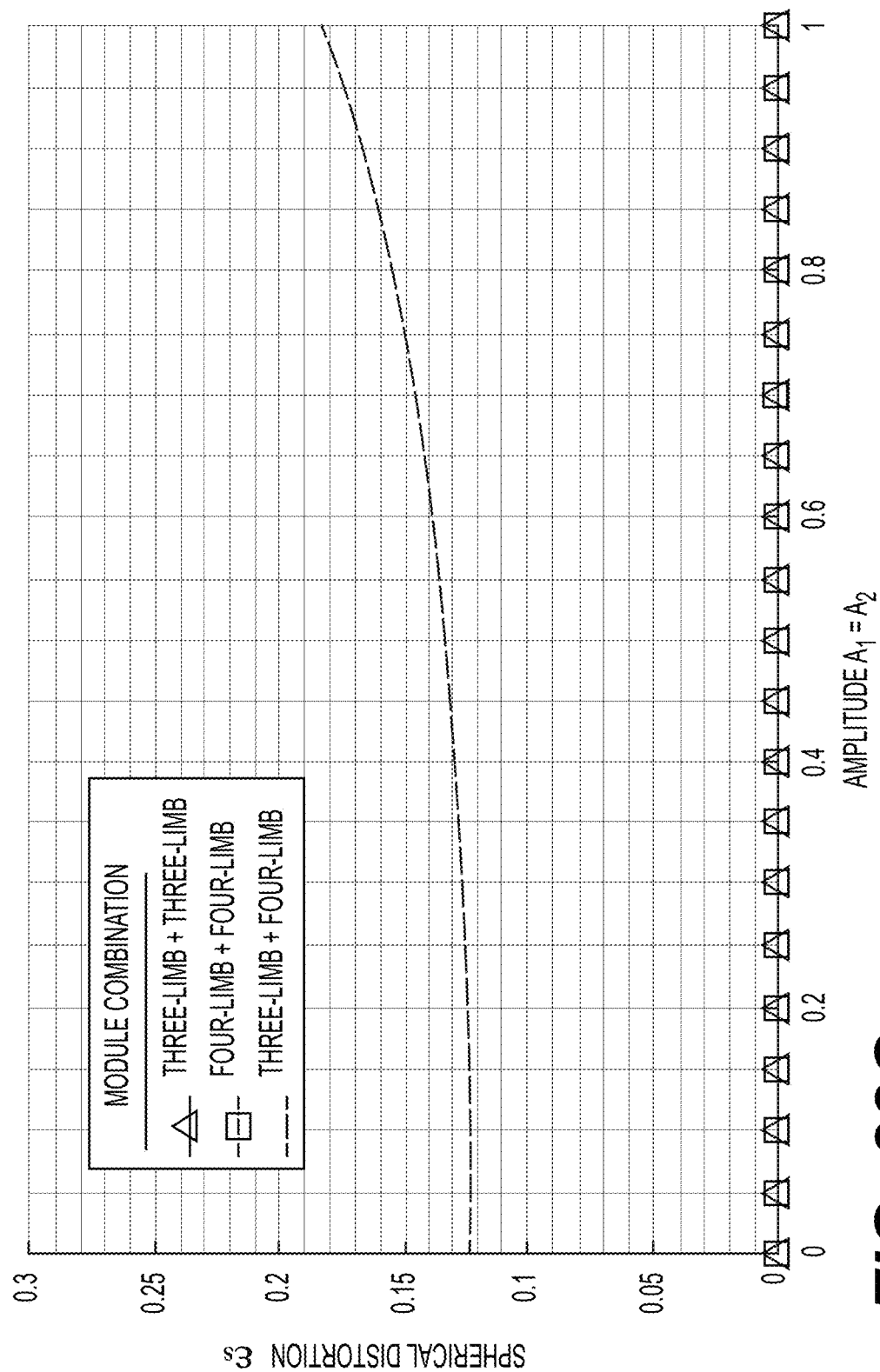
FIG. 22C plots the individual spherical distortion metrics for cuboctahedron-based modules verses the MT-curve amplitudes for homogenous modules, according to one implementation.
Figure 22D:
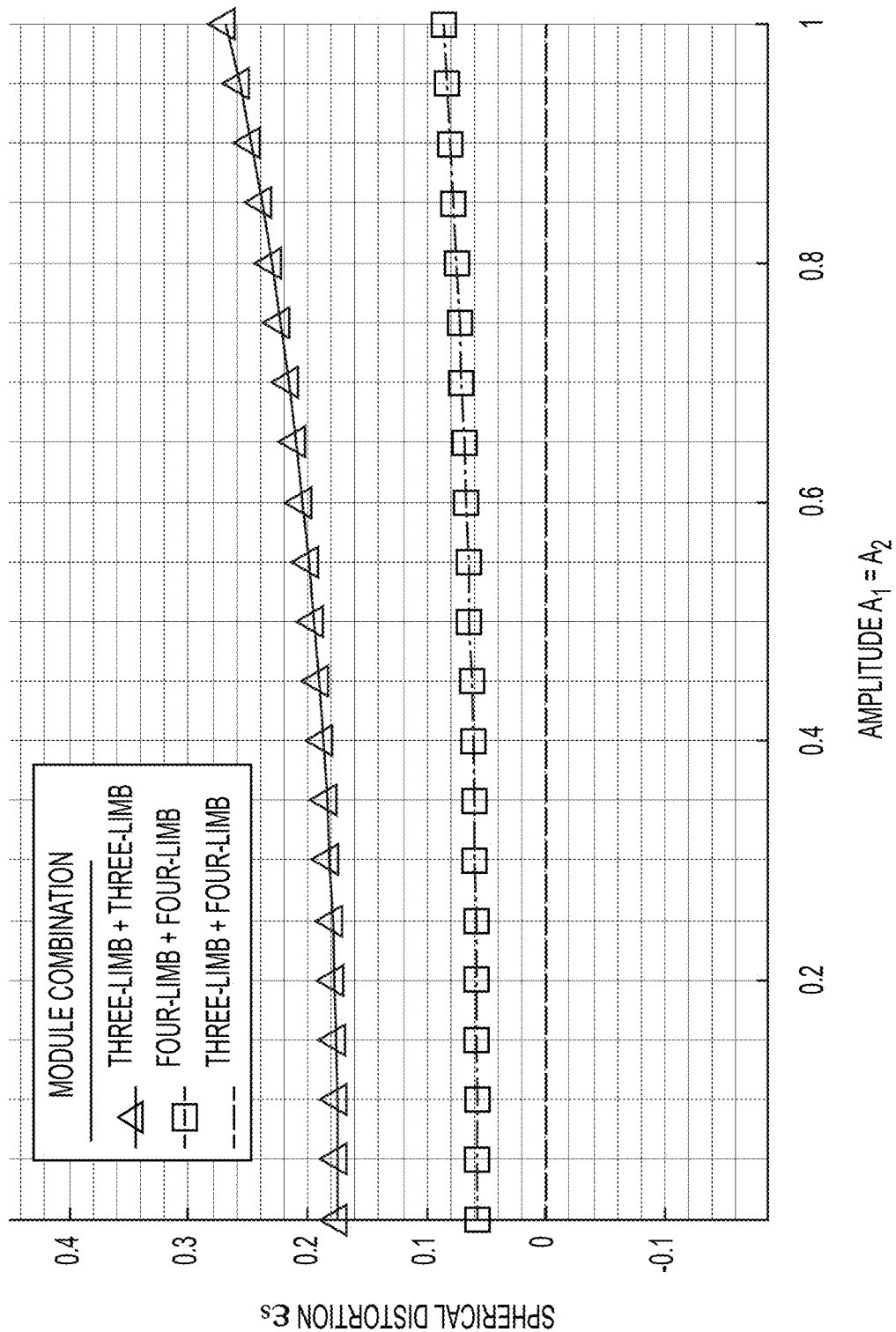
FIG. 22D plots the individual spherical distortion metrics for cuboctahedron-based modules verses the MT-curve amplitudes for heterogenous forward design modules, according to one implementation.

The distortion due to the azimuthal equidistant projection results in a spherical configuration that does not align with the polyhedral vertices. The radius for reconfiguration therefore needs to be scaled to ensure polyhedral vertex alignment. The scale invariant design of the modules allows for a constant ratio between the edge lengths (a',a) of the base Platonic solid and Archimedean solid, respectively, for the spherical reconfiguration regardless of the input parameters (a,A). The azimuthal equidistant projection preserves distance radially from the center of projection. Thus, the center-vertex distance of the planar topology equals the center-vertex spherical distance of the forward design, as shown in FIG. 20. However, a scaling factor $\kappa$ is required to adjust the inverse design radius R' to ensure that this distance aligns with the spherical center-vertex distance of the inverse design. Vertex alignment between solids occurs when $$\kappa\left(\frac{R'}{a'}\right)\beta' = \left(\frac{R}{a}\right)\beta \quad (7)$$

where $\kappa$ is a non-dimensional scaling factor.

Module Topology Optimization

Module topology optimization for planar and spherical reconfiguration is obtained by minimizing the cost function that is a weighted sum of the planar and spherical reconfiguration distortion metrics. These metrics areas are a function of the amplitude of the module topology curve A. The generic module topology set optimization problem can be written as $$(A_1^*, A_2^*, \ldots A_n^*) = \operatorname{argmin} J(A_1, A_2, \ldots A_n) \quad (8)$$

s.t. $A_i, w \in [0, 1]$ where $J(A_1, A_2, \ldots A_n) = w \frac{1}{N_p} \sum_{i=1}^{N_p} \varepsilon_p + (1-w) \frac{1}{N_s} \sum_{j=1}^{N_s} \varepsilon_s$ where $\varepsilon_p$ and $\varepsilon_s$ are the distortion metrics for planar and spherical reconfiguration, respectively, and w is a constant scalar weight. Additionally, n is the number of distinct p-gon face/modules shapes, $$N_p = \binom{n}{2}$$

the number of planar distortion metrics, and $N_s$ is the number of spherical distortion metrics where $N_s = n+1$ for heterogeneous forward design and $N_s = 1$ for homogeneous forward design. These values assume that a given p-gon shape is only used for a single corresponding homogeneous reconfiguration profile.

Planar Distortion Metric

The planar distortion metric $\varepsilon_p$ for modules in planar configuration is calculated as $$\varepsilon_p = \frac{G_p(p_1 + p_2)}{P_1 + P_2} \quad (9)$$

where $G_p$ is the inter-modular area (i.e., cavity and/or overlap) between modules, $P_j$ is the total area of module j for $j = \{1,2\}$ and $p_j$ is the number of edges for the p-gon of module j. For homogeneous configurations $p_1 = p_2$ and $P_1 = P_2$. Distortion metrics are calculated for both homogeneous configurations (e.g., two four-limb modules) and heterogeneous configurations (e.g., a four-limb module and a three-limb module). These areas are displayed in FIG. 20. The area of a single limb is the area between the planar topology curve $y_p$ achieved via forward design and the limb sector line, defined as $$\left|\cot\left(\frac{\pi}{p}\right)\right|.$$

The total module area P is then calculated as the area of a single limb times the number of limbs on the module:

$$P = p \int_{-b/2}^{b/2} \left(y_p - \left|\cot\left(\frac{\pi}{p}\right)\right| x_p \right) dx_p \quad (10)$$

where (−b/2, b/2) are the projected vertices of the base solid. The intermodular area between one planar module $(x_{1p}, y_{1p})$ and another $(x_{2p}, y_{2p})$ is defined with respect to a carriable center-to-center offset $$t = \in \left[-\frac{b}{8}, \frac{b}{8}\right].$$

$$G_p = \min_t \left( \int_{c_1}^{c_2} y_{1p}(x_{1p}) dx_{1p} - \int_{c_1}^{c_2} y'_{2p}(x'_{2p}) dx'_{2p} \right) \quad (11)$$

where $\begin{bmatrix} x'_{2p} \\ y'_{2p} \end{bmatrix} = \begin{bmatrix} t_x \\ t_y \end{bmatrix} + \begin{bmatrix} \cos(\pi) & -\sin(\pi) \\ \sin(\pi) & \cos(\pi) \end{bmatrix} \begin{bmatrix} x_{2p} \\ y_{2p} \end{bmatrix}$ (12)

For homogenous configurations $(x_{1p}, y_{1p}) = (x_{2p}, y_{2p})$ but $(x_{1p}, y_{1p}) \neq (x_{2p}, y_{2p})$ for heterogenous configurations.

Spherical Distortion Metric

The spherical distortion metric $\varepsilon_s$ relates to the proportion of the spherical surface that needs to deform to create a full sphere with a radius of R. It is defined for modules in a given spherical configuration as $$\varepsilon_s = E \frac{G_s}{S} \quad (13)$$

where E is the total number of edges for a given circumscribed polyhedron, $G_s$ is the spherical surface inter-modular area, and $S=4\pi R^2$ is the total surface area for a spherical configuration of radius R. The spherical inter-modular area $G_s$ is the surface area between two edges of modules in docking position, shown in FIG. 21. Docking position indicates that the endpoints of all spherical module edges are aligned with the vertices of the base solid for that configuration. This space is represented by the three-dimensional Euclidean curve $T_i$, given as $$T_i(\phi, \lambda) = R \begin{bmatrix} \cos(\phi)\cos(\lambda) \\ \cos(\phi)\sin(\lambda) \\ \sin(\phi) \end{bmatrix} \quad (14)$$

and $T'_i$, a 180° rotation about the midradius (i.e., the line connecting the sphere's center and the polyhedral edge midpoint). If the polyhedral edge midpoint occurs at (0,0), the midradius aligns with the x-axis and the rotation matrix Q is given as $$Q = \begin{bmatrix} 1 & 0 & 0 \\ 0 & -1 & 0 \\ 0 & 0 & -1 \end{bmatrix} \quad (15)$$

The rotated curve $T'_i = QT_i$ represents an adjacent module edge in docking position. The spherical inter-modular area can be thought of as a sum of spherical arcs along the projection of the inverse solid edge to the reconfiguration space. The spherical edge for a polyhedron of edge length a has an angular sweep $\psi$ which can be calculated as $$\psi = 2\cos^{-1}\left(\frac{\left(\sqrt{R^2 - (a/2)^2}\right)}{R}\right) \quad (16)$$

The spherical inter-modular area can then be calculated as $$G_s = \iint_S d\phi d\lambda = R^2 \int_{-\frac{\psi}{2}}^{\frac{\psi}{2}} \cos^{-1}\left(\frac{T_1 \cdot T'_2}{R^2}\right) d\psi \quad (17)$$

Note that for a homogenous sphere $T_1=T_2$ and for a heterogeneous sphere $T_1 \neq T_2$.

Results

The design methodology was used to generate two sets of heterogeneous Modular Soft Robots in simulation (MATLAB) and model their capability for spherical reconfiguration in both homogeneous (cube and octahedron) and heterogeneous (cuboctahedron) configurations. Using the methods, reconfiguration distortion metrics for spherical and planar configurations were calculated for modules with MT-curve amplitudes $A_1, A_2 \in [0,1]$. Areas were calculated using numerical integration with spline interpolation and all optimization was performed using MATLAB's fmincon. The resulting cost function J was simulated for varying amplitude values with constant weight factor w=0.5 (equal weighting) for both homogeneous (cube and octahedron bases) and heterogeneous (cuboctahedron bases) forward design. The results (FIG. 21) suggest that the heterogeneous forward design results in lower average overall distortion. FIGS. 22A-22D plot the individual components of this cost function and highlights the difference between homogeneous and heterogeneous forward design: homogeneous forward design assumes zero distortion in the homogeneous spherical configuration (spherical octahedron and spherical cube) while heterogeneous forward design assumes zero distortion in the heterogeneous spherical configuration (spherical cuboctahedron). Because planar distortions increase radially from the center of the module, modules that constitute a larger surface area proportion of the sphere will generally result in larger planar distortions. This is reflected in the fact that the homogeneous forward modules have larger planar distortions than the heterogeneous forward modules as the former are based on spheres composed of a smaller number of modules that take up a larger percentage of surface area on the sphere. The difference is pronounced enough to result in lower overall distortion for the heterogeneous first modules when using equal weighting in the cost function.

Figure 23A:
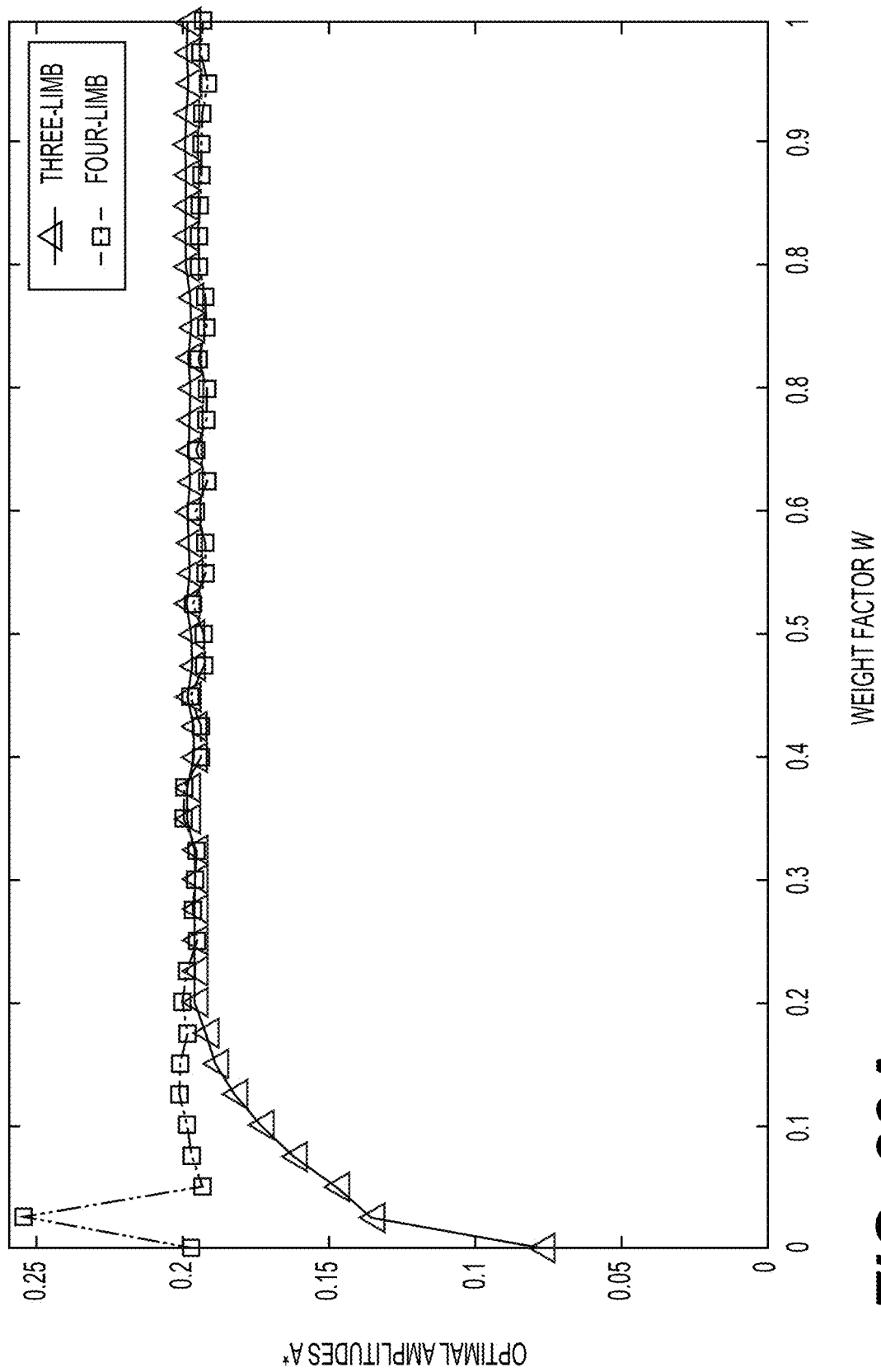
FIG. 23A illustrates results from simulated amplitudes for arms of soft modular robots with homogenous forward design, according to one implementation.
Figure 23B:
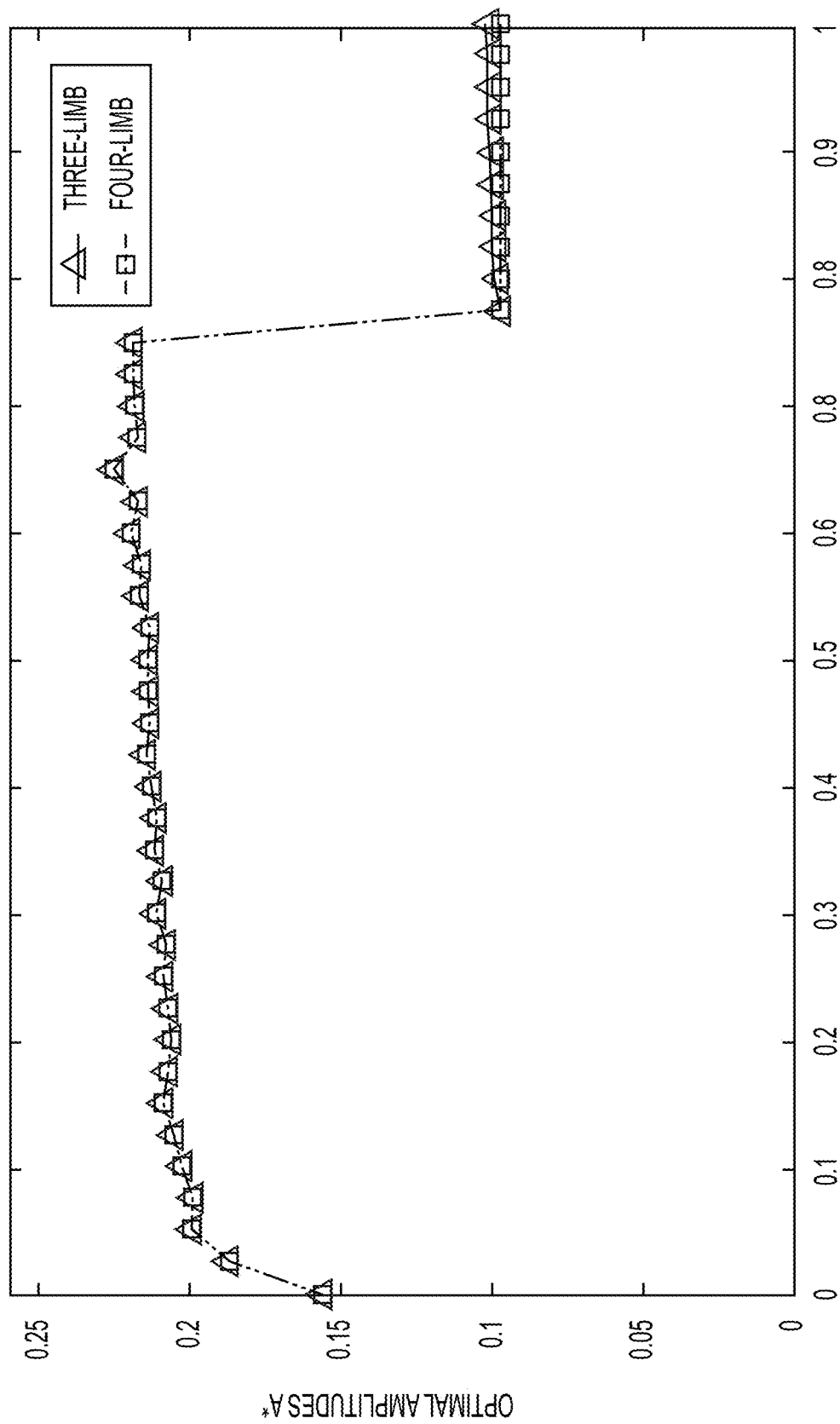
FIG. 23B illustrates results from simulated amplitudes for arms of soft modular robots with heterogenous forward design, according to one implementation.
Figure 24:
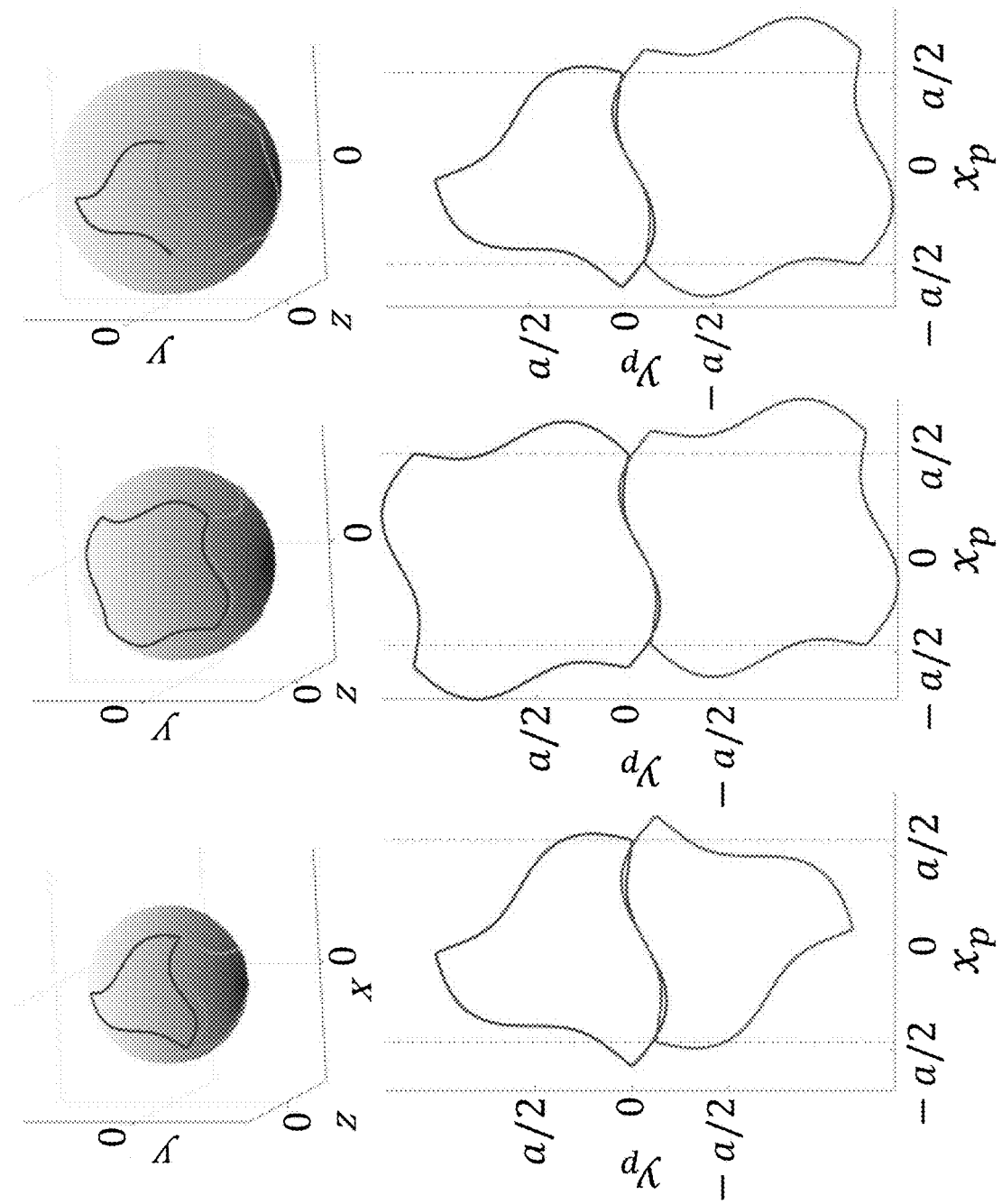
FIG. 24 shows the expected overlap/cavities for adjacent planar and spherical topologies of the optimal three-limb and four-limb Modular Soft Robots, according to one implementation.
Figure 25:
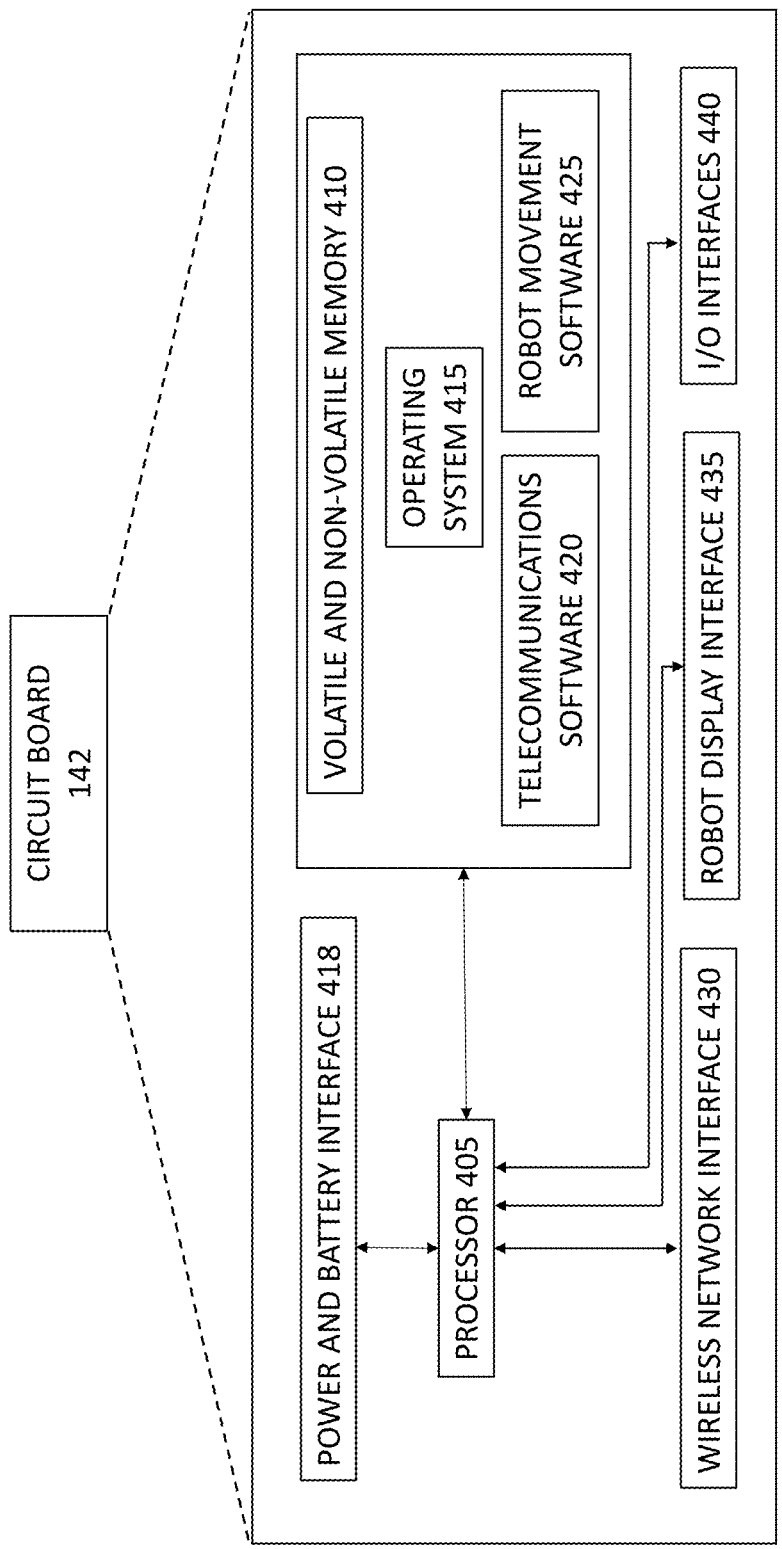
FIG. 25 shows an example computer environment illustrating computer components and software described in the implementations herein.

Simulations were then run with different weighting values w. The optimal MT-curve amplitudes $A^*_i$ for varying weights are shown in FIGS. 23A and 23B. The data suggest that weighting factor does not have a significant effect on optimal design; the optimal curve amplitudes are nearly constant aside from an initial divergence of the homogeneous forward amplitudes when w<0.2 and a sharp drop in heterogeneous forward amplitudes when w exceeds 0.75 (i.e., when planar distortion metrics are treated as more than three times as important as spherical distortion metrics). Furthermore, distortion is minimized when the MTcurve amplitudes of the two modules are approximately equal ($A_1 \approx A_2$) Finally, the results indicate that the heterogeneous forward design generates a lower optimal amplitude and lower distortion metrics, with MT-curve amplitude of $A^* \approx 0.2$. The expected overlap/cavities for adjacent planar and spherical topologies of the optimal three-limb and four-limb Modular Soft Robots are visualized in FIG. 24. Interestingly, the heterogeneous forward design leads to cavities in the spherical configurations as opposed to the overlap in the spherical configurations observed in the homogeneous forward design scenario. This distinction may influence the forward design choice.

In FIG. 10, the simulation results were validated experimentally by casting thin modules with silicone rubber (Smooth-On Dragon Skin 10) and arranging them in different configurations. It is important to note that the purpose of this fabrication is simply to investigate the surface topology of soft modules and visualize the resulting distortions; therefore, robot morphology, actuation, and docking are not considered here and are instead the subject of future work. As expected, the largest distortions gaps/overlaps occur in the homogeneous spheres. The experimental modules also experience larger spherical gaps due to the thickness of the modules causing "bowing". This can be addressed by optimizing the morphology to encourage spherical curling. Note that the homogeneous spheres in this image are only attached at the vertices (unlike the heterogeneous cuboctahedron module). Therefore, it is expected that a properly designed docking mechanism combined with robot actuation would be able to address this.

CONCLUSION

The research presents a design methodology for optimal topology design of versatile Modular Soft Robots that can reconfigure between both heterogeneous and homogeneous configurations. As an example, the fourteen Modular Soft Robots (six four-limb, eight three-limb) are designed using an Archimedean solid (cuboctahedron) as the base polyhedron. They are capable of spherical heterogeneous reconfiguration amongst themselves (all fourteen modules), and individually, i.e., six homogeneous four limb modules or eight three-limb. The generic design process involves choice of the base solid(s) and the module topology curve (MT-curve) that is strategically drawn on the module topology plane. The topology of the robot module in the spherical configuration is obtained through orthographic projection onto a sphere. This topology is subsequently projected onto the tangent plane through an azimuthal equidistant projection. The polyhedron-dependent geometric quantities required for these projections are presented. The optimal topology is then obtained by ensuring alignment of the polyhedron vertices and minimizing the spherical and planar distortions. Such distortion metrics are quantified as the normalized inter-modular areas in the spherical and planar configurations. Simulations are performed comparing scenarios where the forward design is based on a set of Platonic solids (homogeneous) or an Archimedean solid (heterogeneous). The results indicate that heterogeneous forward design results in lower overall distortion. However, for both the cases the optimal amplitudes for the MT-curves are around 0.2. Heterogeneous forward design was favored in this paper due to the smaller planar distortions and ability to minimize distortion in the heterogeneous spherical configuration. Optimal modules from heterogeneous forward design were then fabricated with silicone rubber to validate the simulation results.

The construction and arrangement of the systems and methods as shown in the various exemplary implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the exemplary implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of implementations of the disclosed methods.

The invention claimed is:

1. A modular soft robot comprising:
   a base; and
   an arm coupled to the base such that the arm is longitudinally bisected by a central plane that extends through and bisects the base and the arm, the arm comprising a first surface and a second surface opposite and spaced apart from the first surface, wherein the first surface defines a plurality of channels, each channel comprising a proximal end at the first surface and a distal end spaced apart from the proximal end, wherein each channel has a longitudinal axis extending therethrough, wherein a shape of the arm as viewed in a plane parallel to the central plane is defined by a module-topology curve, the module-topology curve being an odd function with constraints at edges of a platonic solid;
   wherein an actuator is configured to deform the arm.

2. The robot of claim 1, wherein the actuator is a motor tendon actuator at least partially disposed within the arm adjacent the base.

3. The robot of claim 1, wherein the actuator deforms the arm between a flat configuration and a curved configuration, wherein in the flat configuration, each channel has a first width at the distal end of the channel, and in the curved configuration, each channel has a second width at the distal end of the channel, wherein the first width is greater than the second width.

4. The robot of claim 1, wherein the arm comprises a plurality of arms.

5. The robot of claim 1, wherein each of the plurality of channels is defined by two adjacent protrusions that extend from the first surface, the protrusions having an end surface separated apart from the first surface.

6. The robot of claim 5, wherein the protrusions are integrally formed with the first surface.

7. The robot of claim 5, wherein each protrusion has a first edge and a second edge, wherein the first edge of each protrusion lies within a first plane that intersects the first surface at a first angle that is greater than 0° and less than or equal to 90°, and the second edge of each protrusion lies within a second plane that intersects the first surface at a second angle that is greater than 0° and less than or equal to 90°, and wherein the first angle and the second angle are different.

8. The robot of claim 7, wherein each channel has a right trapezoidal cross-sectional shape as viewed through a plane that is perpendicular to the longitudinal axis of the respective channel.

9. A system of modular soft robots comprising:
   a plurality of modular soft robots including the modular soft robot of claim 1,
   wherein the actuator is configured to deform the arm of the modular soft robot between a flat configuration and a curved configuration,
   wherein, in the flat configuration, each channel of the modular soft robot has a first width at the distal end of the channel, and in the curved configuration, each channel of the modular soft robot has a second width at the distal end of the channel, wherein the first width is greater than the second width,
   wherein each of the plurality of modular soft robots are rotationally symmetric relative to each other, and
   wherein the plurality of modular soft robots in the curved configuration are reconfigurable to create a three-dimensional shape different from the shape of the modular soft robot alone.

10. The system of claim 9, wherein the plurality of modular soft robots in the flat configuration are reconfigurable relative to each other to create a two-dimensional shape different from the shape of the modular soft robot alone.

11. The system of claim 9, wherein the three-dimensional shape is a sphere.

12. The system of claim 11, wherein each of the plurality of modular soft robots correspond to a platonic solid, the platonic solid having a number of faces and a number of edges per face, wherein the number of faces of the platonic solid correlates to the number of modular robots that are arrangeable relative to each other to form the sphere, and wherein the number of edges per face of the platonic solid correlates to a number of arms of each of the modular soft robots.

13. The system of claim 12, wherein the platonic solid is a tetrahedron, a cube, an octahedron, a dodecahedron, or an icosahedron.

14. The system of claim 13, wherein a topology curve plane is the plane passing through the edges of the platonic solid and normal to the plane along a vector joining a center of the edge and a center of a circumscribing sphere.

15. The system of claim 14, wherein a module topology curve is drawn on the topology curve planes of all the edges of the face of the platonic solid,
   wherein a curved configuration topology is obtained through orthographic projection of the module topology curves drawn on the topology curve planes onto the circumscribing sphere,
   wherein a tangent plane is a plane tangent to the sphere with the normal to the plane along the vector joining the center of the circumscribing sphere and a center of the face of the platonic solid, and
   wherein a planar configuration topology is obtained by projecting the curved configuration topology onto the tangent plane.

16. The system of claim 9, wherein the plurality of modular soft robots comprises a first plurality of modular soft robots having a first number of arms and a second plurality of modular soft robots having a second number of arms, the second number of arms being different from the first number of arms.

17. The system of claim 16, wherein, in the flat configuration, each of the first plurality of modular soft robots and the second plurality of modular soft robots are reconfigurable relative to each other to create a two-dimensional shape different from the shape of each robot alone.

* * * * *